US012093856B2

(12) United States Patent
Tomaselli et al.

(10) Patent No.: US 12,093,856 B2
(45) Date of Patent: Sep. 17, 2024

(54) SYSTEM FOR SECURE AUTOMATED AND ACCELERATED RESOURCE ALLOCATION

(71) Applicant: Innovation Finance USA LLC, Fairport, NY (US)

(72) Inventors: Mark Tomaselli, Macedon, NY (US); William Verhelle, Naples, FL (US)

(73) Assignee: Innovation Finance USA LLC, Fairport, NY (US)

( * ) Notice: Subject to any disclaimer, the term of this patent is extended or adjusted under 35 U.S.C. 154(b) by 371 days.

(21) Appl. No.: 17/397,722

(22) Filed: Aug. 9, 2021

(65) Prior Publication Data

US 2022/0309412 A1 Sep. 29, 2022

Related U.S. Application Data

(60) Provisional application No. 63/166,041, filed on Mar. 25, 2021.

(51) Int. Cl.
*G06Q 10/0631* (2023.01)
*H04L 9/40* (2022.01)

(52) U.S. Cl.
CPC ......... *G06Q 10/0631* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 8,365,293 B2 * | 1/2013 | Brown | ................ | H04L 63/0428 705/51 |
| 8,843,997 B1 * | 9/2014 | Hare | ................... | H04L 63/0815 709/200 |

(Continued)

FOREIGN PATENT DOCUMENTS

| | | |
|---|---|---|
| CA | 3048566 | 6/2021 |
| CA | 3130901 C | 1/2024 |

(Continued)

OTHER PUBLICATIONS

"U.S. Appl. No. 16/696,704, Non-Final Office Action mailed Mar. 23, 2020", 18 pgs.

(Continued)

*Primary Examiner* — Folashade Anderson
(74) *Attorney, Agent, or Firm* — Schwegman Lundberg & Woessner, P.A.

(57) ABSTRACT

Disclosed in some examples are methods, systems, devices, and machine-readable mediums that provide an ability for an entity to independently and securely commence, advance, and complete a resource allocation offer in a matter of minutes as opposed to weeks or months after an automated resource pre-committal process. The system, using and incorporating machine learning techniques and algorithms, may have several phases, including a pre-qualification phase, a setup phase, resource pre-committal phase, an import phase, a processing phase, a verification phase, a resource allocation offer phase, and a resource allocation phase in which the system allocates resources to a vendor. The system may also use a qualifying entity as a part of the pre-qualification phase to enter information which can be imported into the resource allocation system application.

20 Claims, 37 Drawing Sheets

(56) References Cited

U.S. PATENT DOCUMENTS

| | | | |
|---|---|---|---|
| 9,406,067 B1* | 8/2016 | Robinson | G06Q 20/4016 |
| 9,607,236 B1 | 3/2017 | Wilbert et al. | |
| 10,664,697 B1 | 5/2020 | Patel et al. | |
| 11,044,106 B2 | 6/2021 | Tomaselli et al. | |
| 11,595,219 B2 | 2/2023 | Tomaselli et al. | |
| 2008/0040259 A1 | 2/2008 | Snow et al. | |
| 2011/0137788 A1 | 6/2011 | Merkle | |
| 2012/0185398 A1* | 7/2012 | Weis | G06Q 20/4015 705/16 |
| 2015/0269433 A1* | 9/2015 | Amtrup | H04N 1/00106 382/115 |
| 2015/0341370 A1 | 11/2015 | Khan | |
| 2017/0116669 A1* | 4/2017 | Wickstrom | G06Q 40/03 |
| 2017/0116679 A1 | 4/2017 | Abraham et al. | |
| 2017/0161826 A1 | 6/2017 | Packer et al. | |
| 2017/0193320 A1 | 7/2017 | Wilbert et al. | |
| 2018/0012171 A1* | 1/2018 | Massabki | G06Q 10/063112 |
| 2018/0040091 A1 | 2/2018 | Kusens | |
| 2018/0260888 A1 | 9/2018 | Paolini-Subramanya et al. | |
| 2019/0066201 A1 | 2/2019 | Berthiaume, Jr. et al. | |
| 2019/0130480 A1 | 5/2019 | Brewbaker et al. | |
| 2019/0156335 A1* | 5/2019 | Safak | G06Q 20/385 |
| 2019/0354606 A1 | 11/2019 | Snow | |
| 2019/0377988 A1 | 12/2019 | Qi et al. | |
| 2020/0051117 A1* | 2/2020 | Mitchell | G06Q 30/0239 |
| 2020/0067705 A1* | 2/2020 | Brown | G06F 21/645 |
| 2020/0252223 A1* | 8/2020 | Tomaselli | G06Q 10/10 |
| 2020/0252224 A1 | 8/2020 | Tomaselli et al. | |
| 2021/0306163 A1* | 9/2021 | Tomaselli | H04L 9/3234 |
| 2022/0070110 A1* | 3/2022 | Dravneek | G06F 9/5027 |
| 2022/0398585 A1* | 12/2022 | Anderson | G06Q 20/4014 |

FOREIGN PATENT DOCUMENTS

| | | |
|---|---|---|
| CN | 111526173 | 8/2020 |
| CN | 115134108 A | 9/2022 |
| IN | 202014004206 | 8/2020 |
| JP | 2022151851 A | 10/2022 |
| JP | 7319417 B2 | 7/2023 |
| WO | 2006079878 | 8/2006 |

OTHER PUBLICATIONS

"U.S. Appl. No. 16/696,704, Response filed Apr. 20, 2020 to Non-Final Office Action mailed Mar. 23, 2020", 14 pgs.

"U.S. Appl. No. 16/696,704, Final Office Action mailed Jul. 22, 2020", 19 pgs.

"U.S. Appl. No. 16/696,704, Response filed Aug. 25, 2020 to Final Office Action mailed Jul. 22, 2020", 16 pgs.

"U.S. Appl. No. 16/432,769, Non Final Office Action mailed Sep. 8, 2020", 11 pgs.

"U.S. Appl. No. 16/696,704, Advisory Action mailed Sep. 9, 2020", 5 pgs.

"U.S. Appl. No. 16/696,704, Response filed Sep. 18, 2020 to Advisory Action mailed Sep. 9, 2020", 15 pgs.

"U.S. Appl. No. 16/432,769, Response filed Nov. 13, 2020 to Non Final Office Action mailed Sep. 8, 2020", 14 pgs.

"U.S. Appl. No. 16/432,769, Final Office Action mailed Jan. 13, 2021", 11 pgs.

"U.S. Appl. No. 16/432,769, Examiner Interview Summary mailed Feb. 16, 2021", 2 pgs.

"U.S. Appl. No. 16/432,769, Response filed Feb. 12, 2021 to Final Office Action mailed Jan. 13, 2021", 13 pgs.

"U.S. Appl. No. 16/696,704, Non Final Office Action mailed Feb. 22, 2021", 21 pgs.

"U.S. Appl. No. 16/696,704, Examiner Interview Summary mailed Mar. 22, 2021", 2 pgs.

"U.S. Appl. No. 16/432,769, Notice of Allowance mailed May 6, 2021", 10 pgs.

"U.S. Appl. No. 17/330,955, Preliminary Amendment filed Jun. 22, 2021", 25 pages.

"Canadian Application Serial No. 3,048,566, Office Action mailed Sep. 15, 2020", 5 pgs.

"Canadian Application Serial No. 3,048,566, Response filed Dec. 23, 2020 to Office Action mailed Sep. 15, 2020", 22 pgs.

"European Application Serial No. 19184806.8, Extended European Search Report mailed Jan. 27, 2020", 9 pgs.

"Japanese Application Serial No. 2019-125145, Voluntary Amendment filed Jun. 7, 2021", (w/ English Translation of Claims), 12 pgs.

"Mexican Application Serial No. MX/a/2019/008176, Office Action mailed Jun. 23, 2021", (w/ English Translation), 17 pgs.

"U.S. Appl. No. 17/330,955, Notice of Allowance mailed Jan. 19, 2023", 11 pgs.

"Mexican Application Serial No. MX/a/2022/003612, Office Action mailed Apr. 20, 2022", w/o English translation, 3 pgs.

\* cited by examiner

REGISTER — 3100
FIRST NAME — 3102
LAST NAME — 3104
TITLE — 3106
MOBILE NUMBER — 3108
EMAIL ADDRESS — 3110
PASSWORD — 3112
CONFIRM PASSWORD — 3114
SUBMIT

*FIG. 31*

COMPANY INFORMATION — 3300

- COMPANY LEGAL NAME — 3302
- TAX ID — 3304
- HQ CITY — 3306
- HQ STATE — 3308

SEARCH

*FIG. 33*

PERSONAL GUARANTORS — 3700

- FIRST NAME — 3702
- LAST NAME — 3704
- EMAIL ADDRESS — 3706
- SSN — 3708
- DATE OF BIRTH — 3710
- PERCENT OWNED — 3712
- MOBILE NUMBER — 3714
- HOME ADDRESS — 3716
- CITY — 3718
- STATE — 3719
- ZIP CODE — 3720
- ADD A SECOND GUARANTOR — 3722
- AUTHORIZED SIGNATURE — 3724
- DATE — 3726
- I AGREE — 3728
- Terms and conditions
- SUBMIT – NO GUARANTORS — 3730
- SUBMIT WITH GUARANTORS — 3732

*FIG. 37*

SYSTEM FOR SECURE AUTOMATED AND ACCELERATED RESOURCE ALLOCATION

CLAIM OF PRIORITY

This application claims the benefit of priority, under 35 U.S.C. § 119(e) to U.S. Provisional Application Ser. No. 63/166,041 filed Mar. 25, 2021 which is hereby incorporated by reference in its entirety.

BACKGROUND

The explosion of network-based computing brought about by the Internet has led to an increase in online services. As mobile internet-connected devices such as smartphones, tablets, and laptop computers have become more popular, many people have turned to applications and websites accessed in the comfort of their own homes or business locations for fulfilling their needs rather than visiting a physical location of a service provider.

SUMMARY

Resource allocation is an example of a service which is largely still done in person via direct communication with physical locations. This is due to the extensive planning and research needed to execute these resource allocations. Traditional resource allocations take a lot of time and require users to wait for resource allocators to move the process along. For example, a traditional allocation process may require a user to meet with an employee of a resource provider to discuss the needs of the user and assess the user's past resource allocation history. Based on this information the employee will provide the user with written, non-digital, resource allocation proposals regarding future resource allocations. From there, the user and the resource provider must negotiate over the terms of the proposal which eventually results in an executed resource grant and the transferring of the requested resources.

The process for resource allocation (e.g., commercial loan financing for equipment purchases or rental), may include a traditional request for proposal, onboarding, and documentation process. In an example of a traditional resource allocation process, once an organization decides to request resources, the organization contacts a resource provider and requests a rate and terms. In this process a resource provider may require a discovery call, and for the organization to sign a non-disclosure agreement before receiving sample terms. After meetings and discovery calls with the resource provider, the organization receives an initial resource allocation proposal (e.g., financing proposal) which is reviewed with the resource provider.

This process involves considerable waste, not only in terms of the time involved (the entire process can take several weeks or even months to complete) but also resources, as interest rates may change between the time the process is initiated and the final contracts are signed. Likewise, the resource requester must devote considerable time to the process which may constitute an opportunity cost to the resource requester. Furthermore, the process wastes paper resources requiring multiple drafts of the proposals and contracts to be drawn up before a final version is executed. Because different decision makers may be located in more than one place, various papers may need to be transported to multiple locations before they can be finalized. Moreover, the traditional solution requires credit underwriting and approval to occur while the process is ongoing before allocation of the resource. This process is limited because each step requires the resource provider to take affirmative actions to advance the process along and gives the resource requester little to no control over the process.

A way to streamline and modernize this process is through use of a resource allocation system, such as an internet or web-based app that provides a borrowing entity, such as a company, business, corporation, partnership, limited liability company, or the like, to independently commence, advance, and complete a resource allocation process (e.g., a commercial loan or commercial lease financing) in a matter of minutes as opposed to weeks or months. Such a system and method may involve the use of multiple devices and machine-readable mediums to execute, implement, or the like, one or more steps in the resource allocation process. Use of an internet-based or web-based system involves security concerns such as identifying the user of the system and verifying that the user of the system is authorized to act on behalf of and bind the borrowing entity. Thus, the resource allocation system may implement one or more security protocols to protect information, data, or the like, submitted to, processed by, used by, or the like, the resource allocation system.

Disclosed in some examples, are methods, systems, devices, and machine-readable mediums that provide for an entity/borrower to commence, advance, and complete a resource allocation process in a matter of minutes. This is accomplished using a resource allocation system in which an entity such as a company can be pre-qualified for resource allocation. This pre-qualification process may be performed by a qualifying entity (e.g., an agent or employee of a third entity, such as a vendor supplying equipment or material to the company). In an alternate example, the pre-qualification may be performed from a website, such as a web-based shopping cart, a web-based onboarding system, or the like).

The prequalification process may include determining a set of historical data describing historical resource management of the second entity from a database. The prequalification process may further include determining a set of resource management pre-committal parameters for the company based on the set of historical data. Once the company is pre-qualified, a notification may be sent, in response to a notification initiation (such as an initiation from the qualifying entity) prompting a user to install the resource allocation system on a device owned or used by the user (e.g., a cell phone, a tablet, or the like, owned or used by the user).

Once the resource allocation system application is installed on the device owned by the user, a first security protocol may include authenticating the identity of the user by comparing a captured image of the user to an image of the user on a validated credential. In response to authenticating the user, the system may create a user profile. In an example, the resource allocation system may prompt the user for the information to be included in the user profile or may create a user profile based on information entered during web-based onboarding or pre-qualification by the qualifying entity. Additionally, or alternatively, the resource allocation system may create a user profile for the user based on information from the validated credential, such as extracting information on the validated credential using optical character recognition techniques. In such an example, the resource allocation system may require, prompt, allow, or the like, the user to verify the information extracted from the validated credential. In an example, the user profile may be created by a combination of extracting information from the validated credential and prompting the user to input information.

The resource allocation system may include a step of determining a resource allocation offer for the company. The resource allocation offer may include offer parameters based upon the resource management pre-committal parameters and the resource allocation parameters determined during the pre-qualification process. This step may be performed by the resource allocation system during or as a part of the pre-qualification process, once the user has completed the first security protocol authentication, once the user has set up a user profile, or at any other suitable point.

The resource allocation system may link at least one of, the information obtained from the qualifying entity regarding the company, the set of historical data, the set of resource management pre-committal parameters, the request for a resource allocation, or the resource allocation offer to the user profile for the user. The system may prompt the user to accept the resource allocation offer on behalf of the company/borrowing entity, the acceptance including a selection of one or more inter-dependent offer parameters by the user (e.g., term, interest rate, lease v. financing, or the like). The resource allocation system may then cause a resource to be allocated for the company/borrowing entity based on the accepted resource allocation offer by the user on behalf of the company.

This represents an improvement in existing graphical user interface devices that have no commercial resource allocation analog, that allows for a pre-committal process in conjunction with an in-system ability to upload and supplement information and digital creation and signing of documents. This is also a more transparent process than the traditional resource allocation process because the first entity can see, up front, all the details about the transaction based on the choices he or she makes regarding structure and interest rate. Further, by saving the contractual documents in a private blockchain, with a hash on a public network, a first entity may be able to immediately access documents when needed (e.g., to verify the details of the loan) as opposed to sending a request to a resource provider (e.g., a bank or other financial institution) to get a signed verification. The blockchain storage provides the first entity with an immutable validated copy of the documents which provides assurances that the documents are the originals and have not been altered.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 31 illustrates an example of a first page of a web-based onboarding registration screen according to some examples of the present disclosure.

FIG. 33 illustrates an example of a first page of a web-based onboarding company information screen according to some examples of the present disclosure.

FIG. 37 illustrates an example of a web-based onboarding personal guarantors screen according to some examples of the present disclosure.

DETAILED DESCRIPTION

Figure 1:
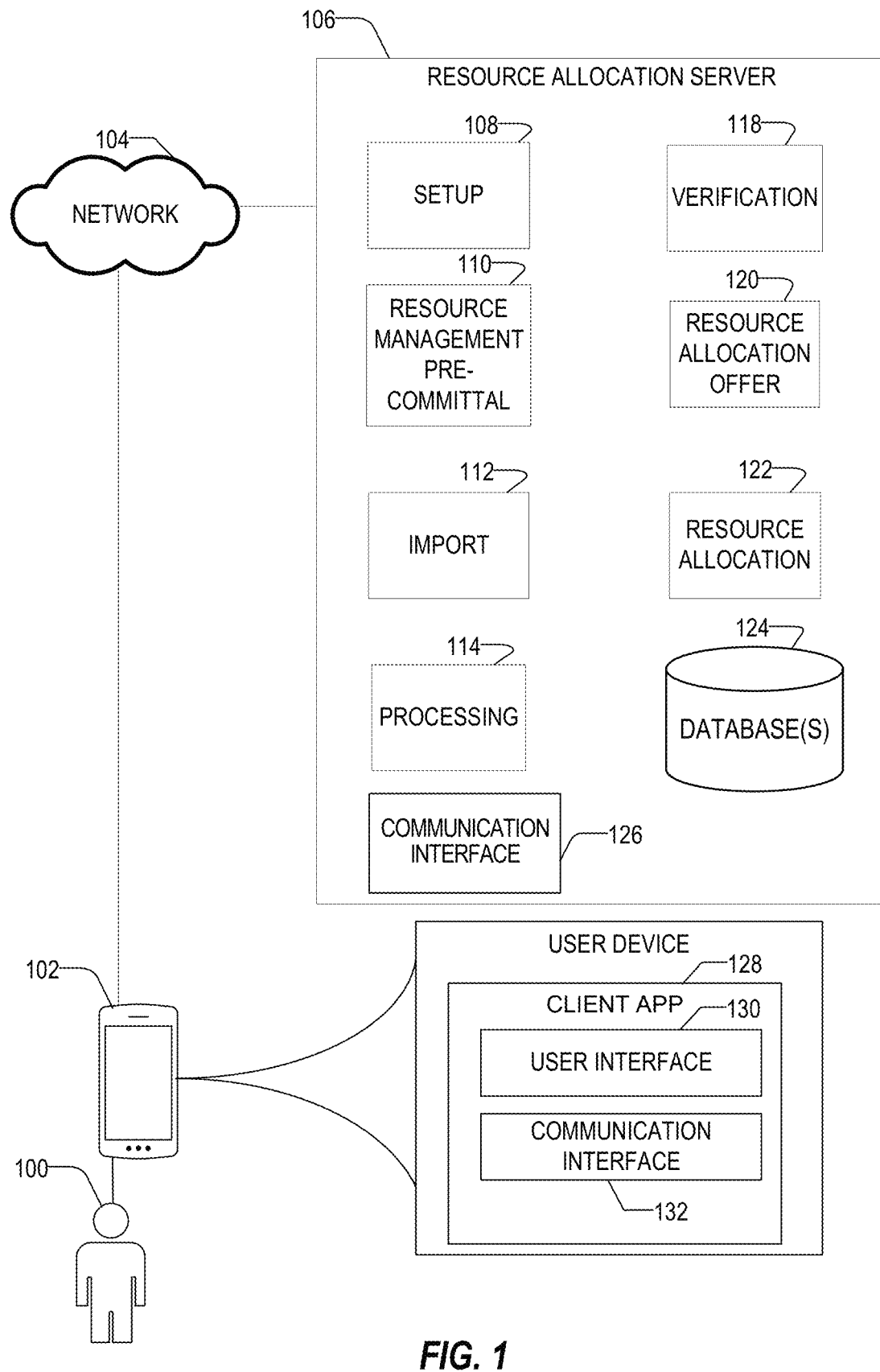
FIGS. 1-3 illustrate variations of a block diagram of an example system for accelerated resource allocation, according to some examples of the present disclosure.

Disclosed in some examples are methods, systems, devices, and machine-readable mediums that provide an ability for an entity (e.g., a borrower) to independently commence, advance, and complete a resource allocation process, such as commercial loan or lease financing, in a matter of minutes as opposed to weeks or months, after an automated resource pre-committal process. This is accomplished using a resource allocation system in which users authenticate with the system, obtain a resource pre-committal, import a resource allocation request, receive a resource allocation offer including one or more inter-dependent offer parameters, select ones of the inter-dependent offer parameters, and receive the resource.

The Qualification and Setup Process

In some examples, a first entity (e.g., a user) acting on behalf of a second entity, may create a profile/account on a first device with the resource allocation system application. The first device may be a mobile phone, a tablet, or the like, on which the resource allocation system application has been downloaded and installed. The first device may be a device that the first entity owns, uses for business purposes, or the like. The first entity may be an agent or employee of a second entity (e.g., a company, business, corporation, partnership, or the like) for which the resource may be allocated to, or on behalf of. This may streamline the resource allocation process substantially because the first entity may obtain a resource pre-committal on behalf of the second entity (e.g., a second entity of which the first entity is affiliated may be pre-approved) before applying for new resources (e.g., new financing).

Such a process allows the first entity to have more control over the process as the first entity may immediately see options for resource allocations (e.g., such as loan term duration and interest rates). This may allow the first entity to lock in certain terms of the resource allocation (such as an interest rate) without the risk that it will change while the negotiation process of a traditional resource allocation proceeds. Similarly, having documentation of the resource allocation generated instantaneously may allow the transaction to be completed without the traditional back-and-forth negotiation required when working with a resource provider. Depending on whether the first entity wishes to review the documentation in detail prior to acceptance, the entire process may be completed in a matter of minutes or days.

In an example, a purchase by the second entity may be pre-qualified prior to the first entity using the resource allocation system. For example, a qualifying entity, who may be an agent or employee of a third entity (e.g., a vendor or a manufacturer providing material or equipment to the second entity), may enter information corresponding to the second entity, transaction details (e.g., transaction amount) related to the purchase, or the like, into a web browser, web portal, or application, or any similar web-based onboarding system on an alternate device. The qualifying entity may then choose the second entity's name from a list of company names and a historical data profile for the second entity, which may include a credit profile for the second entity. The qualifying entity may then initiate, cause, or the like, a notification to be sent to the first entity prompting the first entity to install the resource allocation system application on the first device.

In an example, the qualifying entity may enter the details of a specific transaction, such as an equipment description, an equipment cost, an equipment condition (e.g., new or used), a down payment amount, an amount to finance, or the like. Additionally, or alternatively, the qualifying entity may upload a resource allocation request (e.g., an invoice), setting out the details of a specific transaction.

When the system qualifies the transaction, the qualifying entity may be presented with offer parameters, which may include financing terms such as a rate of interest, duration, or the like, to present to the first entity. The qualifying entity may cause the system to send a notification to the first entity (e.g., a text message containing a link) that will allow the first entity to download the resource allocation system application, and when the resource allocation system application is set up on the first entity's device, the details of the transaction along with a resource allocation offer may be presented to the user/first entity for acceptance on behalf of the second entity.

In an example, the pre-qualification may be initiated by the first entity, another agent or employee of the second entity, or the qualifying entity through a web-based onboarding system, as shown and discussed in FIGS. 30-37 below. The first entity may initiate the process of setting up a user profile by entering his or her name, title with the company/second entity, phone number, email address, or the like. The first entity may then enter the company information for the second entity (e.g., the legal name of the company, a tax identification number for the company, a location of the headquarters, principal place of business, place of incorporation, or the like). In an example, the resource allocation system may attempt to match the information for the second entity with a company name and address obtained from a database such as a state-run company registration database (e.g., secretary of state company/incorporation records, or the like), a business database maintained by a third-party private company/entity (e.g., DUN AND BRADSTREET®), or the like. In an example, the web-based onboarding may prompt the user to select a resource allocation profile for the company. The resource allocation profile may include, for example, a resource allocation score (e.g., a credit score) obtained from a third-party (such as a credit reporting agency, or the like). The resource allocation profile may also include a lien history, judgment history, number of years in business, bill payment history, or the like, or any combination thereof, of the company.

The Resource Allocation System Application

Figure 2:
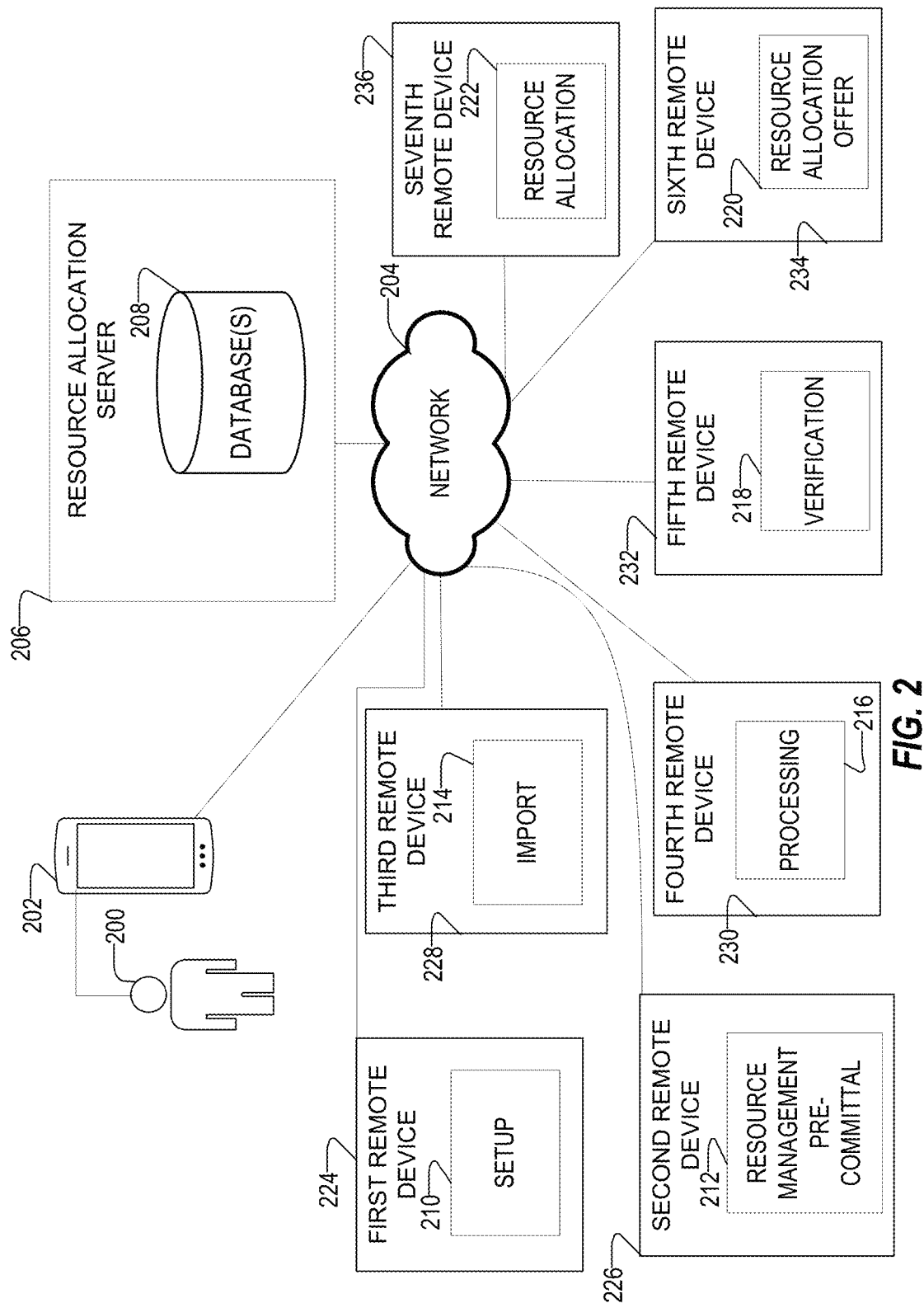
Figure 3:
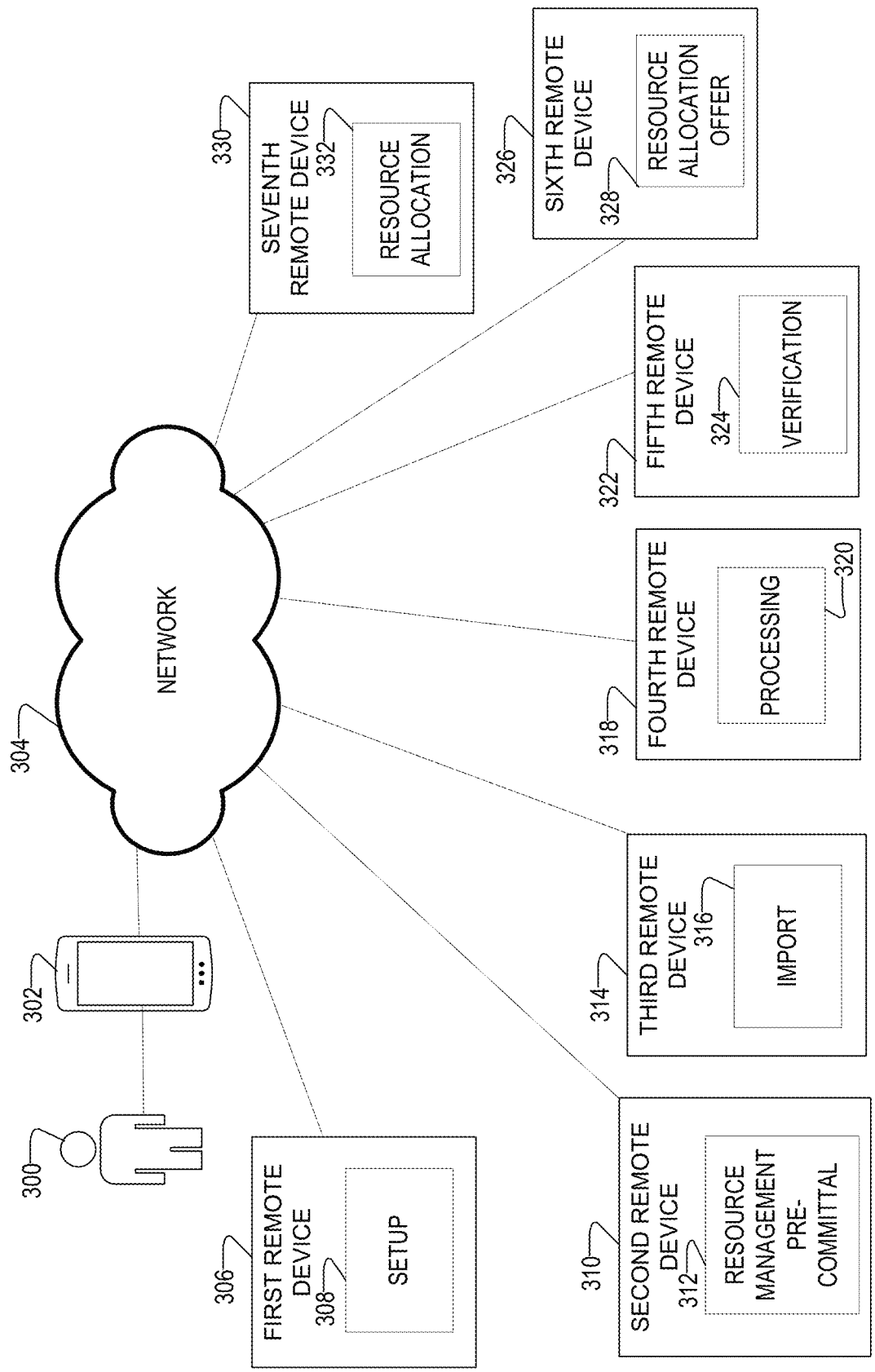

FIGS. 1-3 illustrate variations of a block diagram of an example system for accelerated resource allocation according to some examples of the present disclosure. In the example of FIG. 1, a first entity (e.g., a user) 100, using a user device 102 such as, for example, a smart phone or tablet may connect to a resource allocation server 106, over a network 104. In some examples, the network 104 may include a local area network (LAN), a wide area network (WAN), the Internet, or the like. The user device 102 may include a client app (the resource allocation system application) 128 which may be downloaded over the network 104. The client app 128 may include a user interface 130 which the user 100 may implement any one or more of the user interfaces shown in FIGS. 13-26, or any similar user interfaces. The client app 128 may also contain a communication interface 132 which may connect to the network 104, or the communication interface 126 on the resource allocation server 106.

In this example, the resource allocation server 106, may be a machine such as described in FIG. 28 below, and may contain a database 124 in which information regarding the entities (e.g., user profiles) or documents such as invoices and copies of executed contracts may be stored. The server may also be configured to execute functionality such as a setup phase 108, a resource management pre-committal phase 110, an import phase 112, a processing phase 114, a verification phase 118, a resource allocation offer phase 120, and a resource allocation phase 122. The resource allocation server 106 may further include a communication interface 126, which may communicate with the communication interface 132 within the client app 128 on the user device 102.

In the example of FIG. 2, such as in the example of FIG. 1, a first entity 200 using a device 202, may connect to a resource allocation server 206 through a network 204. In some examples, the network 204 may include a local area network (LAN), a wide area network (WAN), the Internet, or the like. In this example, the resource allocation server 206, may contain a database 208, in which entity information (such as user profiles), documents (such as invoices and contracts) may be stored. In such a configuration, the resource allocation server may connect, through the network, to other external/remote devices and services (e.g., for example, a file sharing service, an electronic signing service, or the like) that may provide one or more aspects of the functionality of the system. For example, a first remote device 224 may initiate the setup phase 210, a second remote device 226 may initiate the resource management pre-committal phase 212, a third remote device 228 may initiate the import phase 214, a fourth remote device 230 may initiate the processing phase 216, a fifth remote device 232 may initiate the verification phase 218, a sixth remote device 234 may initiate the resource allocation offer phase 220, and a seventh remote device 236 may initiate the resource allocation phase 222.

In the example of FIG. 3, the first entity 300 may connect to a network 304 through a device 302 as described above for FIGS. 1 and 2. In some examples, the network 304 may include a local area network (LAN), a wide area network (WAN), the Internet, or the like. As opposed to FIG. 2, in which a resource allocation server 206 containing one or more databases 208 is connected to a network 204 which, in turn, is connected to the remote devices 224, 226, 228, 230, 232, 234, and 236, in FIG. 3, each remote device 306, 310, 314, 318, 322, 326, and 330, connect to the user device 302, through the network 304 without a separate server.

In this example as in the example of FIG. 2, a first remote device 306 may initiate the setup phase 308, a second remote device 310 may initiate the resource management pre-committal phase 312, a third remote device 314 may initiate the import phase 316, a fourth remote device 318 may initiate the processing phase 320, a fifth remote device 322 may initiate the verification phase 324, a sixth remote device 326 may initiate the resource allocation offer 328, and a seventh remote device 330 may initiate the resource allocation phase 332. The phases 308, 312, 316, 320, 324, 328, and 332 may be entirely performed via sources or applications (such as a file sharing service, an electronic signing service, or the like) connected to the network 304. It is possible that the system described herein may be implemented in any one or a combination of the configurations as shown in FIGS. 1-3.

Figure 4:
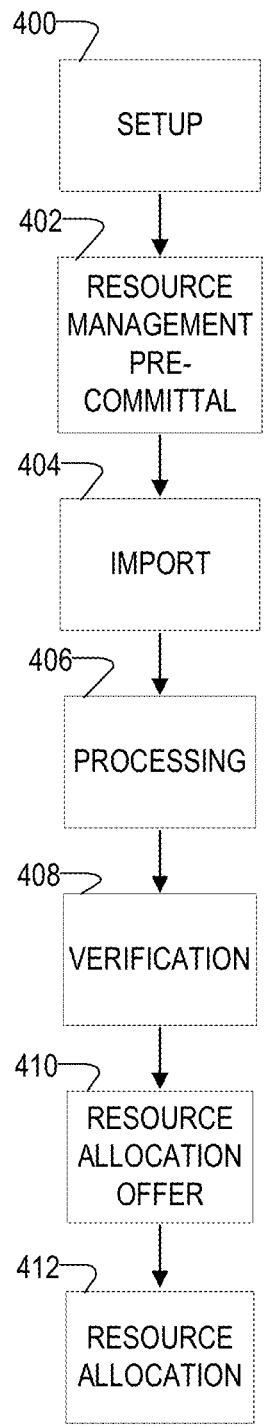
FIG. 4 illustrates a flow chart of a method of accelerated resource allocation phases, according to some examples of the present disclosure.

FIG. 4, illustrates a flow chart of a method of accelerated resource allocation phases according to some examples of the present disclosure. These may consist of a setup phase 400 and resource management pre-committal phase 402 where a first entity (e.g., a user) creates an account and verifies his or her identity, and identifies a second entity (e.g., a company, business or organization) the first entity is affiliated with. An import phase 404 and processing phase 406 in which resource allocation requests (e.g., documents such as invoices) are imported into the system and processed to determine transaction details. In an example, the resource management pre-committal phase 402 may be initiated from a website of a third entity (e.g., a vendor, manufacturer, or the like) from whom material or equipment is being purchased for the second entity. For example, a transaction may be initiated by the first entity from a web-based shopping cart on a website or through a shopping application associated with the third entity. When the first entity selects, chooses, or the like, an option to finance a purchase of material or equipment on behalf of the second entity from the shopping cart, the first entity may be prompted to enter his or her mobile/cell phone number, or an email address to which a link to download the resource allocation system on his or her device may be sent. The first entity may be further prompted to enter the name of the second entity and the city and state of the second entity's headquarters, principal place of business, place of incorporation, or the like, and then prompted to choose the second entity's name from a list of company names retrieved from a database connected to a second alternate device (e.g., a server of a private or governmental agency that maintains business/company name and registration information) over a network, such as a local area network (LAN), a wide area network (WAN), the Internet, or the like. Similarly, the qualifying entity may select a historical data profile for the second entity, which may include a credit profile for the second entity) from a second database connected to a third alternate device (e.g., a server of a credit reporting agency) over the network.

The system may then, in the import phase 404, import the transaction details (e.g., equipment type, equipment price, taxes, fees, total price, or the like) from the web-based shopping cart. This may be done in conjunction with, or in lieu of, other import options as described in FIG. 7, below.

The system may then, based on the information pertaining to the second entity determine a set of resource management pre-committals as described in FIG. 5 below, for the second entity, and determine resource allocation options and present the resource allocation options to the first entity as described in FIG. 9 below, and create a resource allocation offer based on the selected resource allocation option, which the first entity can accept and sign on behalf of the second entity, as described in FIG. 10, below.

The system may further include a verification phase 408 where the first entity verifies the details of the transaction and selects interest rate and duration. A resource allocation offer phase 410 in which the system delivers a copy of a resource allocation offer (e.g., a contract) with the resource allocation (e.g., financing) terms to the first entity, and the first entity digitally signs the contract on behalf of the second entity, and a resource allocation phase 412 in which the system makes payment based on the terms of the resource allocation offer.

Figure 5:
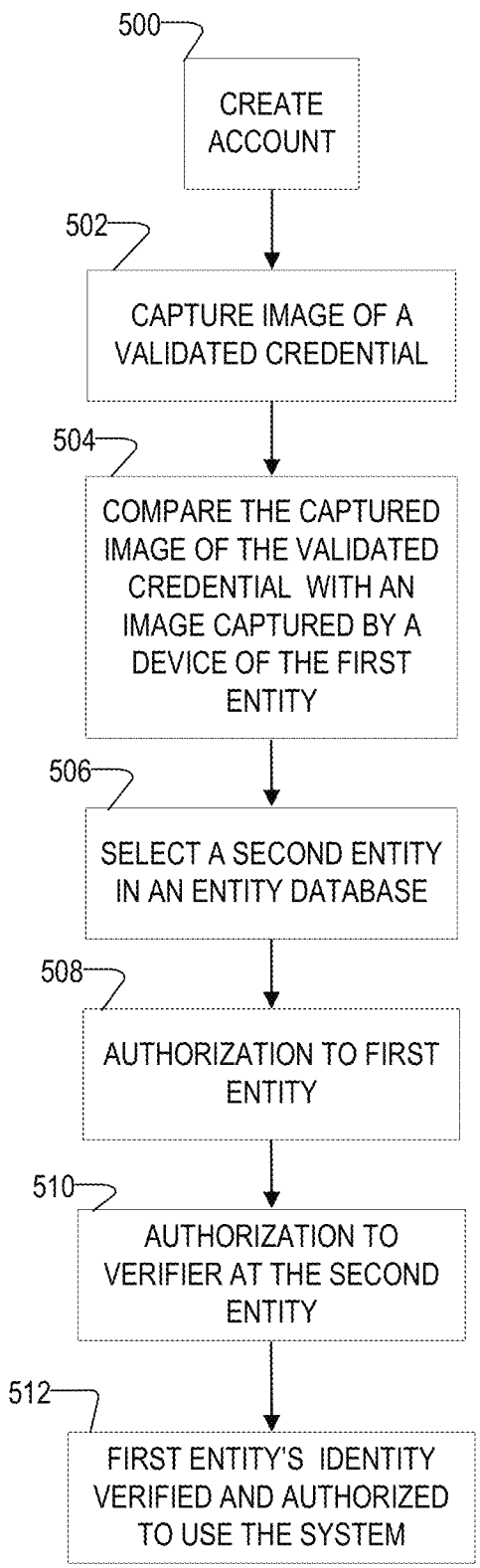
FIG. 5 illustrates a flow chart of a setup phase for an accelerated resource allocation system, according to some examples of the present disclosure.

FIG. 5 illustrates a flow chart of a setup phase for an accelerated resource allocation system according to some examples of the present disclosure. FIG. 5, is one example implementation of setup phase 400 of FIG. 4. In some examples, in the setup phase, a first entity (e.g., a user) may be prompted to create an account, at a create account step 500. This may consist of a number of steps as described for FIG. 14 below. This may also include the first entity entering biographical details (e.g., a name, geographic address, an email address, or the like). In some examples the first entity may be prompted to create an account immediately after accessing the system on a device (such as through an application downloaded to a mobile device). This may be prompted upon downloading and immediately opening the application. In another example, the account setup step 500 may be accessed through a create account link on a home screen or home page of the application.

Figure 15:
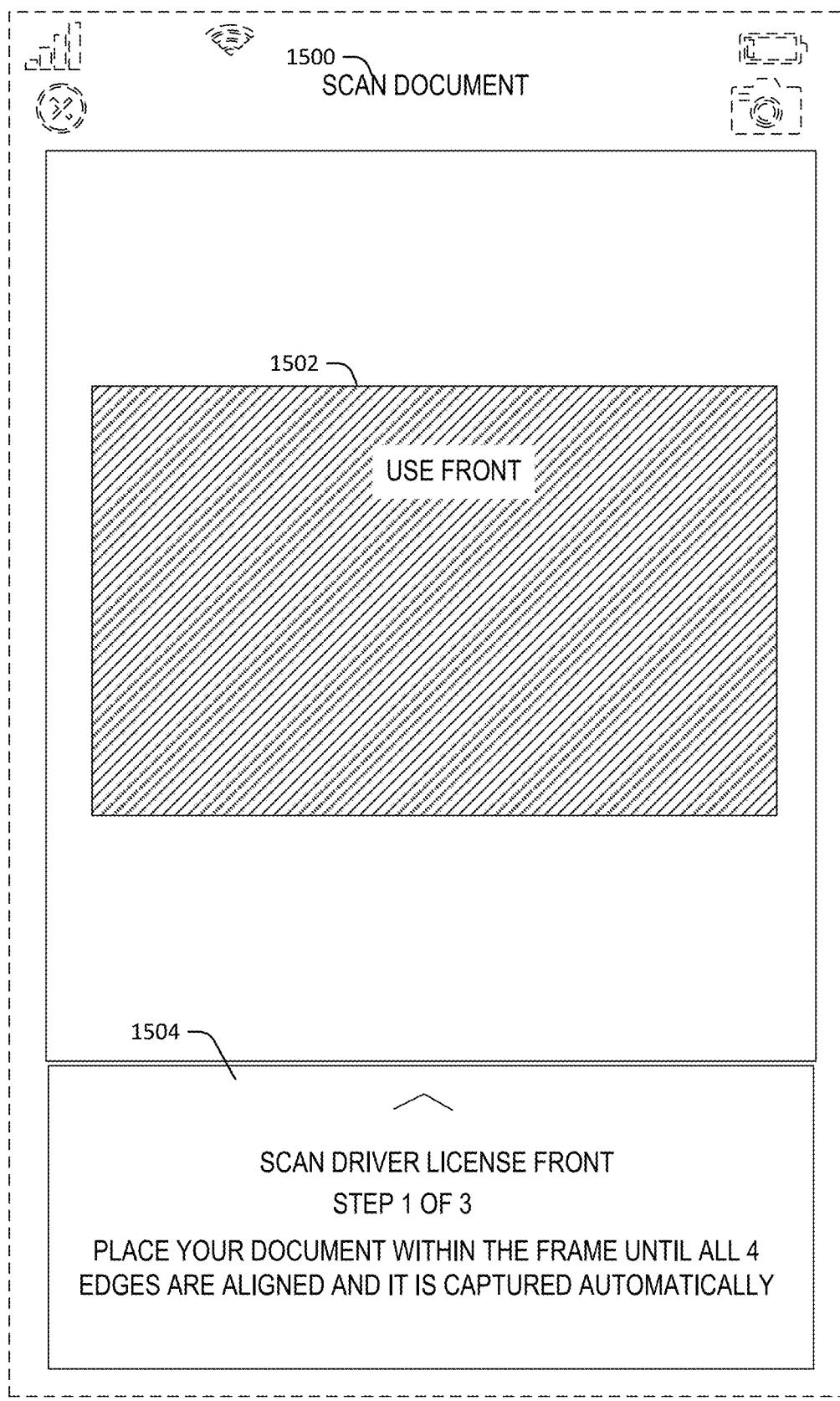
FIG. 15 illustrates a UI of an identification scan page, according to examples of the present disclosure.

The first entity's identity may be verified through a two-part process that represents a first security protocol. The first step may include a step in which the system may capture an image of a validated credential 502. For example, the first entity may be presented with a screen such as shown in FIG. 15 in which the first entity may upload a picture of a government issued identification which contains a biometric (e.g., photograph) of the first entity (e.g., a state-issued driver's license or identification card, a military identification, or a passport). The system identifies, in the image of the government issued identification, a biometric (e.g., a photo of the person's face); information about the first entity such as a name, address, distinguishing physical characteristics, or the like; an id number such as a driver's license number or information from a barcode of the identification (this may require scanning one or both sides of the identification). Some of this information may be used to verify a validity of the identification by submitting the information to a third-party database (e.g., a government database). For example, barcode information of the identification may be sent to an identity database over a network. Information returned may confirm a validity of the identity. In other examples, the information returned may be additional information from the identification (e.g., a name, address, and distinguishing features of the identity card that matches the barcode information). This information may then be matched to the information extracted from the picture to ensure a match. If the information matches, or if the identity database returns that it is a valid identity, then the first entity may be authenticated. If the first entity is not authenticated the first entity is rejected, and the process may end.

In the second step, the system may also validate that the identification used belongs to the first entity of the application by comparing the captured image of the validated credential with an image captured by a device (e.g., a mobile phone) of the first entity (e.g., the user) 504. In step 504, the image may include a biometric captured by a user device executing the system software with the biometric on the government issued identification. For example, the camera on the first entity's phone may capture their face in a capture sequence. The capture sequence may verify that the first entity is not holding up a picture (for example, in an attempt to "trick" or otherwise deceive the system or get around the validation step) by asking for a number of poses of the first entity. For example, the system may require the first entity to take a picture from different angles (such as from a side, straight on, or the like) or different facial expressions (e.g., a smile or a neutral expression). This may allow the system to ensure that the first entity is an individual. If the system fails to validate the identification used belongs to the first entity in this second step, the system may reject the first entity as one authorized to use the system and may discontinue the setup phase, or otherwise not allow use of the system.

In some examples, once the first entity is verified, the first entity may proceed to a step 506 to select a second entity from a database, matching the entity of which the first entity is associated. The database may be the databases 124 or 208 in FIGS. 1 and 2, or another database connected to the network, such as the networks 104, 204, and 304 in FIGS. 1-3. In some examples, the networks 104, 204 and 304 may include a local area network (LAN), a wide area network (WAN), the Internet, or the like The second entity may be an organization (e.g., corporation, company, or other business organization) with which the first entity is affiliated. In some examples, there may be a database such as the databases 124 or 208 in FIGS. 1 and 2, or another database connected to the network, such as the networks 104, 204, and 304 in FIGS. 1-3, of valid organizations that may be indexed by organization identification and/or name. The first entity may select one of the organizations in the database.

Figure 16:
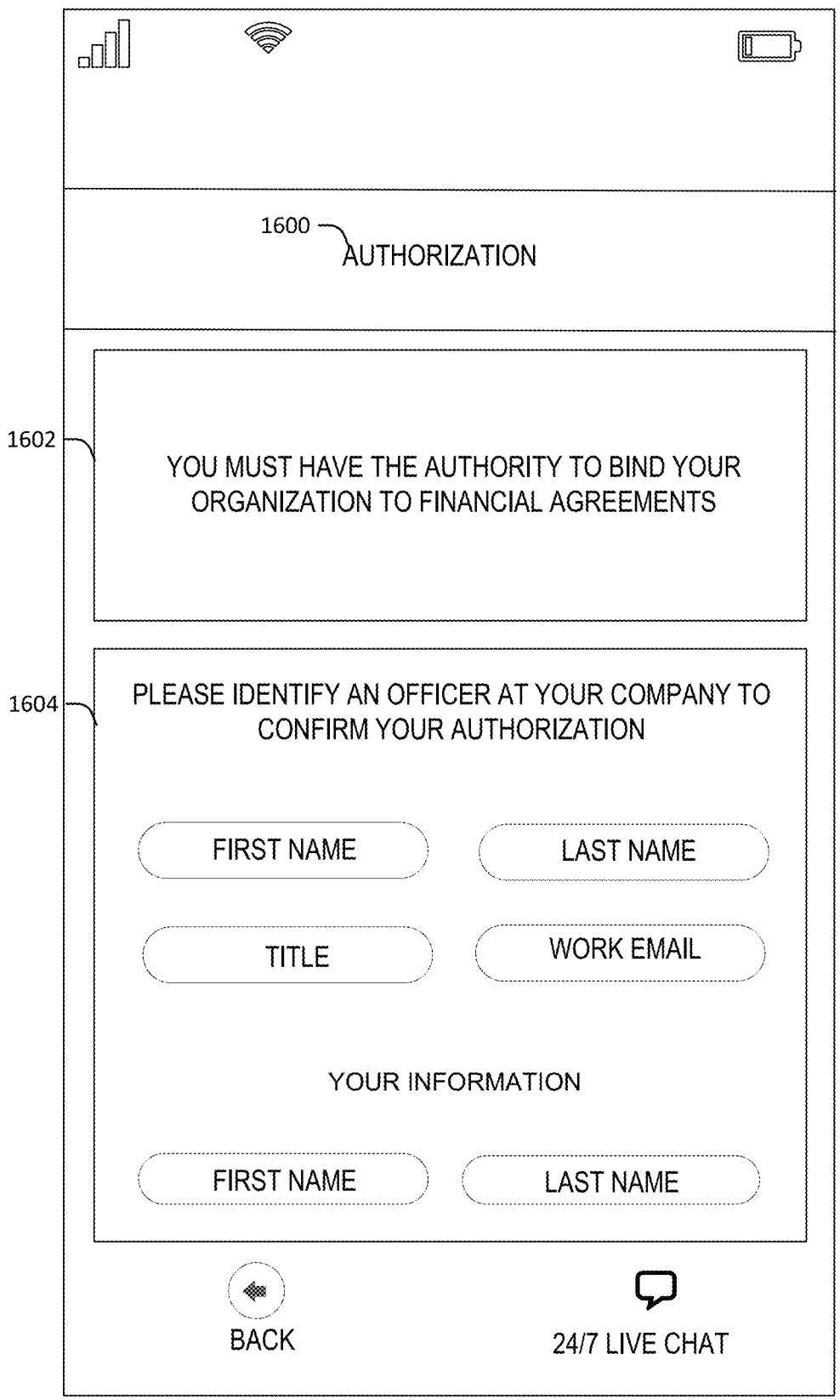
FIG. 16 illustrates a UI of a first entity authorization page, according to examples of the present disclosure.

Once a verified organization is selected, at operation 508, the first entity may be presented with an authorization screen, such as shown in FIG. 16 below, in which the first entity enters the name and email address of a verifier (e.g., executive, officer, director, vice president, or president) with the second entity. In some examples, to confirm that the verifier is with the organization, one or more domain rules may be enforced on the entered email. For example, the organization database may have information on email domains associated with the organization. In these examples, the email address entered may be restricted to domains associated with the organization. In other examples, certain domains known to be used for personal email addresses may be blacklisted. For example, the domains yahoo.com, gmail.com, hotmail.com, or other similar domains.

Once the first entity completes the information on the authorization screen, the system may proceed to a step where the authorization is sent to the verifier at the second entity 510. In this step, the system may generate and forward over a network a digital authorization (e.g., a certificate of incumbency) to the verifier, as a second security protocol, which attests that the verifier is an authorized representative of the organization and that the verifier attests that the first entity has authority to act on behalf of the organization.

In a final step of the setup phase 512, the first entity's identity is verified and authorized to use the system. This step may consist of the verifier digitally signing the authorization acknowledging the first entity's authority to bind or act on behalf of the organization, the first entity may be considered by the system as an authorized user, able to upload resource allocation requests to the system and request resource allocation.

In some examples, the system may also allow for an additional user or users to be added as authorized users. In this example, an authorized first entity is presented with a certificate of incumbency to authorize the additional user. In another example, there may be different levels of permissions, which gives an additional user access to only certain features of the system. For example, the additional user may only be able to upload documents to the system, but not submit the documents, or digitally sign contracts. Alternatively, the additional user may have full access to the system with the ability to submit documents, select terms, and complete transactions.

Figure 6:
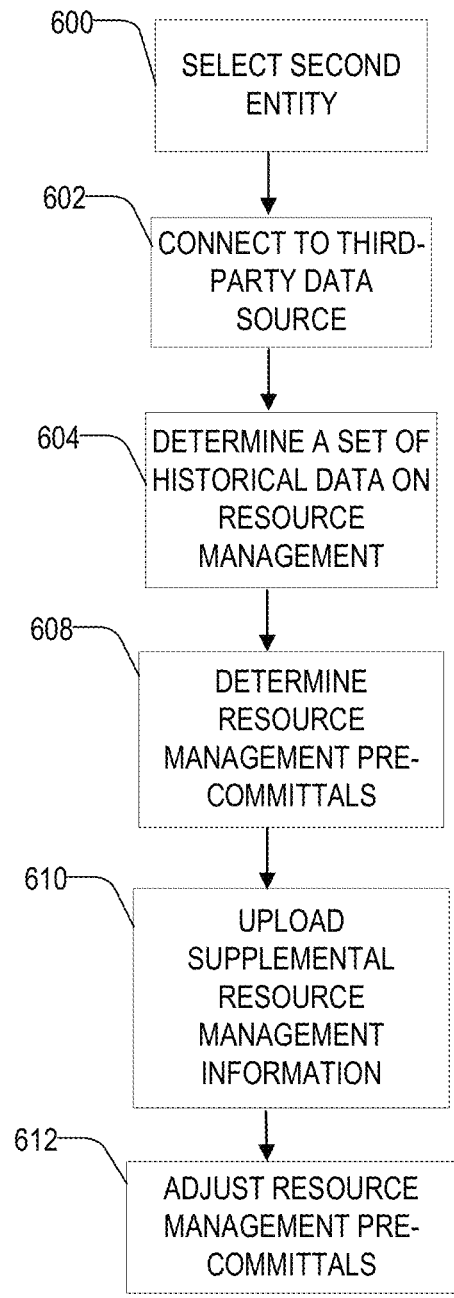
FIG. 6 illustrates a flow chart of a resource management pre-committal phase for an accelerated resource allocation system, according to some examples of the present disclosure.

FIG. 6 illustrates a flow chart of a resource management pre-committal phase for an accelerated resource allocation system according to some examples of the present disclosure. FIG. 6 is one example implementation of resource management pre-committal phase 402 of FIG. 4. This phase may be implemented separately or in conjunction with the setup phase 400 of FIG. 4, and as described for FIG. 5 above. An initial step in the resource pre-committal phase may be to select a second entity 600. In an example, step 600 may be done in conjunction with operation 506 of the setup phase. In another example, the first entity may act as a first entity for multiple second entities. In such an example, the first entity may perform operation 600 by selecting a particular one of a second entity from a list of second entities.

At operation 602, the system may connect to a third-party data source. This may allow the system to determine a set of resource management pre-committals at operation 608. These pre-committals may include parameters such as resource allocation limits for the entity (e.g., a credit limit), term limits, rate modifiers (e.g., interest rate modifiers), or the like. These parameters may be determined based on a set of historical data on resource management obtained at operation 604, which may include the past resource allocation data (e.g., credit history) of the second entity obtained from one or more third-party data sources such as credit reporting agencies, social networking services, business databases (e.g., DUN AND BRADSTREET®), or the like. In some examples, the system may connect to the third-party data sources at operation 602 over a network to get information regarding the organization (e.g., credit score, liens, judgments, revenue, years in business, number of employees, or paid indicators (how likely the organization is to pay on time)) which may make up a portion of the set of historical data on resource management determined at operation 604, and which will be sent to the system's server over a network.

The system may then process the information obtained from the third-party using an algorithm (e.g., a linear function, a logistic regression function, or the like) to determine pre-committal parameters, which may be used to determine a set of resource management pre-committals (e.g., an initial level of financing, an initial rate of interest, or the like) at operation 608 for the second entity. In an example, the pre-committal parameter may be one or more scores. In an example, the one or more scores may be assigned to the second entity based on the information contained in the set of historical data on resource management. In an example, the one or more scores may be based on a combination of the items contained in the set of historical data. For example, one score may be based on a number of liens against the second entity and the number of years the second entity has been in business. Additionally, or alternatively, a score may be based on the combination of an amount of revenue of the second entity and the credit score of the second entity. It is understood that scores may be determined based on any combination of items in the historical data, and that certain items in the historical data may weigh differently in the score calculation than other items in the historical data.

In another example at operation 610, the user may upload supplemental resource management information (e.g., a profit and loss statement) directly into the system. The system may then automatically process the documents by applying an OCR process to the document to convert an image to text. The system may then utilize a natural language analysis to determine what the document is (e.g., a profit and loss statement, income statement, bank statement, or the like), and to extract relevant financial fields. These relevant financial fields may then be used in operation 612 to adjust the pre-committal parameters for the organization. This may allow the organization to obtain adjusted resource management pre-committals (e.g., a lower interest rate and/or an increased level of financing). In an example, the system may update the pre-committal parameters and repeat operation 612 to adjust the resource management pre-committals at predetermined intervals (e.g., quarterly) and adjust the organization's resource management pre-committals.

Figure 7:
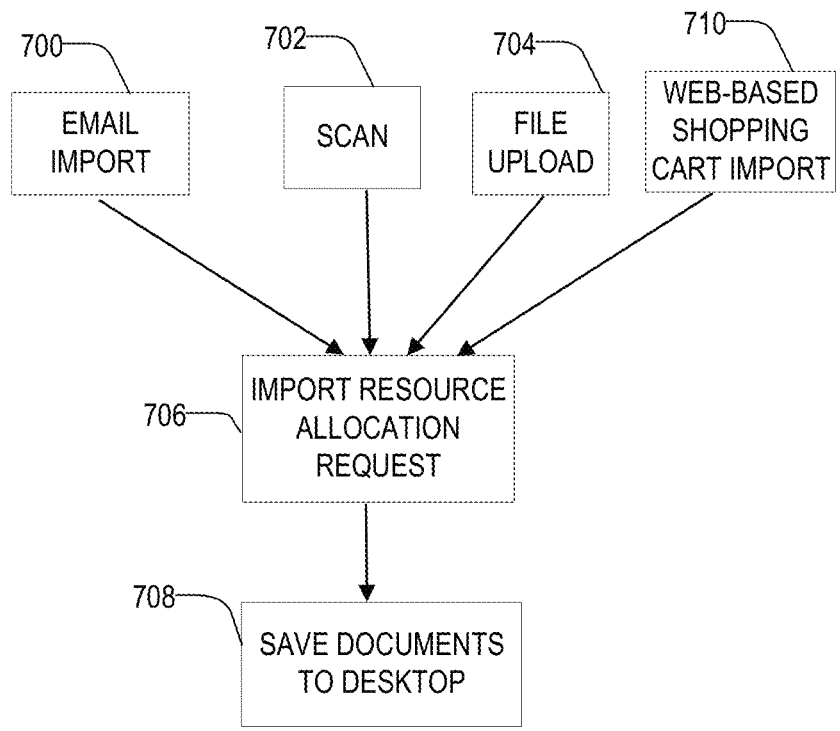
FIG. 7 illustrates a flow chart of an import phase for an accelerated resource allocation system, according to some examples of the present disclosure.
Figure 17:
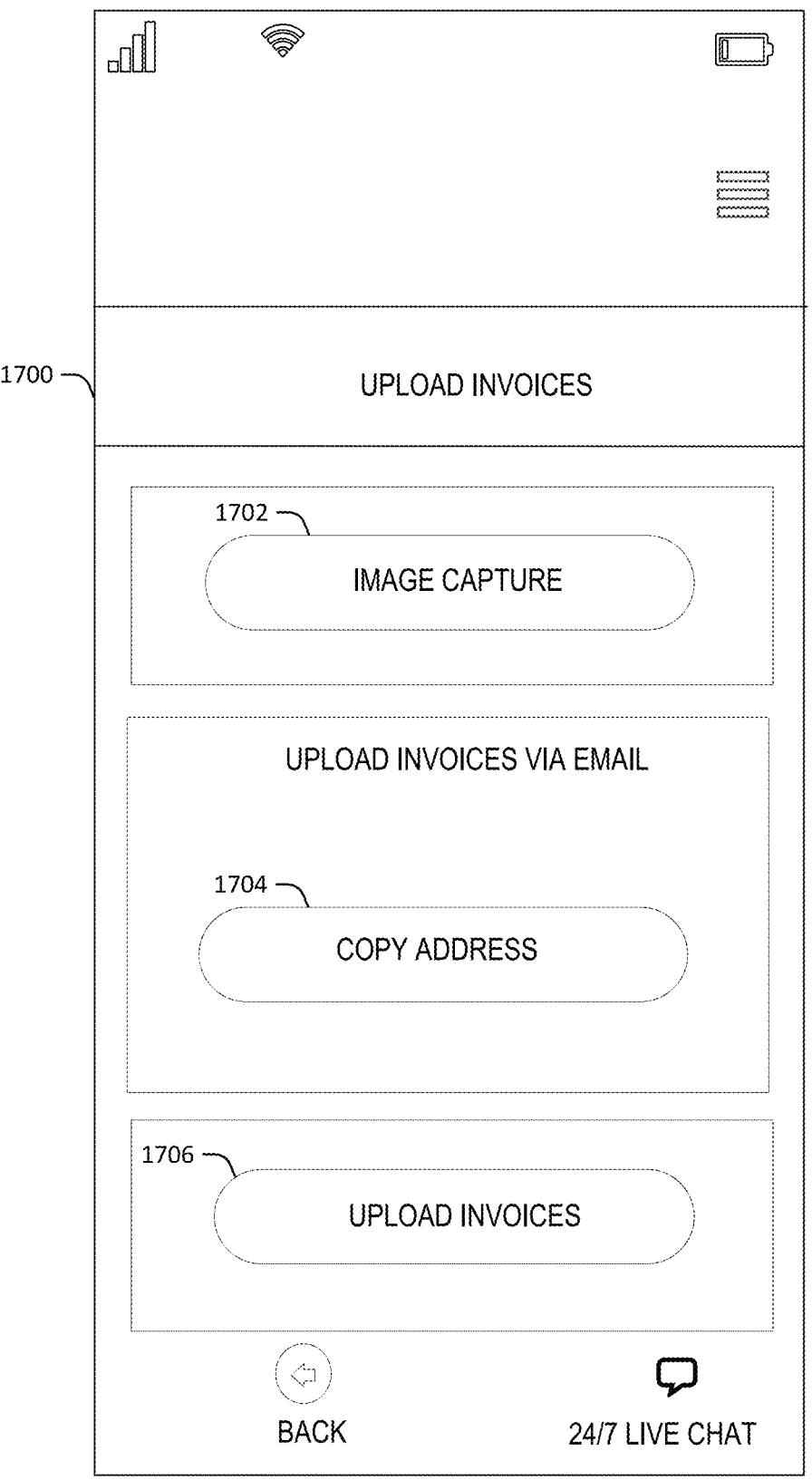
FIG. 17 illustrates a UI of a resource allocation request import page, according to some examples of the present disclosure.

FIG. 7 illustrates a flow chart of an import phase for an accelerated resource allocation system according to some examples of the present disclosure. FIG. 7 is one example implementation of import phase 404 of FIG. 4. In the import phase, a first entity whose identity is verified in the resource pre-committal phase may import a resource allocation request 706 (e.g., documents such as an invoice or equipment lease) on behalf of the second entity into the system. The documents may be imported into the system in several different ways, through a user interface as shown in FIG. 17. This may include importing documents through operation 702, via scan. In this example the documents may be scanned through the camera on a smartphone, tablet, or other handheld device. Another mechanism through which documents may be imported is through file upload 704, or email import 700. For example, a first entity may email a document as an attachment to an email address associated with the resource management system. A first entity who chooses email import 700 to import documents may be presented with a user interface such as in FIG. 18, which may instruct the first entity how to import documents through email import 700.

In other examples, the file upload may allow first entities to select one or more documents to upload. Resource allocation requests 706 imported via email import 700 or file upload 704 may include scanned images of original documents (such as a scanned PDF, JPEG, or other like image file) or an original word processing, PDF, or other like text file. In still other examples, other forms of importing may be used. For example, a first entity may separately upload a document to a file-sharing service and may share the document with an email address associated with the resource management service. In other examples, a first entity may obtain a HyperText Transfer Protocol (HTTP) link to the document on the file-sharing service and may submit the link to the resource management service.

In another example, the resource allocation request 706 may be imported from a web-based shopping cart 710. For example, the first entity may select material or equipment for purchase or lease on behalf of the second entity on a web site associated with a vendor, retailer, manufacturer, or the like, from which the second entity is purchasing or leasing the equipment. During a check-out process, when the first entity selects to finance the transaction, transaction details such as equipment type, equipment price, taxes, fees, total price, or the like, may be extracted from the web-based shopping cart 710 and a resource allocation request 706 may be created and imported into the system.

When the resource allocation request 706 is imported from a web-based shopping cart 710, but the first entity has not yet downloaded, installed, or onboarded the resource allocation system application on his or her device, the first entity may be required to complete one or more of the steps regarding the setup, verification, and authorization steps detailed in FIG. 4 or 5 prior to completing the transaction on the third entity's website (e.g., before completing the checkout process). In such an example, a notification (e.g., a link in a text message or an email message) may be sent to the first entity that will allow the first entity to download the resource allocation system application over a network such as a local area network (LAN), a wide area network (WAN), the Internet, or the like, on his or her device, and instruct the first entity to complete the setup, authorization, and verification steps. Alternatively, the transaction on the third entity's website may be completed prior to the first entity performing the setup, verification, and authorization steps in the resource allocation system application, but resources may not be allocated until the first entity completes the setup, verification, and authorization steps in the resource allocation system application.

In an example, the web-based shopping cart 710 may create, set up, or the like a stub-account, a pre-setup account, or the like, in the resource allocation system application, that is then completed by the user/first entity in the resource allocation system application. In an example, the pre-setup account may at least initiate, start, begin, or the like one or more of the steps of the phases illustrated in, and discussed in the corresponding text for FIGS. 4-6 above. In an example, at least some of the steps in the phases of FIGS. 4-6 may be entirely completed by the pre-setup account created by the web-based shopping cart 710, while other steps may be partially completed by the pre-setup account and partially completed by the user/first entity in the resource allocation system application. In an example, one or more of the steps partially or fully completed by the pre-setup account may require verification by the user/first entity within the resource allocation system application to verify for accuracy, agree to the information provided, or the like.

Figure 22:
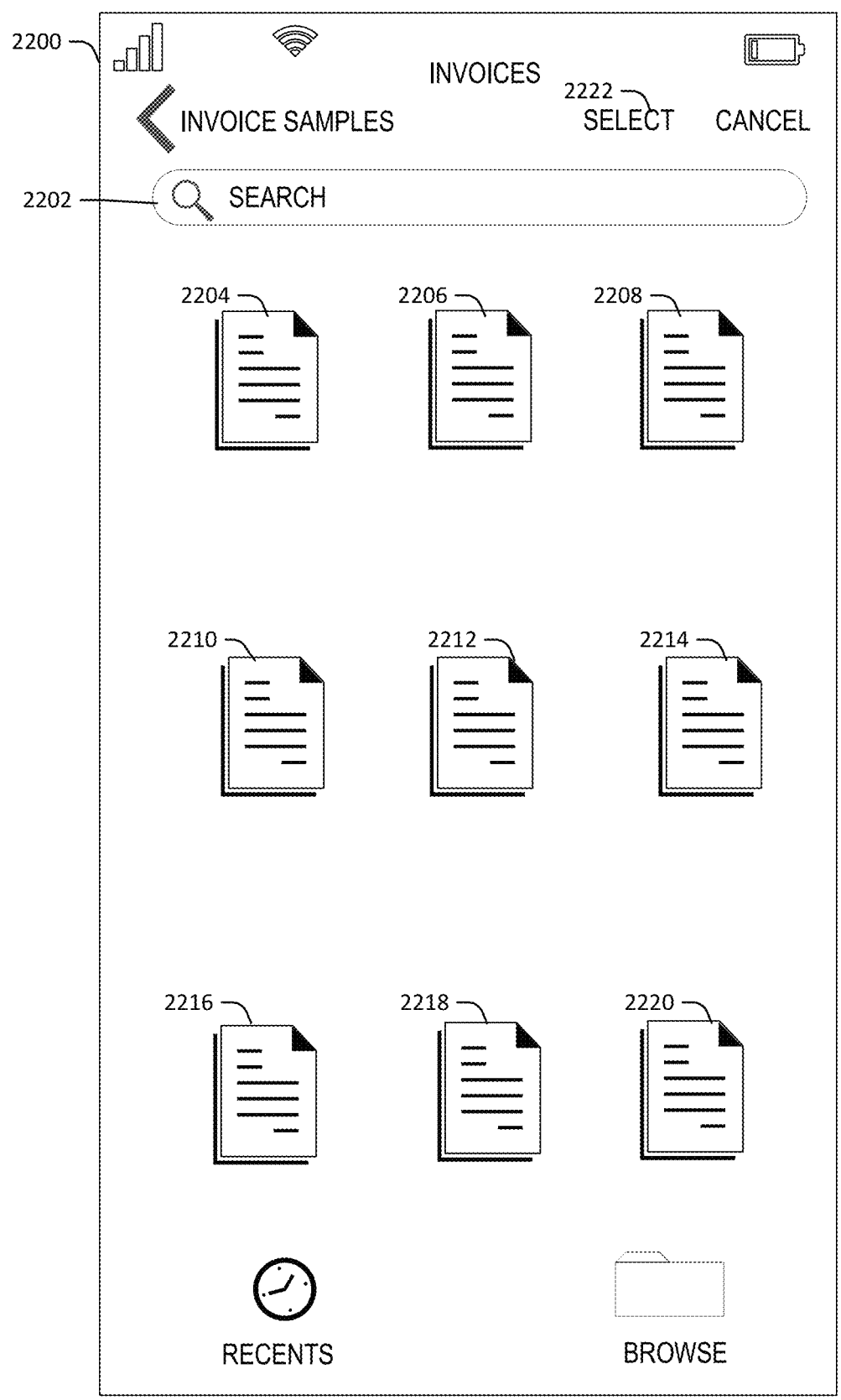
FIG. 22 illustrates a UI of an imported resource allocation request dashboard according to some examples of the present disclosure.

At operation 708, once the resource allocation request documents are imported into the system, the documents may be saved to the dashboard or desktop on the system, such as shown in FIG. 22. First entities may browse through and view uploaded/imported documents. In some examples, the documents may be stored by the system on a database, such as the databases 124 or 208 in FIGS. 1 and 2. In another example, the database may be connected to a network, such as the networks 104, 204, and 304 in FIGS. 1-3. In such an example the database may be managed and operated by the system or by a third party—for example, a network-based file sharing service.

Figure 8:
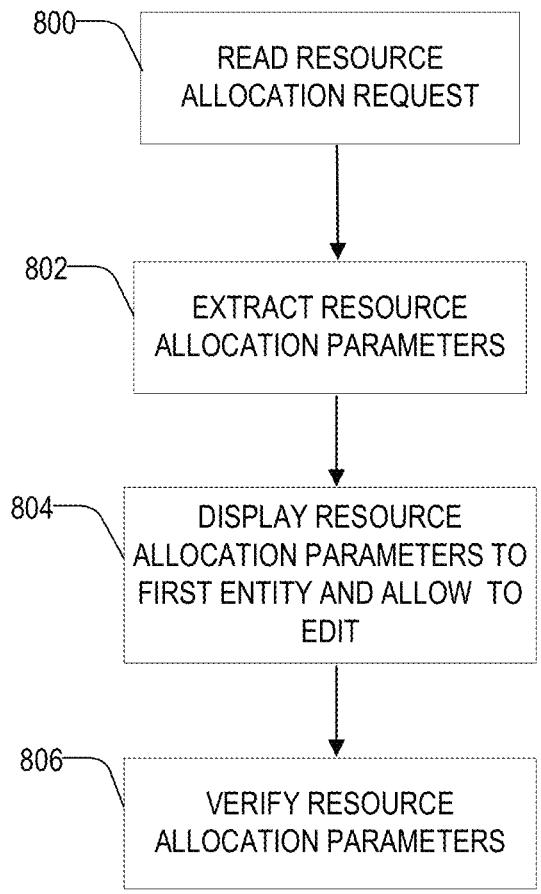
FIG. 8 illustrates a flow chart of a processing phase for an accelerated resource allocation system, according to some examples of the present disclosure.

FIG. 8 illustrates a flow chart of a processing phase for an accelerated resource allocation system according to some examples of the present disclosure. FIG. 8 is one example implementation of processing phase 406 of FIG. 4. In an example of the processing phase, the first entity may submit the resource allocation requests documents to a processing phase in which the system may, read the resource allocation request at operation 800, extract the resource allocation parameters at operation 802, and then display to the first entity (the user) at operation 804, the resource allocation parameters. The resource allocation parameters may include the key characteristics of the transaction (e.g., vendor information and dollar amount). During operations 800 and 804, the system may display a user interface such as at FIG. 19.

In an example, at operation 800 the system may recognize a plurality of transaction parameters from an image of the resource allocation request. Transaction parameters may include price, vendor information, equipment information, quantity information, or the like. This analysis may be done through a combination of one or more of optical character recognition (OCR) and artificial intelligence (AI) processing of the documents, such as a Natural Language Processing (NLP) process. At operation 804, the system may then give the first entity the opportunity to verify the resource allocation transaction parameters, including the details of the transaction, and make any necessary changes to the details. In this step, the first entity may be presented with the user interfaces shown in FIG. 20 and FIG. 21.

In an example, the first entity may select a submitted resource allocation request (e.g., an invoice) for processing. The resource allocation request may be sent to an OCR process where the text of the resource allocation request is extracted from the image of the request. The text is then used as input to a processor to determine one or more transaction parameters from the OCR'd text. For example, an NLP algorithm. In some examples, the NLP may look for one or more specific text phrases (e.g., the word "Total Due" before the price) to determine the transaction parameters. In some examples, the NLP may be trained using one or more supervised learning algorithms. For example, a number of sample training invoices may be labeled with the appropriate transaction parameters and the supervised learning algorithm may utilize the training data set to build an NLP model. The processing may be done at the system or via a third-party service. For example, the system may send the image of the documents to a third-party service for processing using an application programming interface (API) and the service may return the transaction parameters.

The transaction parameters may be displayed to the first entity and the first entity may edit the transaction parameters detected by the system. In some examples, the system may "learn" to more effectively analyze the details of transactions based on any changes a first entity makes at this step. This may be done through an algorithm run by the processing circuitry (e.g., boosting) to automatically adapt based on changes a first entity enters. For example, the image and/or OCR output may be labelled with the corrected transaction parameters and then used as training input to refine or retrain a supervised model (e.g., for either the OCR process or for the NLP).

Figure 9:
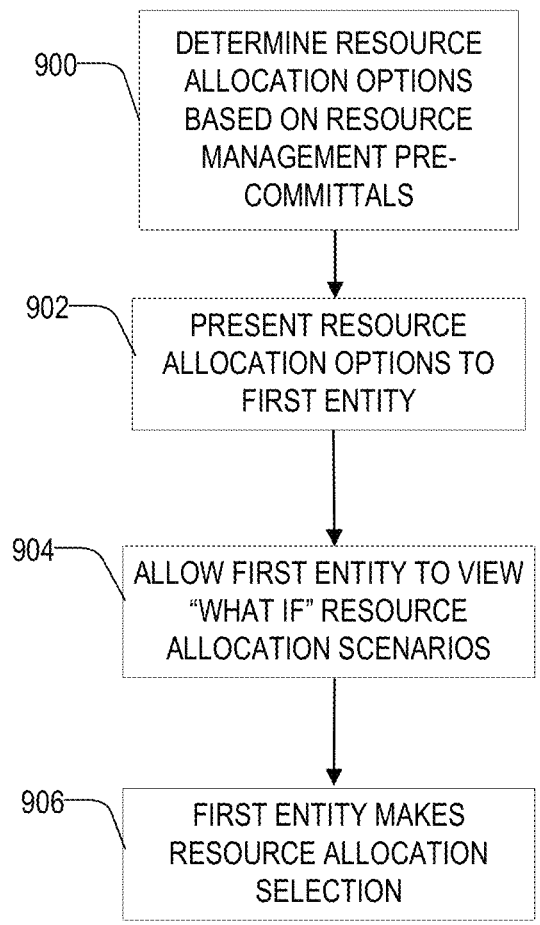
FIG. 9 illustrates a flow chart of a verification phase for an accelerated resource allocation system, according to some examples of the present disclosure.

FIG. 9 illustrates a flow chart of a verification phase for an accelerated resource allocation system according to some examples of the present disclosure. FIG. 9 is an example of implementation of verification phase 408 of FIG. 4. At operation 900, in some examples, the system may determine a plurality of resource allocation options based upon the resource management pre-committals and the resource allocation parameters from the resource allocation request. In another example, the plurality of resource allocation options may be based on pre-committal parameters (e.g., resource pre-committal parameters), market parameters, and transaction parameters. Resource allocation options may include a structure (e.g., rent or loan of the resource), a term, an interest rate, or the like. These options may be set based upon a set of one or more rules that may factor in the pre-committal parameters, market parameters, transaction parameters, or the like. The rules may be created based upon an administrator of the system, or the like. For example, a rule may specify rules on how long a resource allocation (e.g., financing) term can be based upon the total amount of resources being requested, an outstanding balance of the second entity, and the second entity's pre-committal parameters. Another rule may specify the interest rate based upon market parameters, transaction parameters, or the like. In some examples, the options available may change depending on other options. For example, a first entity may select a term, which may affect the interest rate.

Figure 23:
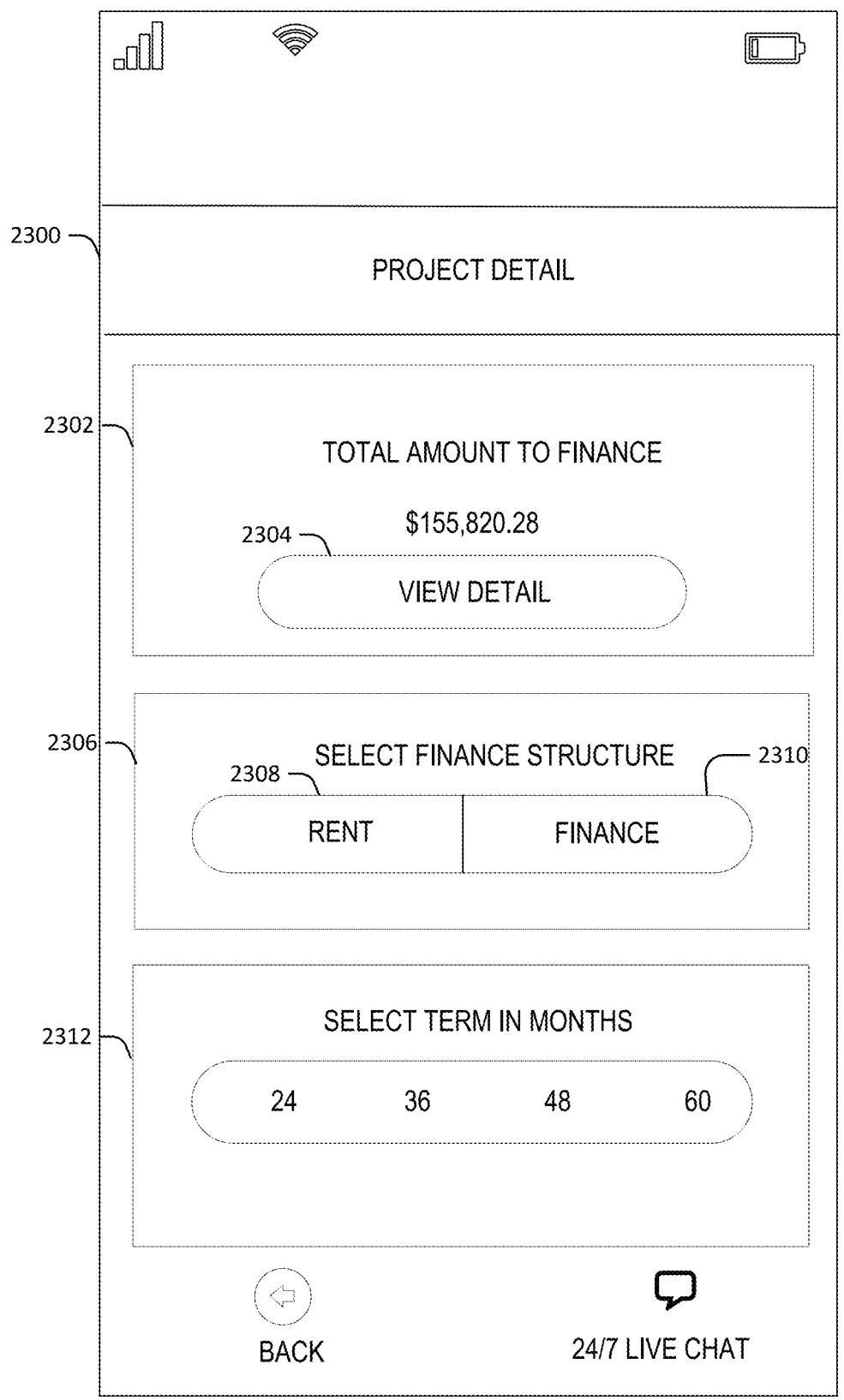
FIG. 23 illustrates a UI of a resource allocation detail page, according to some examples of the present disclosure.

At operation 902 the system may then present the resource allocation options to the first entity, such as through a user interface in FIG. 23. In one example, the resource allocation options may be tied to a particular one, but not any other one, of the resource allocation requests. For example, a single invoice or lease may have a particular financing term and a particular interest rate. In another example, resource allocation options may be tied to more than one resource allocation requests, such as a group of invoices or leases, in which the financing term and interest rate may be different than resource allocation options available for a single resource allocation request.

In another example, the system may also allow a first entity at operation 904 to view one or more "what-if" resource allocation scenarios. For example, the system may perform an analysis to compare combinations of invoices or leases and financing structures. For example, a first entity may wish to view the cost of submitting an invoice at a variable interest rate for a shorter duration, versus a fixed interest rate for a longer duration. The system may allow the first entity to see a comparison of each financing option. Once the first entity verifies the details of the transaction, the system may move onto a resource allocation offer phase.

At operation 906 the first entity may make a resource allocation selection. This may be done through a user interface such as in FIGS. 23 and 24 in which the first entity may choose a resource allocation structure (e.g., renting or financing) and a term/duration (e.g., number of months). In response to the first entity's selections, the system may proceed to generate a resource allocation offer.

Figure 10:
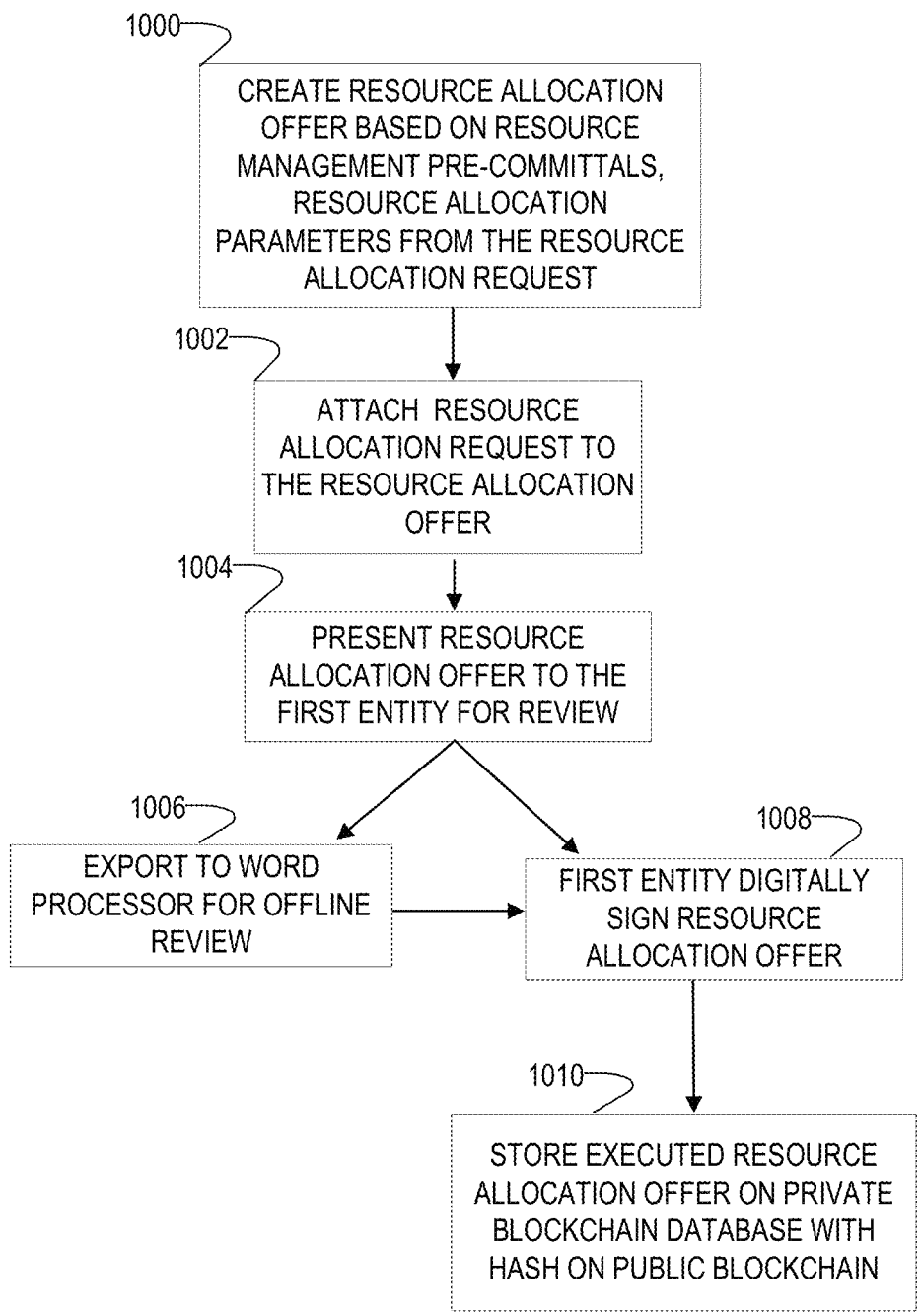
FIG. 10 illustrates a flow chart of a resource allocation offer phase for an accelerated resource allocation system, according to some examples of the present disclosure.

FIG. 10 illustrates a flow chart of a resource allocation offer phase for an accelerated resource allocation system according to some examples of the present disclosure. FIG. 10 is an example embodiment of resource allocation offer phase 410 in FIG. 4. In an example of the resource allocation offer phase, at operation 1000, the system may create a resource allocation offer (e.g., a financing contract) based on resource management pre-committals and resource allocation parameters from the resource allocation request. For example, automated digital contracts may be assembled, summarized, and presented to the first entity for digital signing. In this phase, the system may insert the correct pricing and financing information into a single, digital, fully integrated contract. At operation 1002, the system may attach the resource allocation request to the corresponding resource allocation offer. For example, the system may attach the scanned documents (e.g., an invoice or lease) corresponding to a particular contract for the selected structure and selected term.

Figure 25:
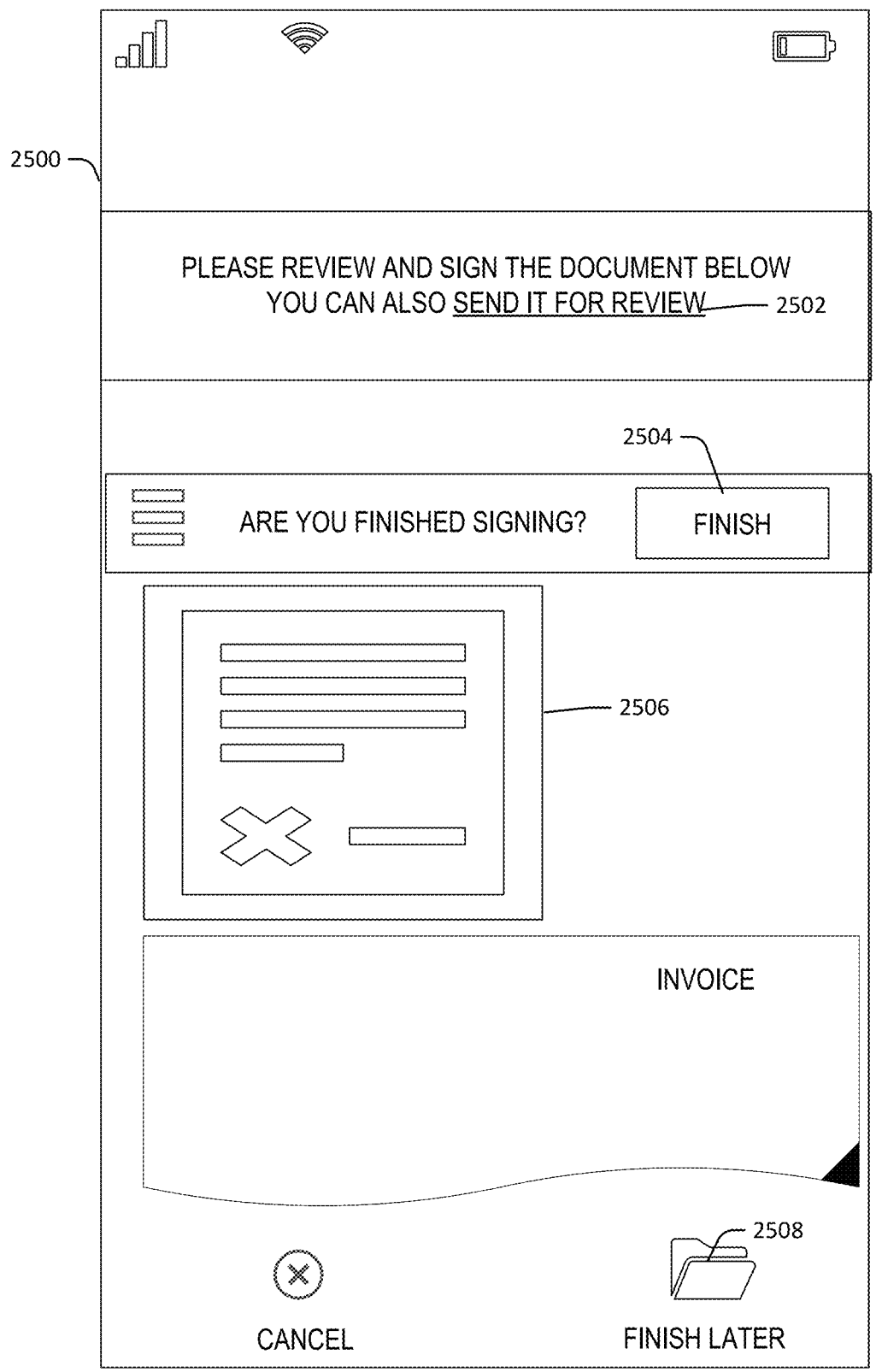
FIG. 25 illustrates a UI of a digital signature page, according to some examples of the present disclosure.

At operation 1004, the system may present the resource allocation offer to the first entity for review. This may be done in a user interface such as shown in FIG. 25. For example, system may allow a first entity to review the terms of the contract in either a summary form or in full detail. Further, at operation 1006 the system may further allow the first entity to export the complete digital contract into a word processing program for additional review offline. At operation 1008 the first entity may digitally sign the resource allocation offer.

The system may retain any unsigned contracts to await digital signing by the first entity. The system's algorithm may update and re-price any unsigned contracts daily based on changes in market interest rates. The system may further notify the first entity of any unsigned contracts when the first entity logs into the system. After a period of time, (e.g., 30 days) any unsigned contracts may expire, and the attached documents returned to the dashboard where the first entity may delete them or resubmit them through the processing phase.

Figure 26:
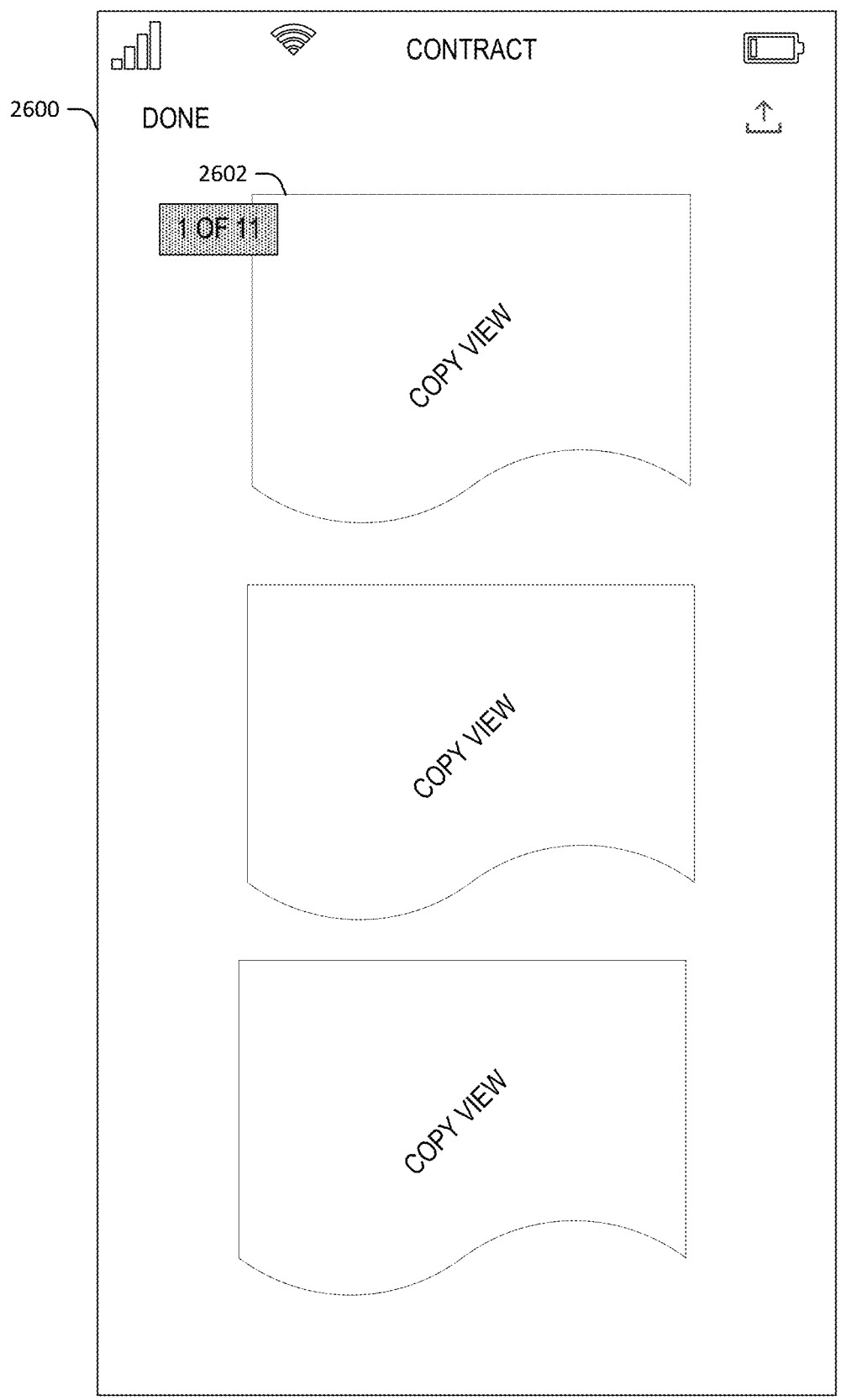
FIG. 26 illustrates a UI of a stored resource allocation offer document page, according to some examples of the present disclosure.

Once a first entity signs a contract, at operation 1010, the system may store a copy of the completed and executed resource allocation offer on a private blockchain database, with a hash on a public blockchain network (e.g., Ethereum), which will provide users and authorized third parties (e.g., accountants, regulators, or auditors) with direct access to immutable copies of the documents, such as shown in FIG. 26.

In an example, when the request for a resource allocation is imported from a web-based shopping cart 710 as described above in FIG. 7, the steps detailed in FIGS. 9 and 10 may be performed in the resource allocation system application on the first-entity's device or, alternatively, may be performed on the third entity's web site. For example, in a pop-up window, a new web browser window, or the like, that opens, is initiated, or the like from the web-based shopping cart screen when the first entity selects to finance a transaction as described in FIG. 7 above. When the steps detailed in FIGS. 9 and 10 are performed on the third entity's website, the resource allocation system application may be updated with the resource allocation parameters and the resource allocation offer, to reflect the accepted resource allocation offer by the first entity on behalf of the second entity, or any of the steps performed or completed by the first entity on the third party's website. This may allow the first entity to see details of the transaction, including any transaction/offer documents, in the resource allocation system application on his or her device after the transaction is completed in the web-based shopping cart 710. In an example, the updates may be reflected in real-time or in near-real-time and displayed in the resource allocation system application on the first entity's device as the first entity performs or completes one or more of the steps on the third party's website. Similarly, when the first entity completes any steps described above in FIGS. 9 and 10 in the resource allocation system application on his or her device, the web-based shopping cart 710 may be updated so that when the first entity accepts the resource allocation offer on behalf of the second entity, the checkout process automatically completes in the web-based shopping cart.

Figure 11:
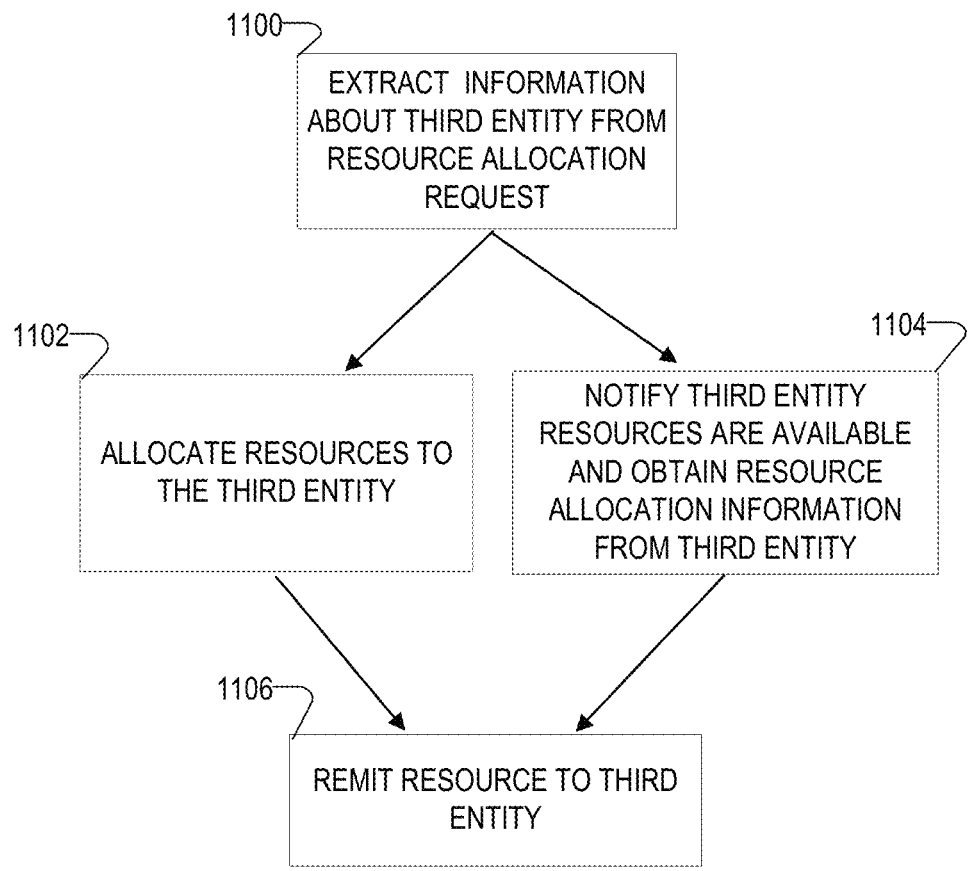
FIG. 11 illustrates a flow chart of a resource allocation phase for an accelerated resource allocation system, according to some examples of the present disclosure.

FIG. 11 illustrates a flow chart of a resource allocation phase for an accelerated resource allocation system according to some examples of the present disclosure. FIG. 11 is an example embodiment of resource allocation phase 412 of FIG. 4. At operation 1100, the system may extract information about a third entity from the resource allocation request. In an example, the third entity may be a vendor selling or renting equipment or material to the second entity. This may involve the system identifying the vendor information in an invoice or lease using OCR as described above for FIG. 8. This may happen automatically. For example, the system may recognize third entity information and automatically allocate resources (e.g., a check) at operation 1102 and send the resources to the third entity at operation 1106. In other examples, the system may utilize operation 1104 and notify the third entity that resources are available and obtain resource allocation information from the third entity. For example, the system may receive automatic deposit information from the vendor. In these examples, the vendor may be paid electronically.

Figure 12:
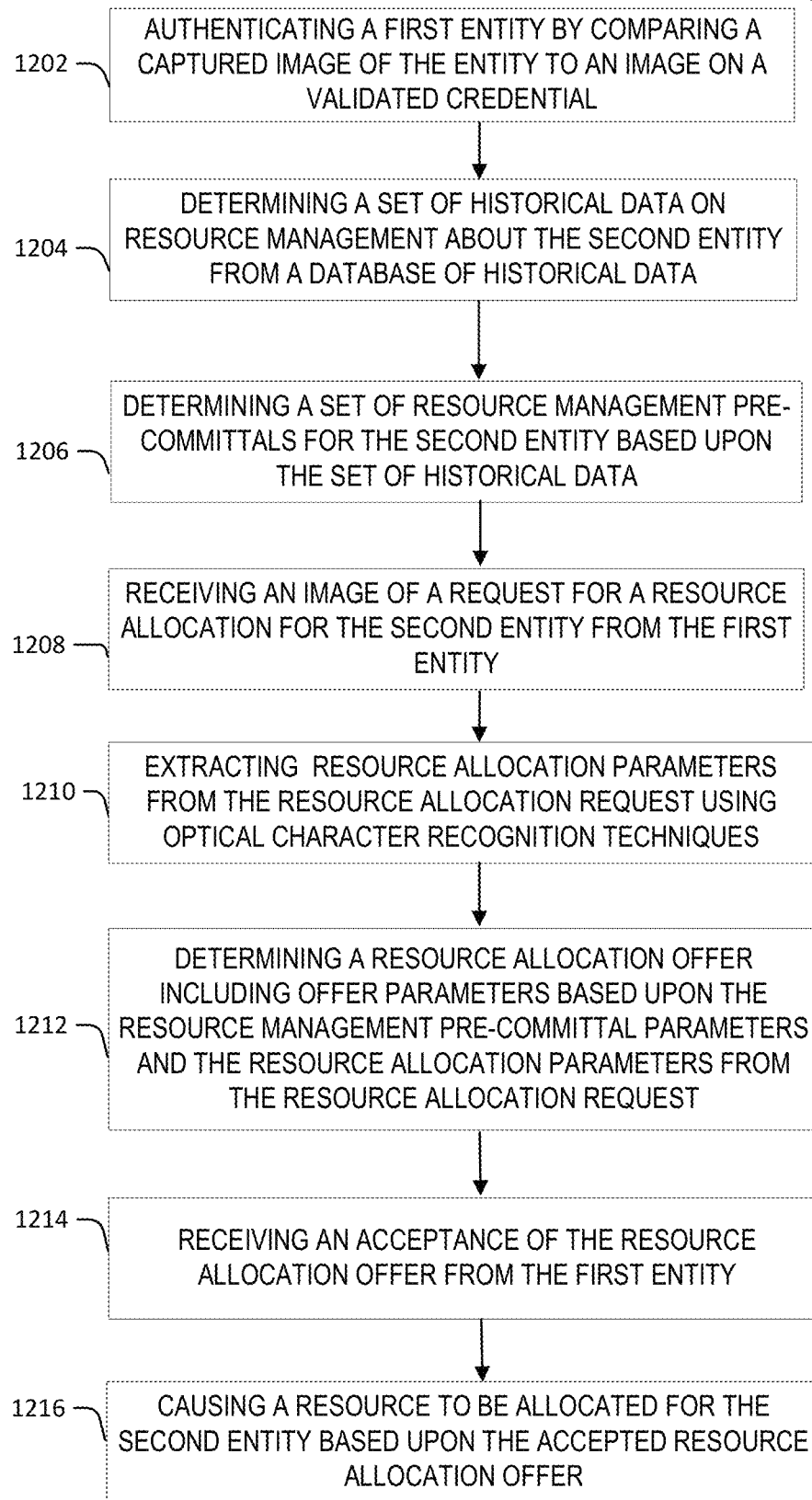
FIG. 12 illustrates a flow chart of a method for accelerated resource allocation, according to some examples of the present disclosure.

FIG. 12 illustrates a flow chart of a method for accelerated resource allocation according to some examples of the present disclosure. FIG. 12 shows one example method of the operations of FIGS. 4-11. Operation 1202 may include authenticating a first entity by comparing a captured image of the entity to an image on a validated credential. In an example the validated credential may be a government issued identification such as a driver's license or a state issued identification. In this example the government issued identification may contain a biometric (e.g., a photograph) of the first entity/user. The validity of the identification may be verified by the system confirming the barcode information of the identification with databases over a network. In another example the identification may include a military identification or a passport.

The first entity may be an individual (e.g., an agent or employee) of a second entity (e.g., a corporation, limited liability company, partnership, or other company or business organization) who has authority to act on behalf of the second entity (e.g., bind the second entity to a financial contract or agreement) and use the system. In some examples, authenticating the first entity may include authenticating the authority of the first entity to act on behalf of the second entity. The first entity may create a profile on the system, which may include identifying the second entity with which the first entity is affiliated.

In an example of operation 1202, the first entity's/user's identity may then be verified through comparing a captured biometric (e.g., facial identification) generated using the native capabilities of the first entity's device (e.g., mobile phone camera) with the biometric on the government issued identification. The captured image may also be a series of images requiring the first entity/user to "pose" at different angles to ensure that the captured image is of an actual person, and not a photograph.

As a part of operation 1202, the system may generate and forward over a network a digital authorization (e.g., a certificate of incumbency) to a second individual as described for FIG. 5 which attests that the second individual is an authorized representative of the organization and that the second individual attests that the first entity has authority to act on behalf of the organization.

At operation 1204 the system may determine a set of historical data on resource management about the second entity from a database of historical data. The historical data may include the credit data of the second entity obtained from one or more third-party data sources such as credit reporting agencies, social networking services, business databases (e.g., DUN AND BRADSTREET®), or the like. In some examples, the system may connect to the third-party data sources at operation 1204 over a network to get information regarding the organization regarding past resource allocations and other information (e.g., such as credit score, liens, judgments, revenue, years in business, number of employees, or paid indicators (how likely the organization is to pay on time)) which will be sent to the system over a network.

At operation 1206 the system may determine a set of resource management pre-committals for the second entity based upon the set of historical data obtained at operation 1204. The system may then process the information obtained from the third-party data sources using an algorithm (e.g., utilizing a set of rules, a linear function, a logistic regression function, or the like) to determine pre-committal parameters for the second entity, from which resource management pre-committals (such as an initial level of financing or an initial rate of interest) are determined for the organization In some examples, the system may perfect a lien on the equipment. For example, the system may, during the setup phase of the application, during the web-based onboarding, or at any other appropriate time, prompt the first entity/user to grant authority to allow the system to file a broad UCC lien against the second entity. For example, with the software licensing agreement—click-wrap. When the first entity finances a purchase, the system amends the broad lien with the specific transaction details. This allows the system to relate back to the broad UCC filing for a purchase money security interest in order to secure a first priority lien against the company. These liens may be accomplished through recording them in one or more electronic external databases.

Operation 1208 may include receiving an image of a request for a resource allocation for the second entity from the first entity. Once the first entity is verified and authorized to use the system, the first entity may import resource allocation requests to the system in a manner such as described for FIG. 7. This may include, for example, scanning or otherwise importing the resource allocation requests (e.g., invoices, rental agreements, purchase orders, or other similar documents) into the system using the camera of a smartphone or importing resource allocation requests through email.

Operation 1210 may include extracting resource allocation parameters from the resource allocation request using optical character recognition (OCR). The system may recognize a plurality of resource allocation parameters from an image of the resource allocation request. In some examples, the parameters may include price, vendor information, equipment information, quantity information, or the like. This analysis may be done through a combination of one or more of optical character recognition (OCR) and artificial intelligence (AI) processing of the documents.

Operation 1212 may consist of determining a resource allocation offer including parameters based upon the resource management pre-committal parameters and the resource allocation parameters from the resource allocation request. Responsive to the first entity selecting from various resource allocation parameters, the system may create a resource allocation offer (e.g., a financing contract) based on resource management pre-committals and resource allocation parameters from the resource allocation request. For example, automated digital contracts may be assembled, summarized, and presented to the first entity for digital signing. In this phase, the system may insert the correct pricing and financing information into a single, digital, fully integrated contract.

In another example, the system may allow the first entity to export the contract (such as to a word processing program) for offline review. In this example, the first entity may digitally sign the contract through the system at a later time. In another example, if the first entity has not digitally signed the resource allocation offer after a period of time, the system may cancel the offer and return the resource allocation requests to a different screen (such as a dashboard) where the first entity may delete the resource allocation requests or resubmit the resource allocation requests for a new resource allocation offer. In such an example, the terms of the new resource allocation offer may change (with respect to the initial resource allocation offer) should one or more resource allocation parameters or resource management pre-committals change from when the initial resource allocation offer was made. Such as, for example, changes in market rates, or changes in one or more items of the historical data regarding the company.

Operation 1214 may include receiving an acceptance of the resource allocation offer from the first entity. For example, the first entity may, after receiving the resource allocation offer, digitally sign the resource allocation offer. This may include the first entity executing a click-wrap agreement, by checking a box or clicking a link or a button or the like, which signals the first entity's assent to abide by the terms of the resource allocation offer. In another example, the first entity may use a biometric feature of a first entity device such as, for example, a fingerprint identification or facial recognition feature on a smartphone or tablet to "sign" the resource allocation offer. In another example, the system may present the first entity with a signature box in which the first entity may enter the first entity's signature, such as with the first entity's finger or using a stylus.

The system may use multiple means of capturing the assent of the first entity to the terms of the resource allocation offer. Such as, for example, through multi-factor authentication (MFA). For example, the system may require the first entity to execute a combination of "signing" methods as described above, such as the first entity executing a click-wrap agreement and submitting a biometric through the architecture of a user device. Or, as another example, the system may require the first entity to enter the first entity's signature in a signature box, and enter a code sent to the first entity through a text message, a telephone call, generated by an authenticator service, or the like.

Operation 1216 may include causing a resource to be allocated for the second entity based on the accepted resource allocation offer. For example, once the first entity signs and causes the resource allocation offer to be executed, the system may contact a third entity such as a vendor, to inform the vendor that resources (e.g., funds) are ready to be allocated on behalf of the second entity. In this example, the system may obtain from the third entity resource allocation information (e.g., a bank routing and account number) into which resources may be deposited. In another example, the system may cause a check to be generated and sent to the third entity. In these examples, the third entity may be a vendor, supplier, or the like selling or renting equipment to the second entity. The system may determine information regarding the vendor by extracting the resource allocation parameters from the resource allocation request, such as at operation 1210.

Figure 13:
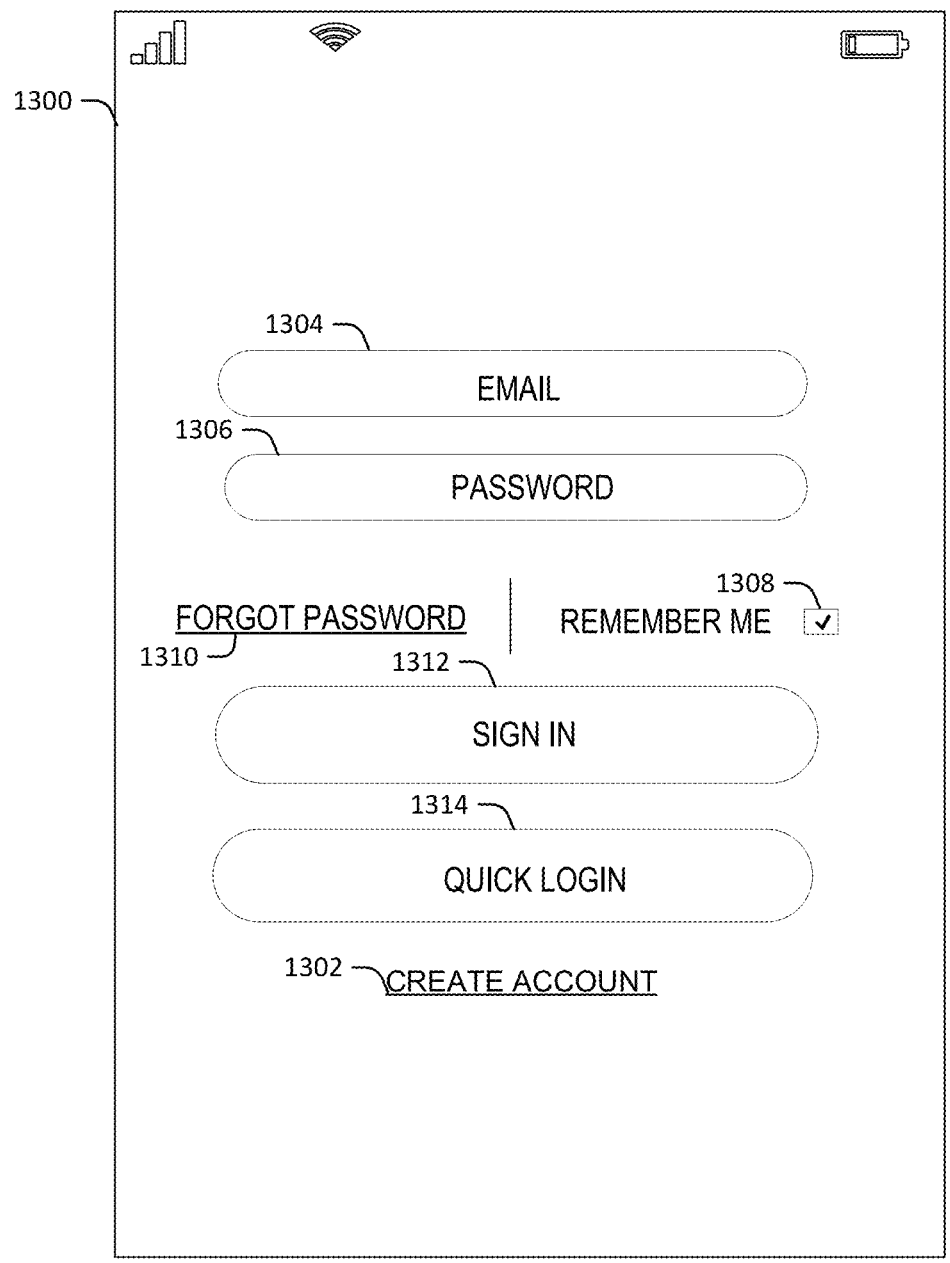
FIG. 13 illustrates a User Interface (UI) of a sign on page for the system, according to some examples of the present disclosure.

FIG. 13 illustrates a User Interface (UI) of a sign on page for the system according to some examples of the present disclosure. This is a screen that the first entity may see during the initial setup phase, or after an account is set up. In an example, the first entity may sign in with an email address and password, or using a quick login which may use a biometric verification (e.g., fingerprint scan, or facial identification) to log the first entity in. If the first entity has not yet created an account, the first entity may click the create account link 1302 and begin the setup process.

In an example, once the first entity has successfully created an account, which may include entering an email address and creating a password, the first entity may enter his or her email address in the email field 1304 and the password he or she created in the password field 1306. In an example, the first entity has the option to enter biometric information of clicking a remember me checkbox 1308, which may save the first entity's email address on the login page 1300. The system may also allow a first entity to recover a lost or forgotten password by clicking a "forgot password" link 1310. In this example, the system may, in response to the first entity clicking the forgot password link 1310 send a link to reset the password to the first entity's email address. In another example, the system may generate a temporary password for the first entity and send the temporary password to the first entity, such as in an email, or by a text message or the like, and prompt the first entity to change the temporary password to a new password upon the first entity accessing the system with the temporary password.

Upon successful entry of a username and password and the first entity clicking a sign on button or link 1312, the system grants the first entity access to a dashboard, home screen or such similar screen. In another example the first entity may enter username and biometric information to gain access to the dashboard. In this example, the first entity may enter his or her email address, and click a button or a link, such as a quick login button 1314 which will prompt the first entity for the biometric, which may be obtained through a user device such as a smartphone, a tablet or the like.

Figure 14:
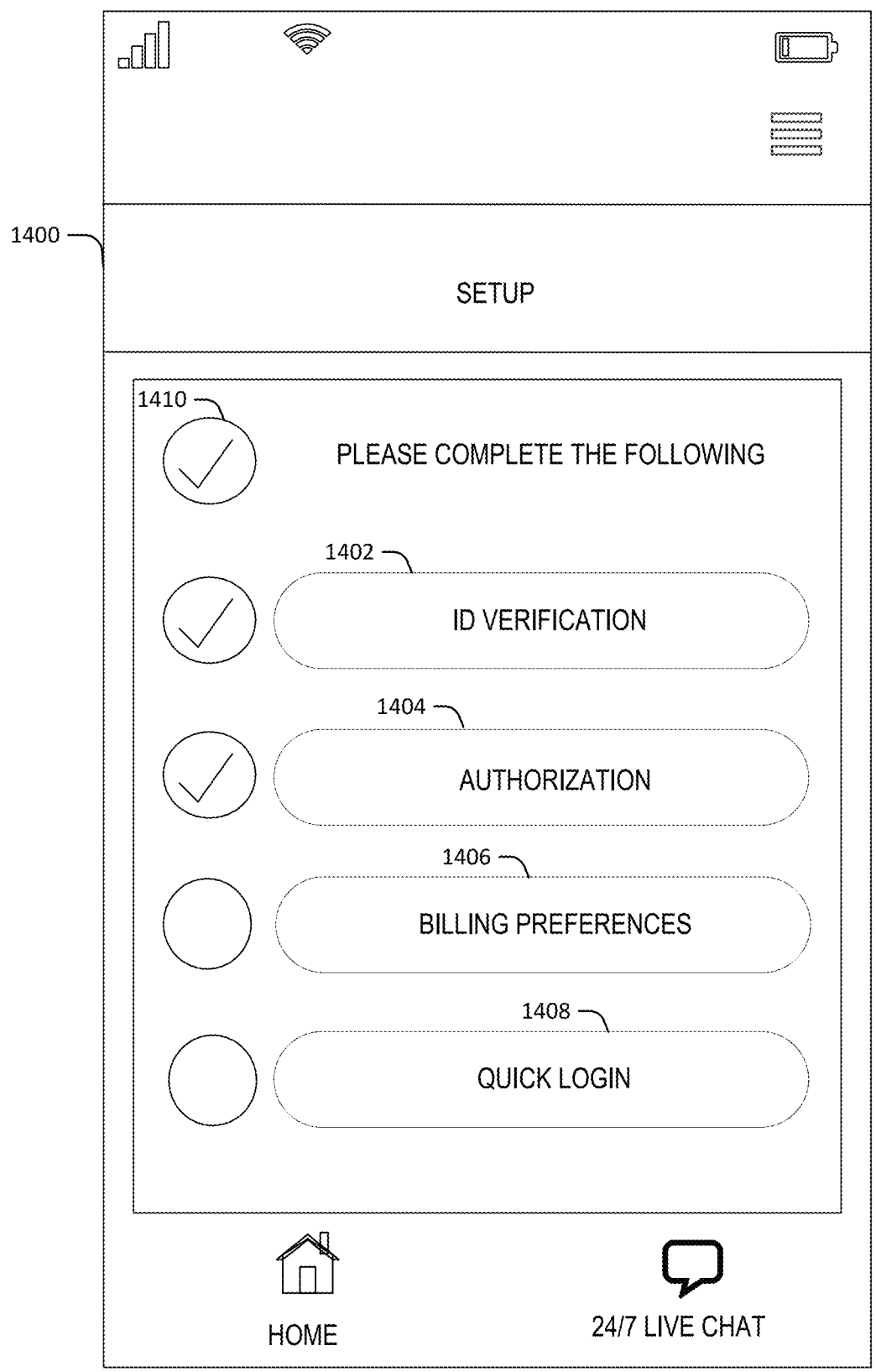
FIG. 14 illustrates a UI of a setup progress page, according to some examples of the present disclosure.

FIG. 14 illustrates a UI of a setup progress page 1400. In an example, the first entity may walk through numerous steps to set up their use of the system including an ID verification step 1402, and authorization step 1404, a billing preferences step 1406, and quick login step 1408. In the billing preferences step 1406, the first entity may be prompted to set up a method for how the second entity may be billed once an executed resource allocation agreement is complete. For example, the first entity may request that a paper bill may be sent to the second entity at the billing interval (e.g., monthly) called for by the terms of the resource allocation offer. In another example, the first entity may enter account information such as a bank routing and account number from which payments may be deducted at the billing interval.

At the quick login step 1408, the first entity may be prompted to select parameters to enable the quick login process. This may allow the first entity to access the system without requiring the first entity to enter a password each time. For example, using a biometric as described above. This may also include, for example, the first entity using multi-factor authentication as a method to log in. Such as, for example, entering a code received in a text message after clicking quick login 1314 on the login page 1300 as shown in FIG. 13. In an example, the quick login step 1408 on the setup screen 1400 may be an optional step.

Returning to the example of FIG. 14, the first entity may click a link corresponding to the step the first entity must complete. Once a step is complete the progress may be noticed with a check box 1410 next to the completed step. Once the first entity completes all required steps, the first entity may be returned to the login page 1300, and then able to access the system by logging in as described for FIG. 13. When the first entity fails to complete all steps of the setup process, or the system determines at any step that the first or second entities do not qualify for use of the system, for example, if the first entity's identification cannot be verified at the ID Verification step 1402, the system may block or otherwise not allow the first entity to log in.

FIG. 15 illustrates a UI of an identification scan page according to some examples of the present disclosure. In an example, after the first entity clicks on the ID verification link 1402 on the progress page 1400, the first entity may be taken to the identification scan page 1500. In an example of FIG. 15, the first entity may be instructed, such as through a set of instructions 1504 to scan the front and/or rear of the first entity's identification, such as by using a camera on a user device (e.g., a smartphone). On the identification scan page 1500, the system may include an area 1502 (e.g., a "window" or frame) in which the first entity is to orient the first entity's identification, such as to center the identification in the window 1502. In this example, the identification window 1502 may "pop up" making other features inaccessible (as denoted by the dashed lines in FIG. 15) while the identification window 1502 is active. In another example, the first entity may be instructed to similarly scan the reverse or back side of the first entity's identification. In another example, when the first entity completes scanning the identification, the first entity may be returned to the setup progress page 1400.

FIG. 16 illustrates a UI of a first entity (e.g., a user) authorization page according to some examples of the present disclosure. In an example, after clicking on the authorization step 1404 on the setup page 1400, the first entity may be taken to an authorization screen 1600. As a part of the setup phase, the first entity may look up the organization with which he or she is affiliated. In some examples, organization names are stored in a database created from publicly registered information (e.g., email domain registration). Once a verified organization is selected, the first entity may be presented with the authorization screen 1600 where the first entity may be presented with a field stating that the first entity must have the authority to bind the second entity to financial agreements 1602, and a field 1604 in which the first entity enters the name and email address of a verifier (e.g., executive, officer, director, vice president, or president) with the second entity who can verify the user/first entity has the authority to bind the second entity to financial transactions. In an example, the email address must be on the same email domain as in the publicly registered information for the organization.

In an example, the system then generates and forwards, over a network, an authorization (e.g., a certificate of incumbency) to the verifier which attests that the first entity has authority to act on behalf of the organization, once the verifier digitally signs the authorization acknowledging the first entity's authority to bind or act on behalf of the organization, the system authorizes the first entity.

FIG. 17 illustrates a UI of a resource allocation request import (e.g., a document upload) page according to some examples of the present disclosure. In an example, after a verified first entity logs into the system the first entity may add (e.g., upload) invoices by accessing the document upload screen 1700. In the import phase, the first entity may choose from a plurality of upload options. For example, in one embodiment the first entity may scan the document for example, by selecting image capture 1702 using the camera of a mobile or handheld device (e.g., a smartphone or tablet). In another example, the first entity may select upload invoices 1706 which may import a file from a location (e.g., a cloud-based database, a computer hard drive, or a flash drive). In another example the first entity may upload documents using email import such as by selecting copy address 1704.

Figure 18:
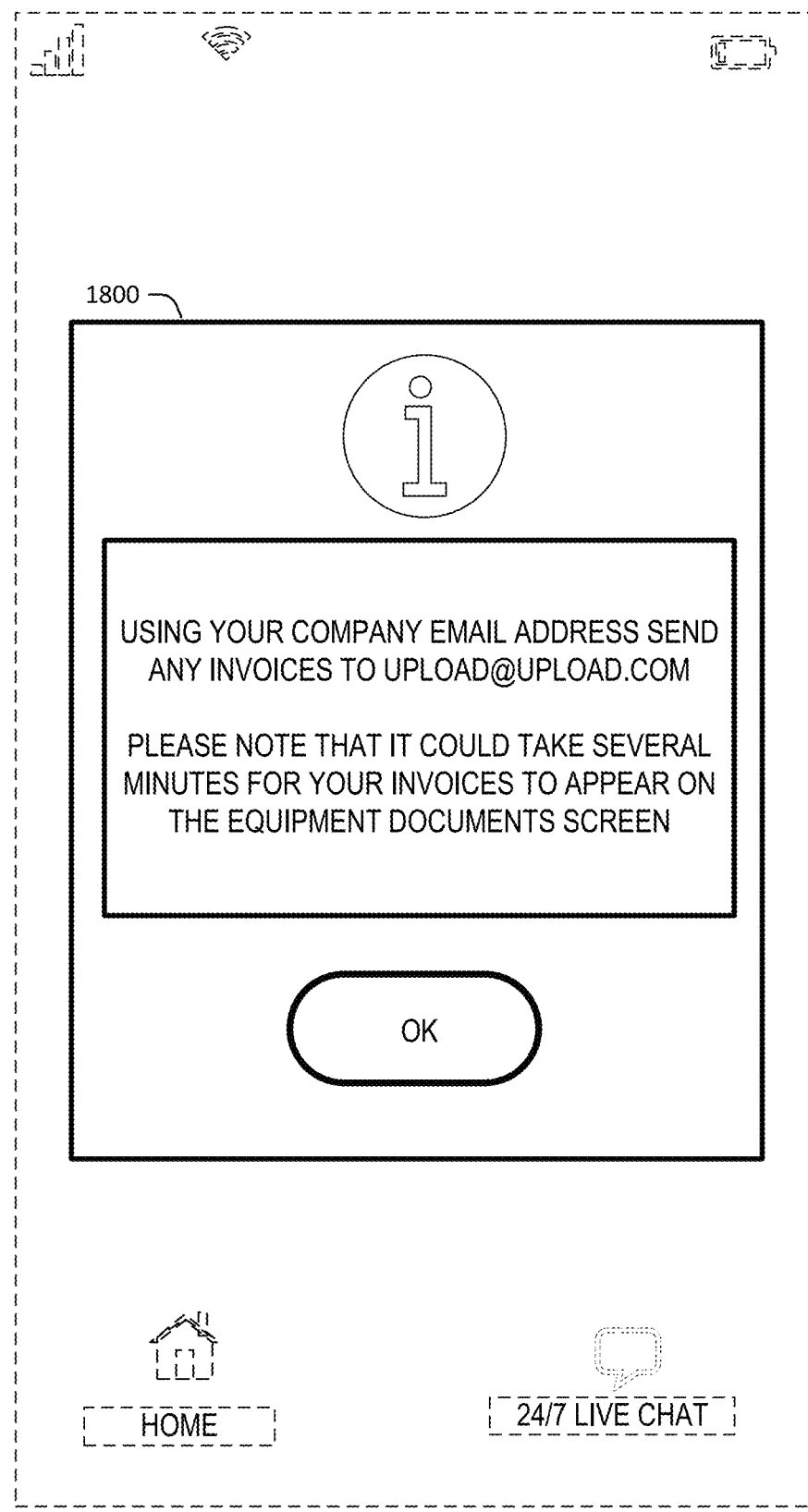
FIG. 18 illustrates a UI of an email import page, according to some examples of the present disclosure.

FIG. 18 illustrates a UI of an email import page according to some examples of the present disclosure. In an example, when the first entity selects to upload invoices via email by selecting copy address 1704 on the document upload page 1700, the first entity may be taken to an information page 1800 for email import. This page may instruct the first entity how to import the documents through email and notify the first entity that it may take several minutes for the documents to appear in the system. In this example, the information page 1800 may "pop up" making other features inaccessible (as denoted by the dashed lines in FIG. 18) while the information page 1800 is active. The email is received by the system and processed the same way as an image.

Figure 19:
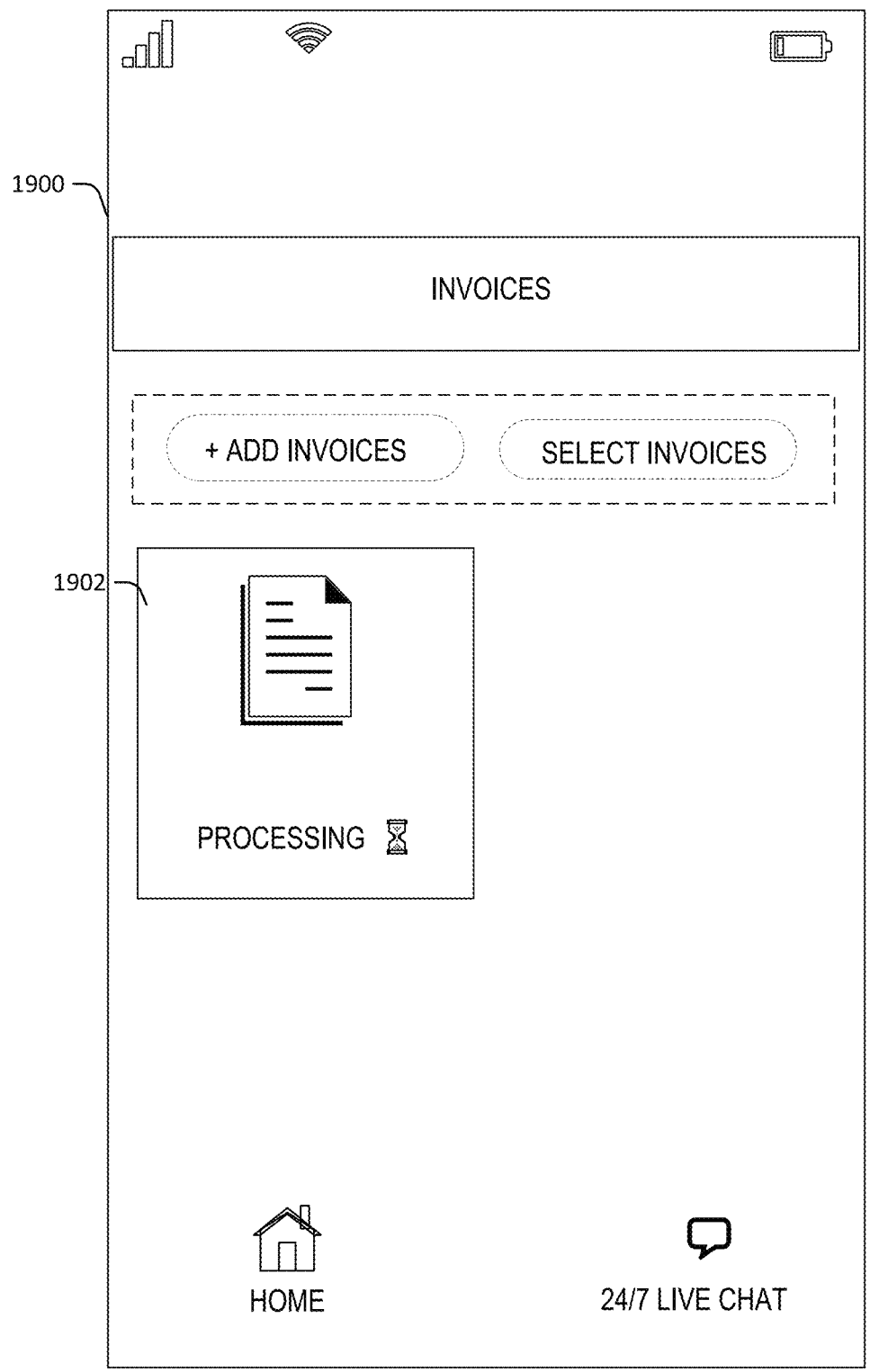
FIG. 19 illustrates a UI of a resource allocation request processing page, according to some examples of the present disclosure.

FIG. 19 illustrates a UI of a resource allocation request (invoice) processing page according to some examples of the present disclosure. Once the documents are imported into the system the documents may be saved to the system's dashboard or desktop as shown in FIG. 22. The first entity may then select a desired invoice or invoices on the invoice processing page 1900 for processing 1902. In an example, the system's processing circuitry may process the document using one or more automated processes. For example, the system may apply one or more optical character recognition (OCR) processes to a captured image of the document. The OCR may produce one or more-character strings that represent the text shown in the image. In some examples, the OCR process may utilize one or more machine-learning models (e.g., a model created through supervised or unsupervised learning). The character strings may be processed to produce one or more transaction parameters, such as a vendor name, vendor contact details, transaction amount, or the like. In some examples, the system may utilize a natural language processing algorithm. This processing may be done by the system or may be done by one or more processing services that are reachable by a network. For example, rather than processing the image of the invoice itself, the system may send the invoice image to a third-party service to process the image.

In another example, the system may, using its processing circuitry and instructions executed by at least one non-transitory machine-readable media, read, process, and present to the first entity the transaction parameters (e.g., vendor information and dollar amount). The system may recognize a plurality of fields from an image of an invoice (e.g., price and vendor identifier). This analysis may be done through a combination of one or more of optical recognition and artificial intelligence (AI) processing of the documents.

Figure 20:
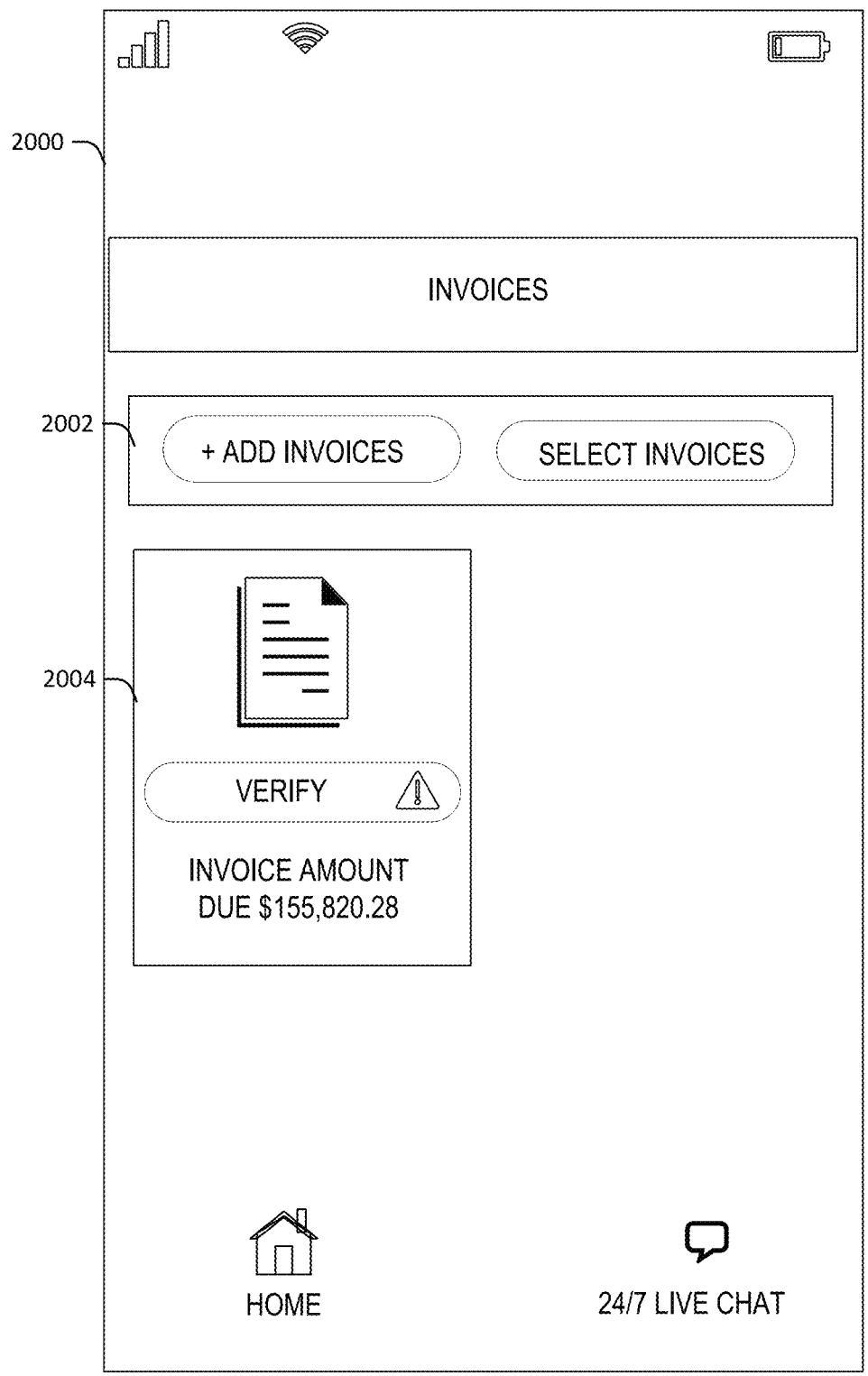
FIG. 20 illustrates a UI of a resource allocation request verification page, according to some examples of the present disclosure.

FIG. 20 illustrates a UI of a resource allocation request (e.g., an invoice) verification page according to some examples of the present disclosure. In an example, once the invoice is processed, the system may proceed to a verification page 2000. This page may require the first entity to verify the transaction details for a processed invoice 2004 or invoices which have been processed as described for FIG. 19. The first entity may also select additional invoices for processing by clicking an add invoice button 2002. In this example, the first entity may be taken back to the processing screen 1900 while the system processes the added invoice. The example of FIG. 20 shows a single invoice, but the page 2000 may include all invoices which have been processed to have the details of the transaction for a selected invoice verified.

Figure 21:
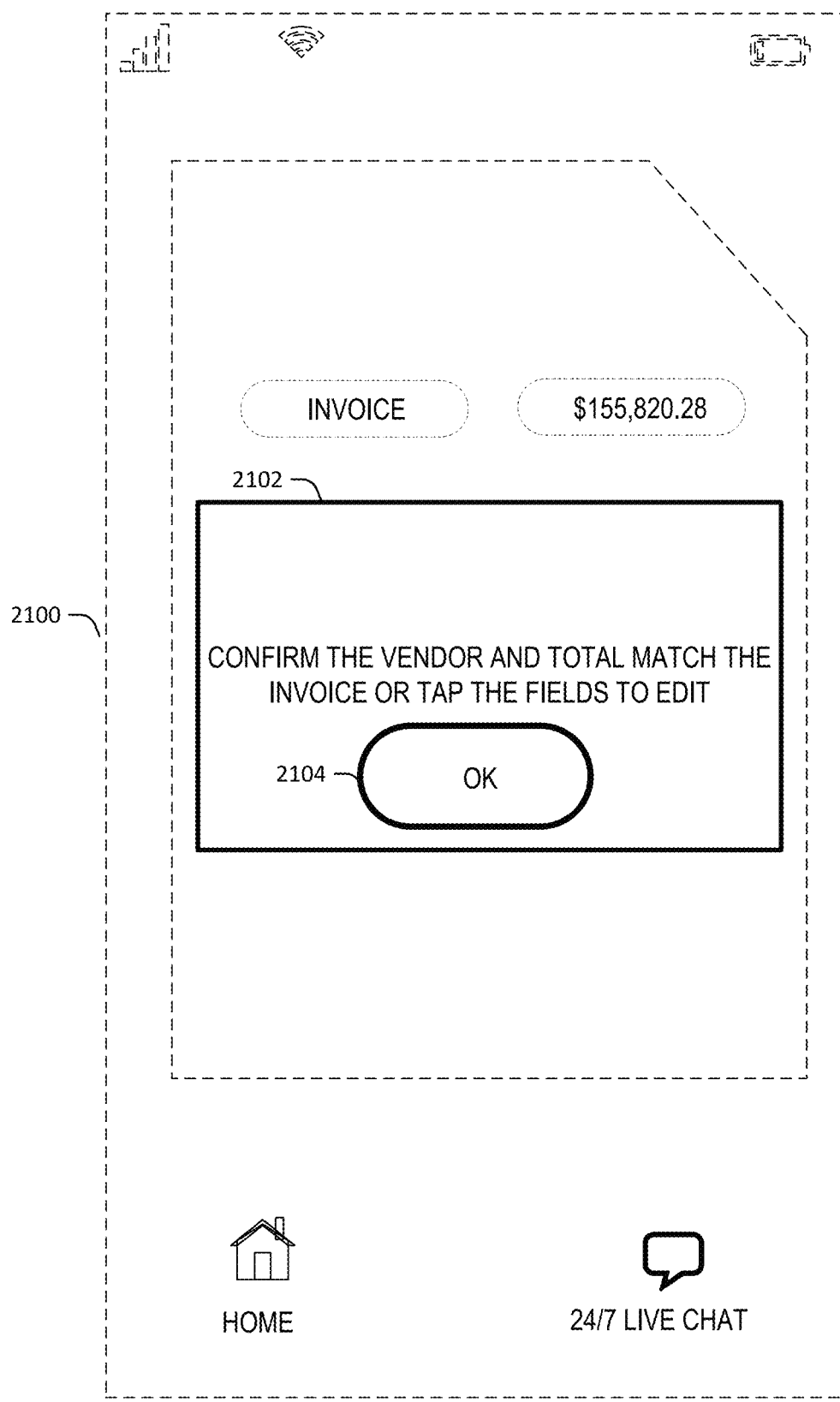
FIG. 21 illustrates a UI of a resource allocation request details confirmation page, according to some examples of the present disclosure.

FIG. 21 illustrates a UI of a resource allocation request (e.g., an invoice) details confirmation page according to some examples of the present disclosure. In the example of FIG. 21, responsive to the first entity selecting an invoice on the invoice verification screen 2000, the first entity may be taken to a screen 2100, in which a message 2102 is displayed, such as in a pop up, instructing the first entity to confirm the vendor and total match the information in the invoice. In such an example, after acknowledging the message 2102 by selecting OK 2104, the first entity may be taken to a details screen (not shown) in which the terms of the invoice may be displayed in fields which the first entity may edit.

In some examples, the system may learn to more effectively analyze the details of transactions based on any changes a first entity makes at this step. This may be done through an algorithm run by the processing circuitry (e.g., boosting) to automatically adapt based on changes a first entity enters. In some examples, the image is used, along with the corrections indicated by the rust entity to retrain or refine the natural language processing model and/or the optical character recognition model (depending on which component was in error). For example, the first entity may indicate that while the system correctly recognized the proper field from the invoice, the recognized value was wrong. For example, that the invoice amount was wrong. This feedback may be used to refine the optical character recognition model by submitting the image of the invoice along with a label indicating a correct amount as additional training data in a supervised learning process. In other examples, if the first entity indicates that the system chose the wrong field for a transaction parameter (e.g., chose the zip code of the vendor as the amount), then that feedback may be used, along with the OCR results as training data to a supervised learning algorithm of the NLP process to refine or update a machine-learned model of the NLP process.

FIG. 22 illustrates a UI of an imported resource allocation request (e.g., an imported documents) dashboard. Once documents are imported into the system as a part of the import phase (as discussed above), they may be kept on a dashboard 2200 until selected by the first entity for processing. The dashboard 2200 may allow the first entity to select 2222 a particular one or ones of invoices 2204, 2206, 2208, 2210, 2212, 2214, 2216, 2218, and 2220 (hereinafter "invoices 2204-2220") on the dashboard 2200 and submit them for processing (as discussed above). The dashboard 2200 may also have a search box 2202 which may allow the first entity to search available invoices 2204-2220 for a particular keyword (e.g., vendor name).

FIG. 23 illustrates a UI of a resource allocation (e.g., a project) detail page that may be presented to the first entity, which shows the total amount to finance 2302, allows the first entity to view the details of the transaction to be financed 2304, and allow the first entity to select the finance structure 2306 according to some examples of the present disclosure. This user interface may be presented to the first entity after confirming the details of a resource allocation request as described above for FIG. 21, or after selecting one or more imported resource allocation requests as described for FIG. 22. For example, the first entity may select between renting 2308 and financing 2310 the equipment and select from pre-set duration options 2312.

In the example of FIG. 23, the system may present a plurality of determined resource allocation options to the first entity based on the pre-committal (e.g., pre-approval) parameters according to some examples of the present disclosure. They first entity may select individual or various combinations of resource allocation requests (e.g., invoices) imported into the system for a term duration (e.g., 24, 36, 48, or 60 months) for a structure or structures (e.g., current lease or loan, or short-term, variable or fixed rate financing). The first entity may choose the inter-dependent offer parameters for the particular transaction, and the system may generate a resource allocation offer or offers based on the terms selected. The system may also allow the first entity to request custom options for the transaction.

Figure 24:
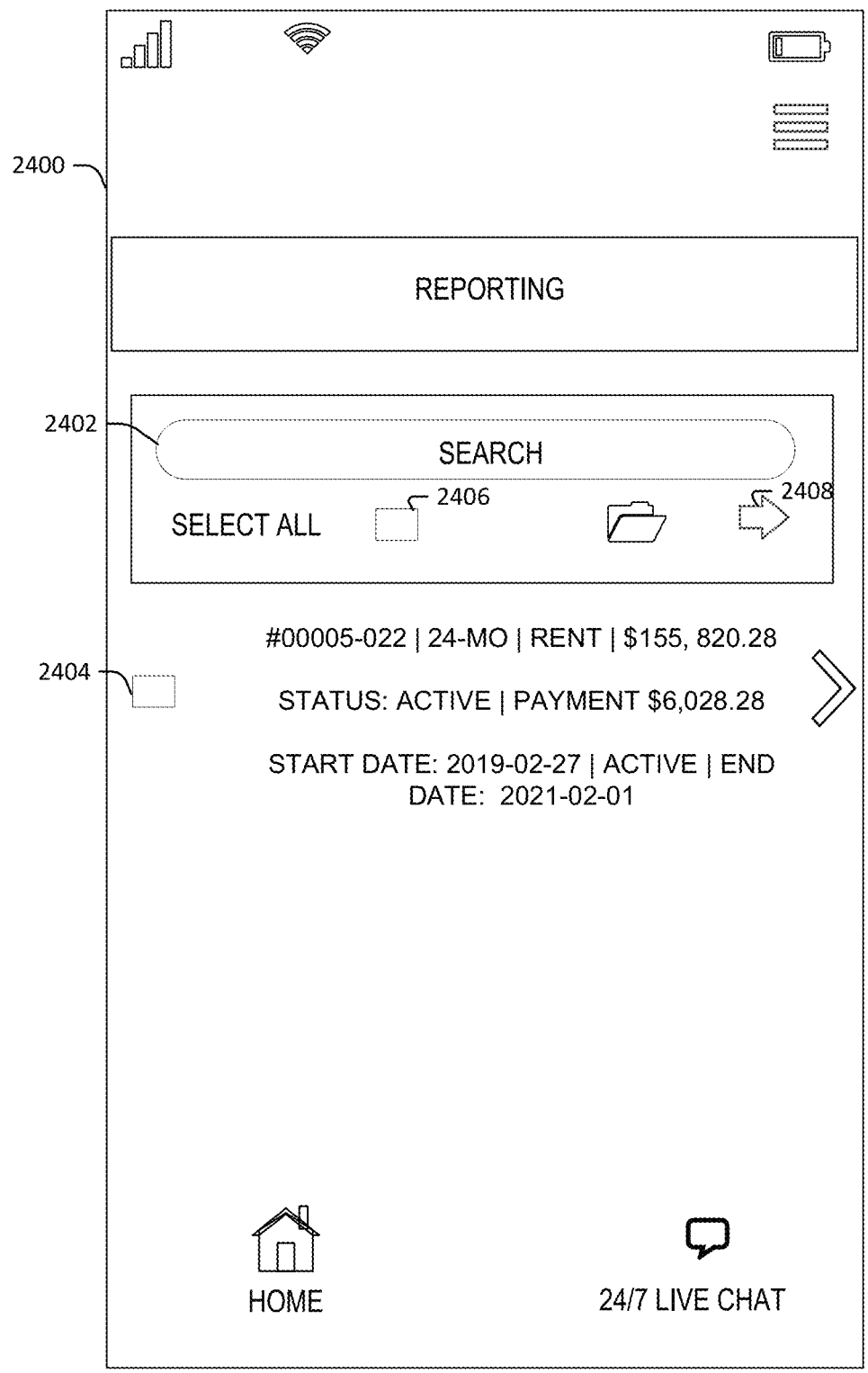
FIG. 24 illustrates a UI of a reporting page, according to some examples of the present disclosure.

FIG. 24 illustrates a reporting page according to some examples of the present disclosure. Responsive to the first entity selecting terms on the project detail page 2300, any transactions ready to be incorporated into a resource allocation offer may be listed on a reporting page 2400. The reporting page 2400 may allow the first entity to search 2402 particular transactions. The first entity may also be able to select a particular transaction by selecting a check box 2404. If more than one transaction is available, the first entity may be able to select multiple transactions by clicking the check box 2404 corresponding to the particular transaction, or by selecting select all 2406. Once the first entity has selected the transactions from which to create a resource allocation agreement, the first entity may select an arrow 2408 to advance to a step in which a resource allocation offer is generated and presented for digital signature.

FIG. 25 illustrates a digital signature page according to some examples of the present disclosure. On the digital signature page 2500, the first entity may be presented with a resource allocation agreement 2506 for the first entity to review. The system may allow the first entity to digitally sign the contract immediately or send the document for review 2502. If the first entity selected to send the document for review 2502, the system may export the document (e.g., to a word processing program) so the first entity may review the terms of the document offline.

In an example, the system may allow the first entity to save the project for later by selecting an icon 2508 on the digital signature page 2500. The system may retain any unsigned contracts to await digital signing by the first entity. The system may update and re-price any unsigned contracts daily based on changes in market interest rates. The system may further notify the first entity of any unsigned contracts when the first entity logs into the system. Whether the first entity decides to save the project for later or not, the first entity may digitally sign the contract to finalize the process by selecting finish 2504.

Responsive to selecting finish 2504, the first entity may be prompted to execute a click-wrap agreement, by checking a box or clicking a link or a button or the like, which signals the first entity's assent to abide by the terms of the resource allocation offer. In another example, the first entity may use a biometric feature of a first entity device such as, for example, a fingerprint identification or facial recognition feature on a smartphone or tablet to "sign" the resource allocation offer. In another example, the system may present the first entity with a signature box in which the first entity may enter the first entity's signature, such as with the first entity's finger or using a stylus.

The system may use multiple means of capturing the assent of the first entity to the terms of the resource allocation offer. For example, the system may require the first entity to execute a combination of "signing" methods as described above, such as the first entity executing a click-wrap agreement and submitting a biometric through the architecture of a user device. Or, as another example, the system may require the first entity to enter the first entity's signature in a signature box, and enter a code sent to the first entity through a text message, a telephone call, generated by an authenticator service, or the like.

FIG. 26 illustrates a stored document page according to some examples of the present disclosure. In an example, once a first entity digitally signs the documents, they are stored in a database which can be accessed through the system. The first entity may see a listing of any active transactions and the payment amount for the transactions. When the first entity selects an agreement, the first entity may be taken to a stored document page 2600 for that agreement. The first entity may then review details of a transaction or display a copy 2602 of the entire contract. In an example, the system may record a copy of the completed and executed agreement 2602 on a private database. In some examples, the private database may be organized as a blockchain. In some examples, the contract may be hashed, and the hash may be stored on a public blockchain network (e.g., Ethereum), which will provide users and authorized third parties (e.g., accountants, regulators, or auditors) with direct access to the documents. Storing the hash of the contract on a public database makes the contract immutable. In some examples, the contract may include identity verification information of the first entity making the contract, payment details (e.g., confirmation that payment was made), financing terms, financing conditions, signature information, or the like. By storing this information on a private database (e.g., a private blockchain) and then storing a hash (a mathematical function that maps data of arbitrary size onto data of a fixed size) value of that contract, the system may have additional assurances that the contract has not been modified. In some examples, the hash may be a secure hash algorithm SHA-1, MD5, RIPEMD-128/160 or similar hash function.

Throughout the as-filed disclosure the term resource allocation may include loan financing, such as commercial loan financing for equipment lease or purchase or other similar financing. A resource pre-committal may include financing pre-approval for the second entity. Resource allocation limits may include credit limits, term limits, rate modifiers (e.g., interest rate modifiers) or the like. Historical data on resource management may include past resource allocation data (e.g., credit history) of the second entity or other similar information regarding the second entity such as one or more credit scores, liens, judgments, revenue, years in business, number of employees, paid indicators, or the like. A resource allocation request may include a document such as an invoice or other similar billing document for the purchase or lease of equipment. Transaction parameters from an image of a resource allocation request may include price, vendor information, equipment information, quantity information, or other similar information regarding the transaction. Resource allocation parameters may include key characteristics of a transaction such as dollar amount (including a total amount to be financed, which may include price information from a combination of resource allocation requests), vendor information or the like. A resource allocation offer may include a digital contract which include parameters based on the resource pre-committals and the resource allocation parameters from the resource allocation request. Inter-dependent offer parameters may include loan term or duration, financing type (e.g., purchase or rental), interest rate, or the like. A first entity may be a user of the system, authorized the bind a second entity to financial agreements (such as an executive, employee, agent, or other similar affiliated person or individual). The second entity may be a business, company, corporation, limited liability company, partnership, joint venture, or other similar organization the first entity is affiliated with.

Figure 27:
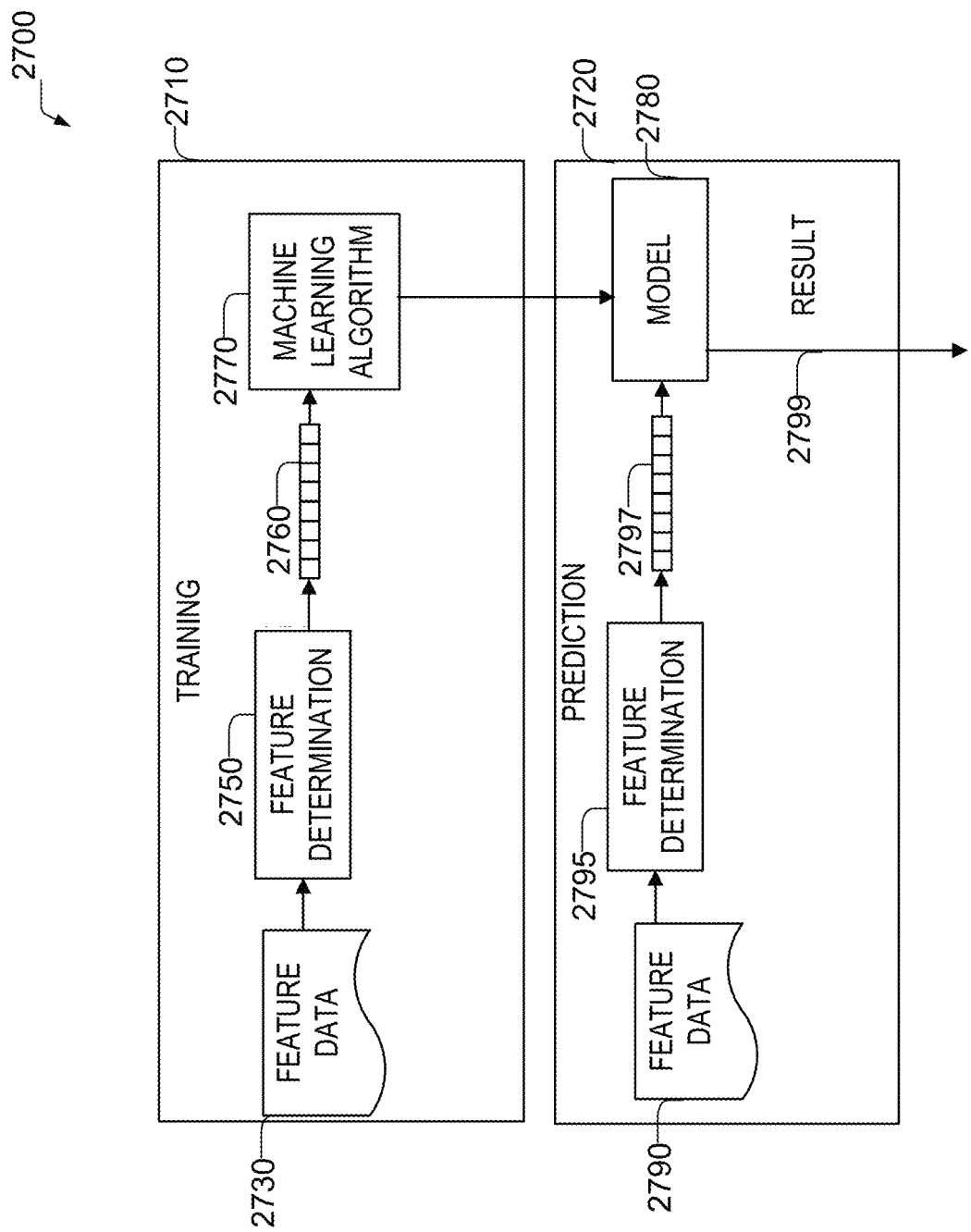
FIG. 27 illustrates an example of a machine learning module, according to some examples of the present disclosure.

FIG. 27 shows an example machine learning module 2700 according to some examples of the present disclosure. Machine learning module 2700 utilizes a training module 2710 and a prediction module 2720. Training module 2710 feeds training feature data information 2730 into feature determination module 2750. Feature data 2730 may be labelled or unlabeled. Feature determination module 2750 determines one or more features 2760 from this information. Features 2760 are a subset of the information input and is information determined to be predictive of a desired result. The machine learning algorithm 2770 produces a model 2780 based upon the features 2760 and in some examples, the model 2780 is refined based upon feedback associated with those features.

In the prediction module 2720, feature data 2790 may be input to the feature determination module 2795. Feature determination module 2795 may determine the same set of features or a different set of features as feature determination module 2750. In some examples, feature determination module 2795 and 2750 are the same module. Feature determination module 2795 produces features 2797, which are input into the model 2780 to generate a result 2799. The training module 2710 may operate in an offline manner to train the score model 2780. The prediction module 2720, however, may be designed to operate in an online manner. It should be noted that the score model 2780 may be periodically updated via additional training and/or user feedback.

The machine learning algorithm 2770 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5. Classification and Regression Tree (CART), Chi-squared Automatic Interaction Detector (CHAID), or the like), random forests, linear classifiers, quadratic classifiers, k-nearest neighbor, linear regression, and hidden Markov models. Examples of unsupervised learning algorithms include expectation-maximization algorithms, vector quantization, and information bottleneck method.

In some examples, the machine learning module 2700 may be used to predict transaction parameters from OCR'd text. In these examples, the feature data 2730 and 2790 may include phrases such as "Total Due" before price, or "vendor" before a name. The result 2799 comprises a predictive set of resource allocation transaction parameters which may include price, vendor information, equipment information, quantity information, or the like.

Similarly, in some examples, the machine learning module 2700 may be used to predict the second entity's likelihood of timely payment. In these examples, the feature data 2730 and 2790 may include past resource allocation data (e.g., credit history) or other information regarding the second entity (e.g., credit scores, liens, judgments, revenue, years in business, paid indicators, or the like). The result 2799 comprises pre-committal parameters which may be used to determine a set of resource management pre-committals. In some examples, the pre-committal parameters may be one or more scores.

Figure 28:
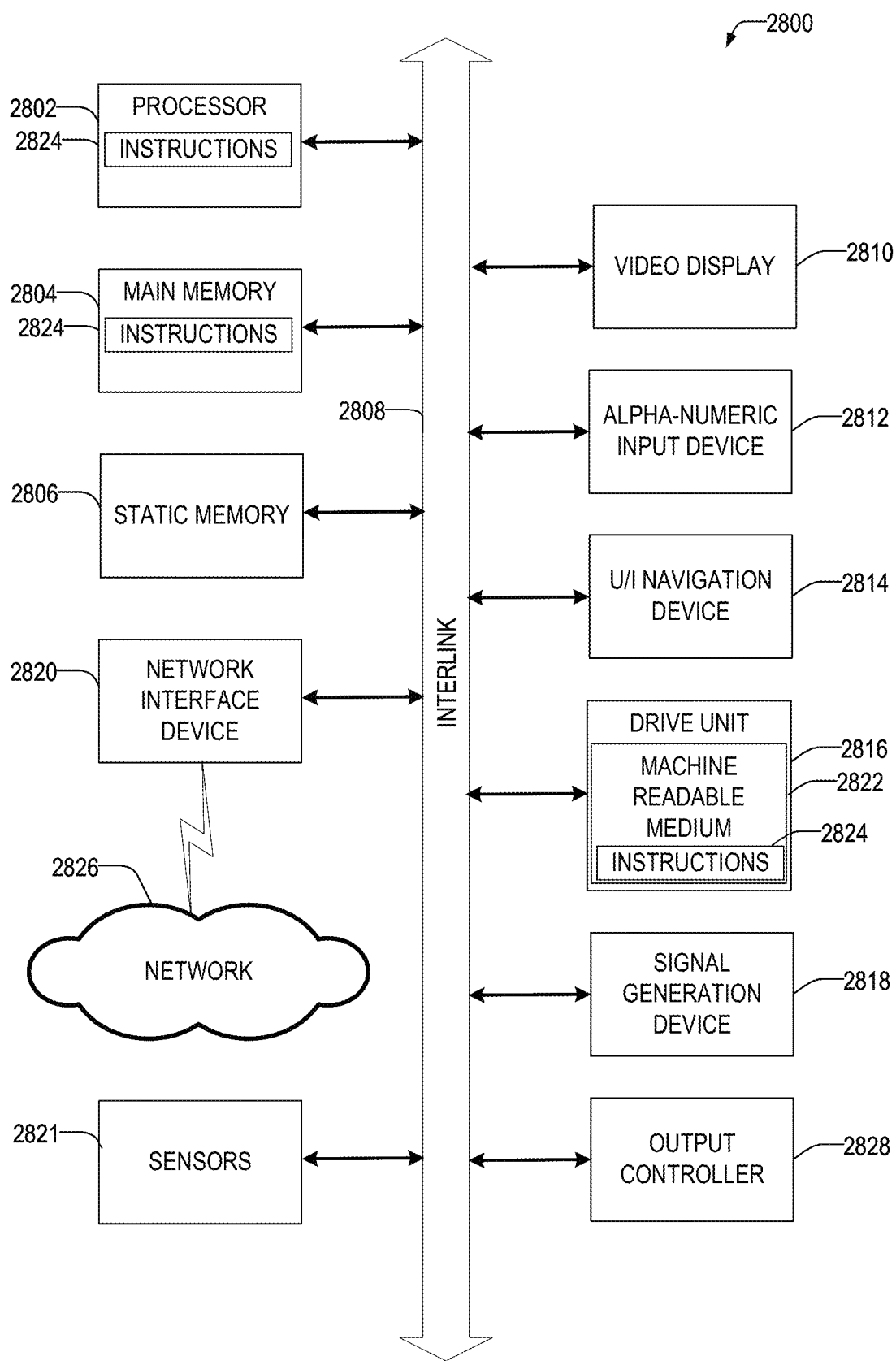
FIG. 28 illustrates generally an example of a block diagram of a machine upon which any one or more of the techniques discussed herein may perform, according to some examples of the present disclosure.

FIG. 28 illustrates a block diagram of an example machine 2800 upon which any one or more of the techniques (e.g., methodologies) discussed herein may perform. In alternative examples, the machine 2800 may operate as a standalone device or may be connected (e.g., networked) to other machines. In a networked deployment, the machine 2100 may operate in the capacity of a server machine, a client machine, or both in server-client network environments. In an example, the machine 2800 may act as a peer machine in peer-to-peer (P2P) (or other distributed) network environment. The machine 2800 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify commands to be taken by that machine. Machine 2800 may implement the GUIs of FIGS. 13-25, or the screens/user interfaces of FIGS. 31-37 and implement the process of FIG. 12, 29, or 30 and any process described herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2800 may include a hardware processor 2802 (e.g., a central processing unit (CPU), a graphics processing unit (GPU), a hardware processor core, or any combination thereof), a main memory 2804 and a static memory 2806, some or all of which may communicate with each other via an interlink (e.g., bus) 2808. The machine 2800 may further include a display unit 2810, an alphanumeric input device 2812 (e.g., a keyboard), and a user interface (UI) navigation device 2814 (e.g., a mouse). In an example, the display unit 2810, input device 2812 and UI navigation device 2814 may be a touch screen display. The machine 2800 may additionally include a storage device (e.g., drive unit) 2816, a signal generation device 2818 (e.g., a speaker), a network interface device 2820, and one or more sensors 2821, such as a global positioning system (GPS) sensor, compass, accelerometer, or other sensor. The machine 2800 may include an output controller 2828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2816 may include a machine readable medium 2822 on which is stored one or more sets of data structures or instructions 2824 (e.g., software) embodying or utilized by any one or more of the techniques or functions described herein. The instructions 2824 may also reside, completely or at least partially, within the main memory 2804, within static memory 2806, or within the hardware processor 2802 during execution thereof by the machine 2800. In an example, one or any combination of the hardware processor 2802, the main memory 2804, the static memory 2806, or the storage device 2816 may constitute machine readable media.

The system may, using its processing circuitry and instructions executed by at least one non-transitory machine-readable media, implement any of the methods or phases, such as those described, for example, for FIGS. 1-12 above or the web-based onboarding such as described for FIGS. 31-37 below, or any other methods or phases described herein.

While the machine readable medium 2822 is illustrated as a single medium, the term "machine readable medium" may include a single medium or multiple media (e.g., a centralized or distributed database, and/or associated caches and servers) configured to store the one or more instructions 2824.

The term "machine readable medium" may include any medium that is capable of storing, encoding, or carrying instructions for execution by the machine 2800 and that cause the machine 2800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 2824 may further be transmitted or received over a communications network 2826 using a transmission medium via the network interface device 2820. The Machine 2800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2820 may include one or more physical jacks (e.g., Ethernet, coaxial, or phone jacks) or one or more antennas to connect to the communications network 2826. In an example, the network interface device 2820 may include a plurality of antennas to wirelessly communicate using at least one of single-input multiple-output (SIMO), multiple-input multiple-output (MIMO), or multiple-input single-output (MISO) techniques. In some examples, the network interface device 2820 may wirelessly communicate using Multiple User MIMO techniques.

Pre-Qualification/Web-Based Onboarding Options

The system may allow the second entity (e.g., a company, corporation, partnership, limited liability company, or other entity applying for resources) to be pre-qualified through a prequalification phase or web-based onboarding phase, which may set up some of the parameters for the transaction prior to the first entity installing the resource allocation system application on his or her device. Use of a prequalification phase or web-based onboarding may allow a user/first entity who has the resource allocation system application installed on his or her device to perform at least some of the steps of one or more of the phases outside of the resource allocation system application. This may make the resource allocation system application run more quickly and efficiently and require less processing power from the device on which the resource allocation system application is installed.

Such a pre-qualification may be performed by a qualifying entity who may be an agent or employee of a third entity, such as a vendor, providing or selling equipment or material to the second entity. Alternatively, the pre-qualification may be performed by the first entity through a web-based onboarding process, such as on, in, through, or the like, an internet browser, or the pre-qualification may be initiated in a web-based shopping cart, such as on a website of the third entity through which the first entity can purchase equipment or material on behalf of the second entity.

It is understood that any one or more of the web-based onboarding screens as described below may be omitted or may have some fields omitted or inactive based on how the onboarding is initiated (e.g., whether initiated through a web-based shopping cart versus a web portal used by an employee or agent of the vendor selling or leasing equipment to the company). It is also understood that one or more of the web-based onboarding screens may include additional fields not shown or described. It is also understood that web-based onboarding may replace or supplement portions or some steps of the various phases of the resource allocation system application, and that information or documentation not submitted through the web-based onboarding may be submitted in the resource allocation system application, as desired or necessary. The use of web-based onboarding to complete one or more of the phases (e.g., the setup phase, import phase, processing phase, or the like) of the resource allocation system application may make the application run more quickly and efficiently, and require less processing power from the device on which the resource allocation system application is installed. For example, if a resource allocation request is input during a prequalification phase with equipment information or invoice information, a hard-copy is not required to be printed. OCR'd, filled in, and corrected. If this information is digitally transmitted, it is much faster, and more efficient. For example, such a system can save on OCR processing cycles, reduce the need for corrections, or the like. Similarly, other devices connected to the system may require less processing resources. For example, when fewer corrections are needed, the trained learning model requires less processing power. Thus, use of the web-based onboarding process can improve the functionality of the device running the resource allocation system application, devices connected via the network, or the like.

Figure 29:
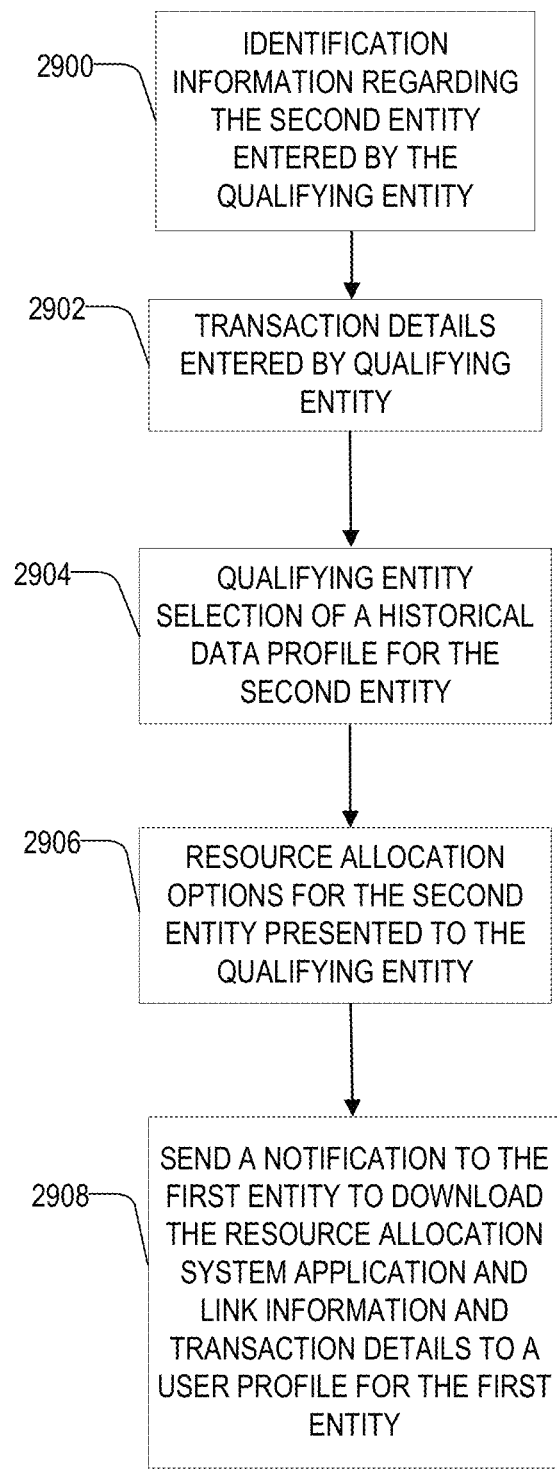
FIG. 29 illustrates a flow chart of a pre-qualification phase for an accelerated resource allocation system, according to some examples of the present disclosure.

FIG. 29 illustrates a flow chart of a pre-qualification phase for an accelerated resource allocation system, according to some examples of the present disclosure. In an example, a purchase by the second entity may be pre-qualified prior to the first entity using the resource allocation system. At Step 2900 A browser or other application may send a request handled by a web server connected via the network. The web server may send graphical user interface descriptors back to the browser and the GUI descriptors may cause the browser to render one or more GUIs which then accept input. A qualifying entity who may be an agent or employee of a third entity may enter/input information/details, such as identification information, corresponding to the second entity (e.g., business name and location (e.g., city and state) of the headquarters or principal place of business of the second entity, or the like), into a web browser on the qualifying entity's device (e.g., a desktop computer, notebook computer, tablet, mobile phone, or the like). The qualifying entity's device may be a personal or work device owned by the qualifying entity, but not used by the first entity or any other agent or employee of the second entity.

The information entered by the qualifying entity may be stored in a resources and entity information data structure such as an array, a linked list, or any similar suitable data structure. This data structure can be stored on a server connected to the qualifying entity's device via a network such as a local area network (LAN), wide area network (WAN), or the like. Then, when the user/first entity signs up for, downloads, and installs the resource allocation system application, the data structure can be matched with the user and the information imported into the resource allocation system application. The qualifying entity may then choose the second entity's name from a list of company names retrieved from a database connected to or located on an alternate device (e.g., a server of a private or governmental agency that maintains business/company name and registration information) over a network, such as a local area network (LAN), a wide area network (WAN), the Internet, or the like.

At Step 2902, the qualifying entity may enter in transaction details (e.g., transaction amount, vendor information, or the like) into the web browser on the qualifying entity's device. The transaction details can be stored in the resources and entity information data structure that may be sent via the network and stored on a server. In an example, the system may use separate data structures, such as an entity information data structure and a resources information data structure. In such an example, the different data structures may be stored on the same or a different server and the data structures matched to the first entity as described above. At Step 2904, the qualifying entity may select a historical data profile for the second entity retrieved from a database connected to or located on a second alternate device. The historical data may include past resource allocation data (e.g., credit history) of the second entity obtained from one or more third-party data sources such as credit reporting agencies, social networking services, business databases (e.g., DUN AND BRADSTREET®), or the like.

When the system qualifies the transaction, at Step 2906 the qualifying entity may be presented at least one resource allocation option for the second entity. The resource allocation options may include one or more financing terms such as a rate of interest, duration, or the like, to present to the first entity. In an example the system may present a plurality of resource allocation options. The system may determine the plurality of resource allocation options based upon the resource management pre-committals and the resource allocation parameters from the resource allocation request. In another example, the plurality of resource allocation options may be based on pre-committal parameters (e.g., resource pre-committal parameters), market parameters, and transaction parameters. Resource allocation options may include a structure (e.g., rent or loan of the resource), a term, an interest rate, or the like. These options may be set based upon a set of one or more rules that may factor in the pre-committal parameters, market parameters, transaction parameters, or the like. The rules may be created based upon an administrator of the system, or the like. The resource allocation options may be stored on the same or a different server as the information regarding the second entity and the transaction details entered by the qualifying entity, as discussed above.

At Step 2908, the qualifying entity may cause/initiate a notification to be sent to the first entity (e.g., a text message containing a link) that will allow the first entity to download the resource allocation system application over a network, such as a local area network (LAN), a wide area network (WAN), the Internet, or the like. In an example, the notification may include an identifier or a token that may unlock the data structure or data structures described above. The notification may be sent in response to the qualifying entity making a selection in the browser on the qualifying entity's device. For example, clicking on a web link (e.g., a Hyper-Text Transfer Protocol (HTTP) link), a radial selection button, entering a mobile phone number, entering an email address, or the like. The notification may be in the form of a text message, a link in an electronic mail message, or the like, sent to the first user's device from a database connected to or located on a third alternate device (e.g., an app store server), prompting the first entity to download or install a resource allocation system application.

Once the first entity downloads and installs the resource allocation system application on his or her device, and completes the identity verification described in FIG. 5, above, the details of the transaction along with resource allocation options may be linked to the first entity's user profile/user account (e.g., linked via a code in the notification/text message/email message initiated by the qualifying entity or based upon information entered by the first entity) and presented to the first entity in the resource allocation system application. In an example, when the token is transmitted in the notification and unlocks the data structure, the identity verification step of FIG. 5 may be skipped or omitted. The first entity may then confirm/verify the linked information, transaction details, or the like. In response to accepting a resource allocation option, the system may create a resource allocation offer, which when accepted by the first entity as described above in FIG. 10 and cause the system to allocate the resource as described in FIG. 11.

In an example, a resource allocation option based on selection of the inter-dependent offer parameters (e.g., the term/duration of the resource allocation repayment, the interest rate corresponding to the repayment duration, or the like) may be selected prior to the first entity downloading and installing resource allocation system application (e.g., the first entity may tell the qualifying entity which option he or she chooses), at which point a resource allocation offer may be created and stored (e.g., in a resource allocation data structure) on the same or a different server as the information corresponding to the second entity or the transaction details. Then the resource allocation offer may be linked to the first entity's user profile/account (e.g., linked via a code in the notification/text message/email message initiated by the qualifying entity or based upon information entered by the first entity) in response to the first entity engaging the notification, downloading and installing the resource allocation system application, and completing the identity verification presented to the first entity in the resource allocation system application. In an example, the resource allocation data structure may be unlocked with the token discussed above. The first entity may then confirm/verify the linked information, transaction details, or the like. In such an example, the first entity can accept the resource allocation offer as described in FIG. 10 and cause the system to allocate the resource as described in FIG. 11.

Figure 30:
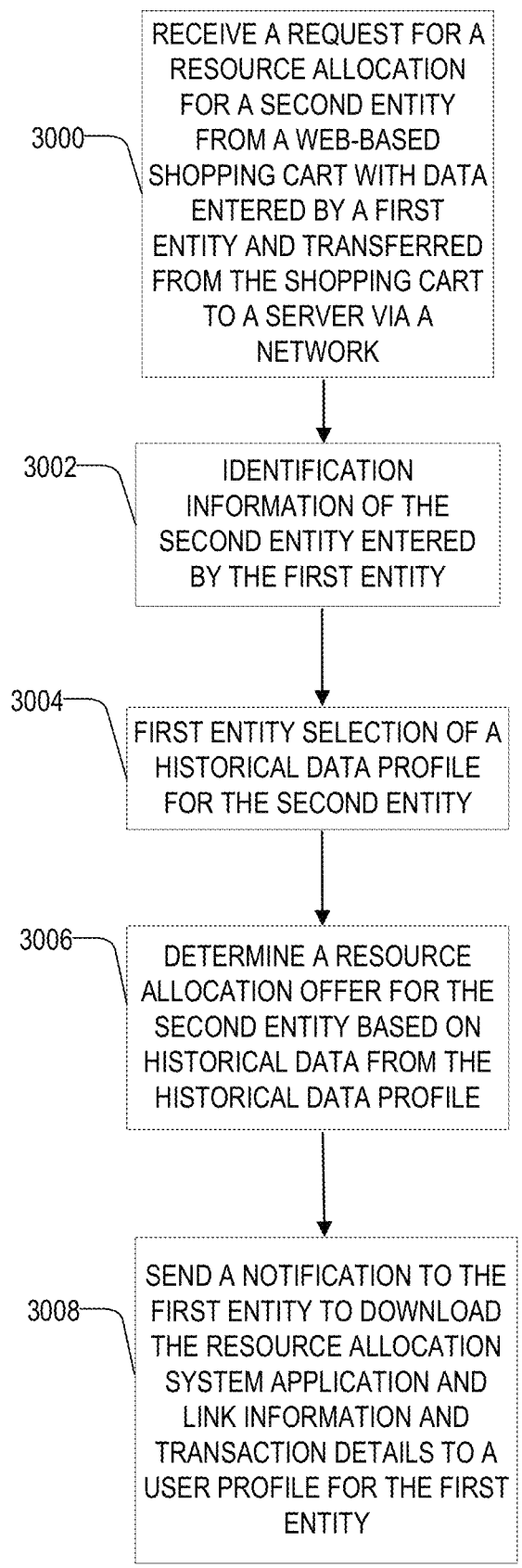
FIG. 30 illustrates a flow chart of an accelerated resource allocation system in conjunction with a web-based shopping cart, according to some examples of the present disclosure.

FIG. 30 illustrates a flow chart of an accelerated resource allocation system in conjunction with a web-based shopping cart, such as the web-based shopping cart 710 described above, according to some examples of the present disclosure. Step 3000 may include the system receiving a request for a resource allocation for a second entity from a web-based shopping cart. The system may receive the request in the manner as described in detail in the description of FIG. 7, above. Returning to FIG. 30, in an example, a transaction may be initiated by the first entity from a web-based shopping cart on a website or through a shopping application associated with the third entity. Here again, the third entity may be a vendor or a manufacturer providing equipment or material (e.g., selling or leasing equipment or material) to the second entity. In an example, the first entity may select one or more items or pieces of equipment to purchase on behalf of the second entity on a web site or shopping application of the third entity by adding the items/equipment to the shopping cart. In response to the first entity selecting, choosing, or the like, an option to finance the items/equipment in the shopping cart, data from the shopping cart (e.g., item type, number of each item in the cart, price of each item, total price of all items in the cart, or the like), a request for a resource allocation may be created and sent and stored on a server via a network. In such an example, the shopping cart may redirect the user to the resource allocation system server which may present a fillable form in the shopping cart on the third-party's website in which the first party enters information as described below. In an example, the shopping cart may redirect the first entity to a new web page (e.g., a pop-up window) that connects to the resource allocation system server where the first entity enters requested information and is then returned to the shopping cart at the completion of the process.

At Step 3002, the first entity may enter identification information of the second entity. This may be in a form field in the web-based shopping cart, in a new browser window, such as a pop-up window, or the like. The information may include the legal name of the second entity, the location (e.g., city and state) of the headquarters, place of incorporation, principal place of business, or the like, of the second entity. The information entered by the first entity may be sent to the same or a different server that the created request for a resource allocation is saved/stored. In an example, the request for a resource allocation may be updated with the identification information of the second entity entered by the first entity. In an example, the first entity may be prompted to choose the second entity's name from a list of company names retrieved from a database connected to or located on an alternate device (e.g., a server of a private or governmental agency that maintains business/company name and registration information) over a network, such as a local area network (LAN), a wide area network (WAN), the Internet, or the like.

At Step 3004, the first entity may select a historical data profile for the second entity from a database. The historical data profile for the second entity may be retrieved from a database connected to or located on a second alternate device. The historical data may include past resource allocation data (e.g., credit history) of the second entity obtained from one or more third-party data sources such as credit reporting agencies, social networking services, business databases (e.g., DUN AND BRADSTREET®), or the like.

Step 3006 may include determining a resource allocation offer for the second entity based on historical data from the historical data profile. The resource allocation offer may be based on one or more resource allocation options. The resource allocation options may be based on pre-committal parameters (e.g., resource pre-committal parameters, market parameters, transaction parameters, or the like). Resource allocation options may include a structure (e.g., rent or loan of the resource), a term, an interest rate, or the like. These options may be set based upon a set of one or more rules that may factor in the pre-committal parameters, market parameters, transaction parameters, or the like. The rules may be created based upon an administrator of the system, or the like. In an example, the terms of the resource allocation offer may be limited or otherwise also determined based on the preferences of the third entity, supplier, vendor, or the like. The resource allocation options, and the resource allocation offer may be stored in one or more data structures such as those discussed above and unlocked with a token sent in the notification and saved on the same or a different server as the information or data structures corresponding to the second entity and the transaction details, as discussed above.

Step 3008 may include sending a notification to the first entity to download the resource allocation system application and linking the information of the second entity and transaction details to a user profile for the first entity.

In an example the first entity may cause/initiate a notification to be sent to himself or herself (e.g., a text message containing a link) that will allow the first entity to download the resource allocation system application over a network, such as a local area network (LAN), a wide area network (WAN), the Internet, or the like. The notification may be sent in response to the first entity making a selection in the web-based shopping cart, or a browser window that opens or pops-up from the web-based shopping cart. For example, the first entity may be prompted to click on a web link (e.g., a HyperText Transfer Protocol (HTTP) link), a radial selection button, enter a mobile phone number, enter an email address, or the like. The notification may be in the form of a text message, a link in an electronic mail message, a link on a web-based shopping cart, or the like, sent to the first user's device from a database connected to or located on a third alternate device (e.g., an app store server), prompting the first entity to download or install a resource allocation system application. Once the first entity downloads and installs the resource allocation system application on his or her device, and completes the identity verification described in FIG. 5, above, the details of the transaction along with resource allocation options may be linked to the first entity's user profile/user account (e.g., linked via a code in the notification/text message/email message initiated by the first entity or based upon information entered by the first entity) and presented to the first entity in the resource allocation system application.

If the first entity has downloaded and installed the resource allocation system application previously, the code in the notification may open the resource allocation system application on the first entity's device and link the transaction details, resource allocation offer, etc., as described above. Otherwise, the first entity may be prompted to set up a new user profile in the resource allocation system application, at which point the transaction parameter, resource allocation offer, etc., may be linked to the created user profile. The first entity may then confirm/verify the linked information, transaction details, or the like. In response to accepting a resource allocation option, the system may create a resource allocation offer, which when accepted by the first entity as described above in FIG. 10 and cause the system to allocate the resource as described in FIG. 11.

In an example, a resource allocation option may be selected, and/or the installing the resource allocation system application. In an example, when the first entity makes a selection in the web-based shopping cart, the web browser may direct, pass, or the like, information (e.g., second entity name information) to the Resource Allocation system server, platform or the like, where one or more "lookups" corresponding to the second entity may be facilitated, initiated or the like. The first entity may then select the name of the company/second entity which may then trigger resource allocation scoring (e.g., credit scoring, the pre-committal parameter score, or the like) and resource allocation approval (e.g., credit approval) for the second entity. The first entity may be notified, such as after selecting the second entity's name) that the second entity is approved for resource allocation (e.g., via a message on the webpage, in a pop-up browser window, or the like), at which point the first entity may accept and digitally sign the resource allocation offer in the web-based shopping cart, or in a browser window opened from the web-based shopping cart, at which point a resource allocation offer may be created and stored on the same or a different server as the information corresponding to the second entity or the transaction details. Then the resource allocation offer may be linked to the first entity's user profile/account (e.g., linked via a code in the notification/text message/email message initiated by the first entity or based upon information entered by the first entity) in response to the first entity downloading and installing the resource allocation system application and completing the identity verification presented to the first entity in the resource allocation system application. The first entity may then see/confirm/verify/edit the linked information, including the transaction details, the resource allocation offer details, or the like.

FIG. 31 illustrates an example of a first page of a web-based onboarding registration screen according to some examples of the present disclosure. In an example, the first page of the web-based onboarding registration screen 3100 can be accessible through a website, a web portal, or the like. Additionally, or alternatively, the first page of the web-based onboarding registration screen 3100 may be accessed through a link from a web-based shopping cart, or any similar web site through which a transaction for the purchase or lease of equipment or material may be started, initiated, or the like. In an example, the first page of the web-based onboarding registration screen 3100 may contain several fields such as a first name field 3102, a last name field 3104, a title field 3106, a mobile number field 3108, an email address field 3110, a password field 3112, and a confirm password field. 3114. The information entered into the various fields may correspond the name of the first entity/user of the resource allocation system application, as well as the title of the first entity at the company/second entity (e.g., the first entity's position in the company). The information can be filled out by the first entity or by the qualifying entity, depending on how the pre-qualification process is initiated. It is understood that the first page of the web-based onboarding registration screen 3100 may contain additional fields.

Figure 32:
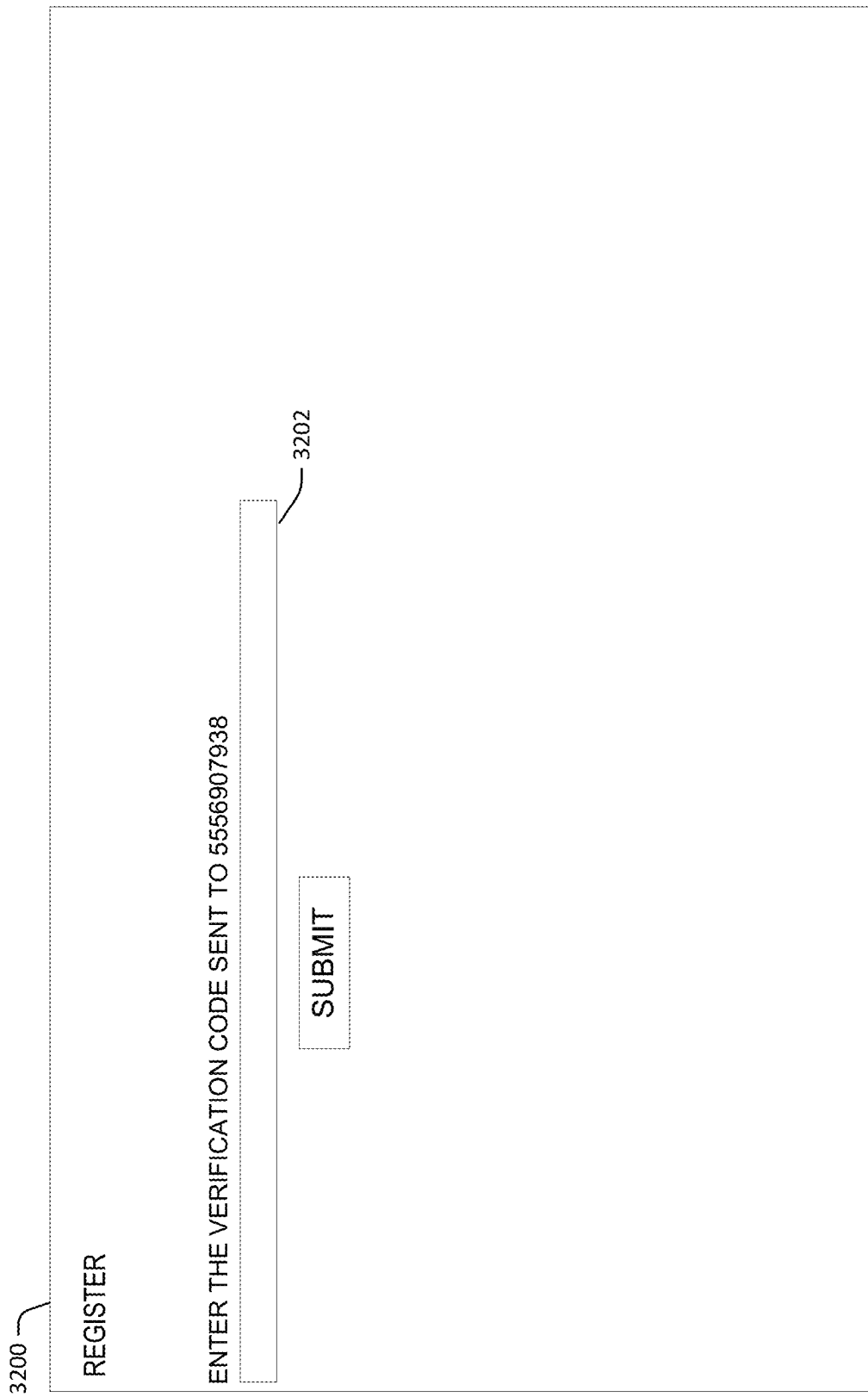
FIG. 32 illustrates an example of a second page of a web-based onboarding registration screen according to some examples of the present disclosure.

FIG. 32 illustrates an example of a second page of a web-based onboarding registration screen according to some examples of the present disclosure. In an example, when the first page of the web-based onboarding registration screen 3100 is completed, filled out, or the like, and submitted the system may cause a verification code to be generated and sent to the first entity/user of the resource allocation system application, such as to a cell phone, tablet, or any device through which the first entity can receive text messages. SMS messages, email message, or the like, and take the person/individual completing the web-based onboarding to the second page of the web based onboarding registration screen 3200. This may the telephone number entered into the mobile number field 3108 on the first page of the web-based onboarding registration screen 3100.

The second page of the web-based onboarding registration screen 3200 may contain a verification code field 3202 in which the person/individual completing the web-based onboarding process can enter the verification code. Submitting the verification code may save, store, or the like, the information entered, filled in, or the like, during the web-based onboarding process to a server, database, drive, or the like, connected via a network, and tie the information to the resource allocation system application. The verification code may cause/initiate a link to download the resource allocation system application, such as through an app store, to be sent to the first entity, and when the first entity downloads and installs the resource allocation system application, the information entered during the web-based onboarding process may automatically be stored, entered, saved, or the like, in the resource allocation system application. This allows the first entity to skip at least a portion of the setup process in the resource allocation system application.

FIG. 33 illustrates an example of a web-based onboarding first page of a company/second entity information screen according to some examples of the present disclosure. In an example, the first entity or qualifying entity may enter information regarding the company/second entity as a part of the web-based onboarding process. The first page of the company information screen 3300 may include fields such as a company legal name field 3302, in which the name of the company as it appears on registration documents, organization documents, or the like (such as a certificate of incorporation, articles of incorporation, articles of organization, partnership certificates, or the like) can be entered. In an example, the company name field 3302 may require the name of the company/second entity to match the name of the company/second entity as it appears on a state registration database (e.g., a state secretary of state database) in the state in which the company/second entity is registered, organized, incorporated or the like.

The first page of the company information screen 3300 may further include a tax id field 3304 in which a taxpayer identification number, Federal Employer Identification Number (FEIN number), a state company identification number, or the like may be entered. The first page of the company information screen 3300 may also contain a headquarters city field 3306 and/or a headquarters state field 3308. These fields may correspond to the city and state in which the headquarters, principal place of business, or the like, of the company/second entity is located. Additionally, or alternatively, they may correspond to the state in which the company/second entity is organized, incorporated, or the like. In an example, the headquarters city field 3306 may be omitted from the first page of the company information screen 3300, and only the headquarters state field 3308 or a similar state of incorporation/organization field included.

Figure 34:
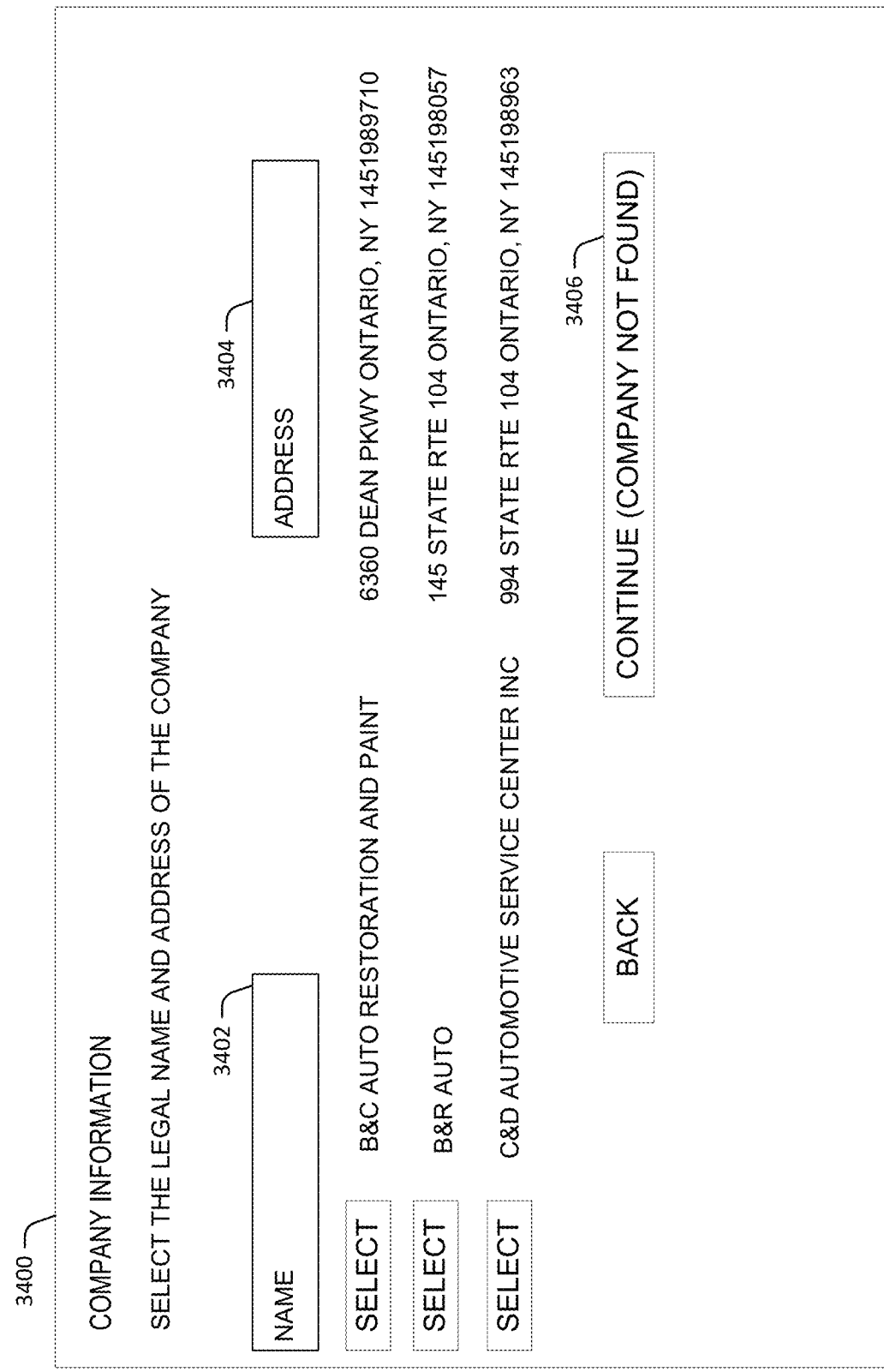
FIG. 34 illustrates an example of a second page of a web-based onboarding company information screen according to some examples of the present disclosure.

FIG. 34 illustrates an example of a web-based onboarding company information screen according to some examples of the present disclosure. When the first page of the company information screen 3300 is filled out, filled in, completed, or the like, and submitted, a user may be taken to a second page of the company information screen 3400. This page may contain a name column 3402 and an address column 3404, in which the name and address of possible matches to the company/second entity, based on the information submitted on the first page of the company information screen 3300, may be displayed. If the name of the correct company corresponding to the second entity appears on the second page of the company information screen 3400, the user may select the correct information for the second entity. Alternatively, if the correct name/address of the second entity does not appear on the second page of the company information screen 3400, the user may click a continue button 3406, continue link, or the like, indicating that the company name and address is not found.

Figure 35:
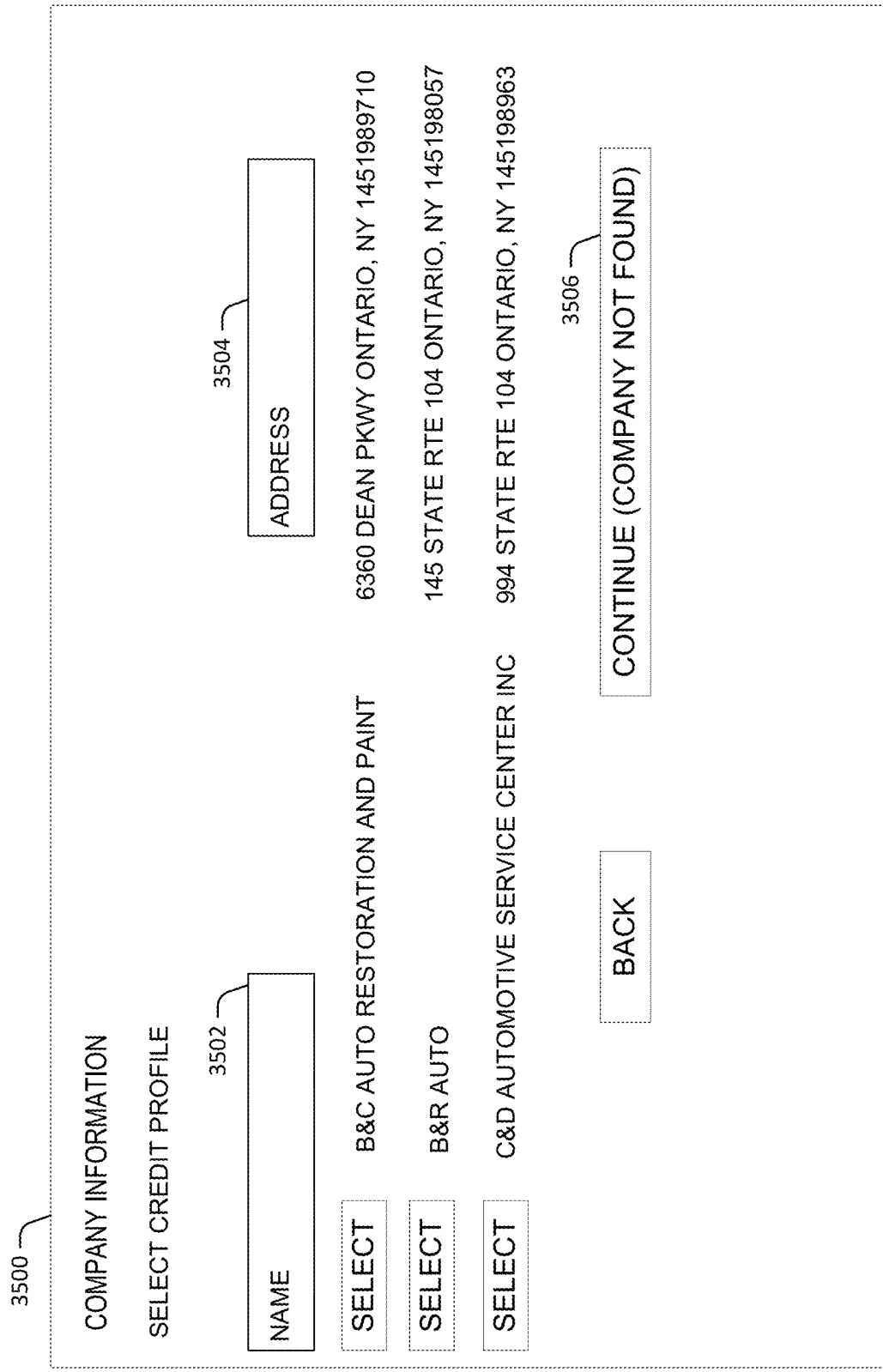
FIG. 35 illustrates an example of a web-based onboarding company information credit profile screen according to some examples of the present disclosure.

FIG. 35 illustrates an example of a web-based onboarding company information credit profile screen according to some examples of the present disclosure. Similar to the second page of the company information screen 3400, the company information credit profile screen 3500 may include a name column 3502 and an address column 3504, that list company names and addresses that are a potential match for the second entity. If the correct name and address for the second entity appears in the list of possible matches, the user can select the corresponding name/address. Selection of the name/address of the second entity on the company information credit profile screen 3500 may pull, import, collect, or the like, past resource allocation data for the second entity as described above in FIG. 6, from one or more third-party data sources such as credit reporting agencies, social networking services, business databases, or the like, into the resource allocation system application.

Alternatively, if the correct name and address of the second entity does not appear on the company information credit profile screen 3500, the user can click a continue button 3506, continue link, or the like. When the name/address of the second entity is not found, the web-based onboarding system may cancel the process. Alternatively, the user may be allowed to complete the web-based onboarding but may be provided a notice that the resource management pre-committals may be affected (e.g., the second entity may be pre-qualified for a lower financing amount, or may be subject to a higher interest rate, or the like). Additionally, or alternatively, when the second entity is not found on the second page of the company information screen 3400 or the company information credit profile screen 3500, the web-based onboarding system may require a personal guarantee (such as shown and described in FIG. 37 below) may be required in order for the web-based onboarding process to be completed.

In an example, the second page of the company information screen 3400 and the company information credit profile screen 3500 may be displayed to the user/first entity/qualifying entity in addition to each other or as alternates for one another when the first page of the company information screen 3300 is completed and submitted. Which screen is displayed during the web-based onboarding process may depend on whether the onboarding is being performed by a qualifying entity, or by the first entity, whether the onboarding process is initiated through a web-based shopping cart, or the like.

Figure 36:
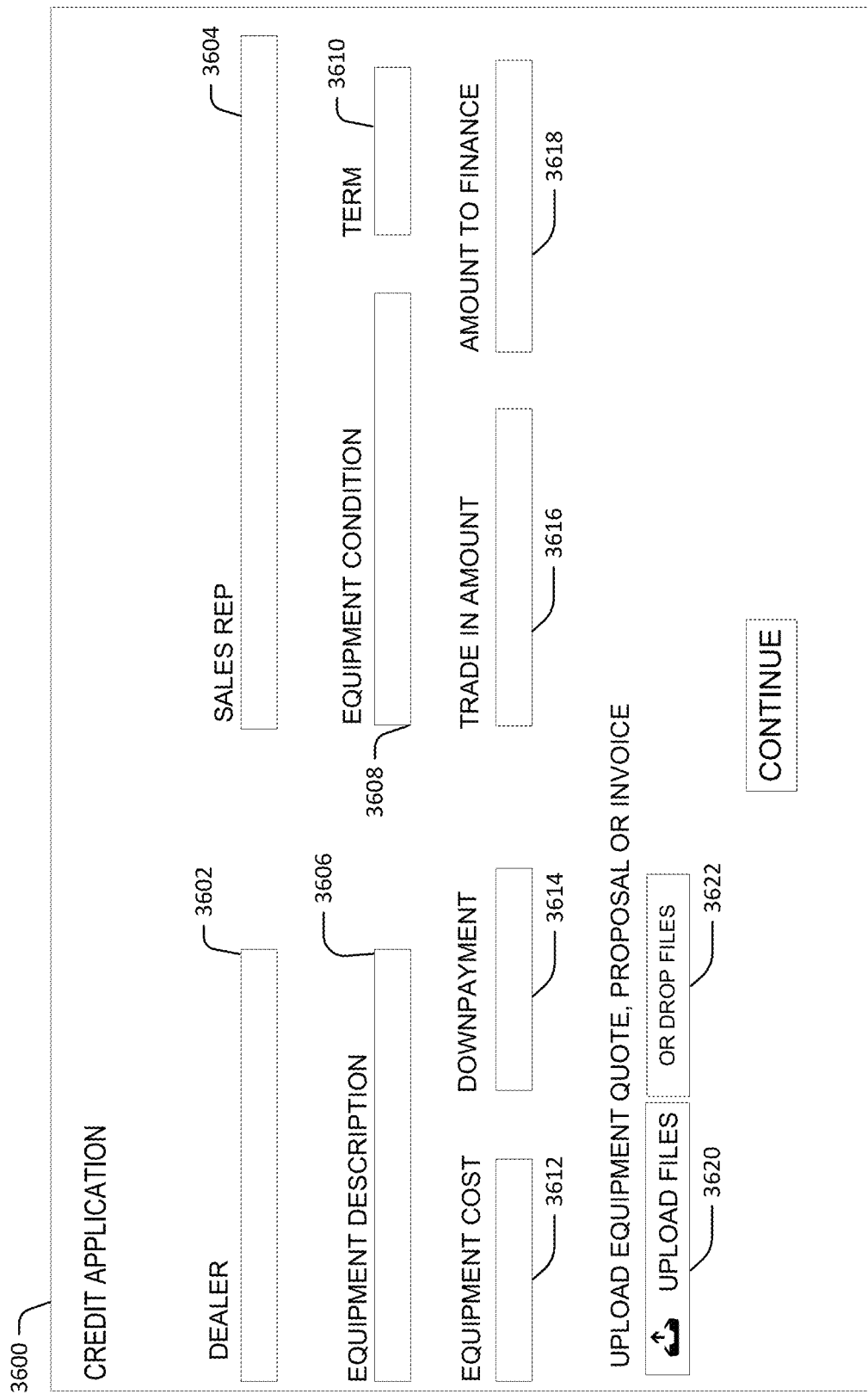
FIG. 36 illustrates an example of a web-based onboarding credit application screen according to some examples of the present disclosure.

FIG. 36 illustrates an example of a web-based onboarding credit application screen according to some examples of the present disclosure. In an example, the credit application screen 3600 may include fields for a dealer 3602, which may be a vendor selling or leasing material or equipment to the second entity, a sales rep 3604, who may be the qualifying entity as described above. These fields may be shown, displayed, required, available, or the like, only when a qualifying entity is performing the web-based onboarding and may be deactivated or eliminated when the first entity is performing the web-based onboarding.

The credit application screen 3600 may additionally include fields for equipment description 3606, equipment condition 3608 (e.g., new or used), term 3610 (e.g., financing term or duration), equipment cost 3612, down payment amount 3614, trade in amount 3616, or amount to finance 3618. Some or all of these fields may be optional (e.g., an amount of down payment and trade in amount), while fields such as equipment description 3606, equipment cost 3612, term 3610, and amount to finance 3618 may be required in order to continue the onboarding process.

The credit application screen 3600 may also allow a user to submit a request for a resource allocation, such as an invoice, equipment quote, proposal, or the like as a part of the web-based onboarding process as supporting documentation for the information entered on the credit application screen 3600. For example, the credit application screen 3600 may include an upload files button 3620, link, or the like, that allows the user to attach a request for resource allocation. Additionally, or alternatively, the credit application screen 3600 may include a field, box, or the like that allows the user to drop files 3622, in which a request for resource allocation in text format, a PDF file, a word processing file, or the like, can be submitted. Similar to resource allocation request documents uploaded in the resource allocation system application as described in FIG. 8 above, the system may extract transaction parameters from the resource allocation request documents using one or more OCR techniques and AI processing of the documents. In an example, the system may auto-populate, auto-generate, or the like, the fields on the credit application screen 3600 using the extracted transaction parameters. Then, the fields can be updated by the user, for example, if a field was updated with an incorrect transaction parameter. When a field is updated, edited, corrected, or the like, the corrected transaction parameters may be used to refine or retrain the supervised model as discussed in FIG. 8.

FIG. 37 illustrates an example of a web-based onboarding personal guarantors screen according to some examples of the present disclosure. In an example, the personal guarantors screen 3700 may include fields for the first name 3702, last name 3704, email address 3706, social security number (SSN) 3708, date of birth 3710, mobile number 3714, home address 3716, city 3718, state 3719, and zip code 3720, of a member of the second entity who may act as a personal guarantor. The personal guarantors screen 3700 may also contain a field for percent owned 3712, which may be an ownership interest, partnership interest, shareholder interest, or the like, representing the personal guarantor's ownership share, interest, percentage, or the like, in the second entity/company. In an example, the personal guarantor may be a different individual than the first entity.

The personal guarantors screen 3700 may have or contain an "add a second guarantor" button/link or the like 3722 which allows for another person or individual with an ownership interest in the second entity to be added as a personal guarantor. The personal guarantors screen 3700 may also include a signature field 3724 and a date field 3726 that allows the personal guarantor to digitally sign and date the personal guaranty. Prior to submitting the personal guaranty, the personal guarantors screen 3700 may require the personal guarantor to check a terms and conditions box 3728 that indicates that the personal guarantor agrees to a set of terms and conditions for personal guarantors which may be linked from the personal guarantors screen 3700.

The personal guarantors screen 3700 may also contain a "submit—no guarantors" button 3730 which may allow a user to complete the web-based onboarding without designating a personal guarantor. The personal guarantors screen 3700 may also contain a "submit with guarantors" button 3732 that allows the user to complete the web-based onboarding with one or more personal guarantors. Thus, a user or qualifying entity completing the web-based onboarding system may skip the personal guarantors step.

In an example, when the second entity is not found on the second page of the company information screen 3400 or the company information credit profile screen 3500, the system may require the personal guarantors screen 3700 to be submitted with personal guarantors. Alternatively, when the second entity is not found on the second page of the company information screen 3400 or the company information credit profile screen 3500, the system may allow the personal guarantors to be set up in the resource allocation system application, or allow a personal guaranty form to be printed in hardcopy and filled in by hand and submitted through either the web-based onboarding process or the resource allocation system application before a resource allocation offer may be completed.

Various Notes & Examples

Each of these non-limiting examples may stand on its own or may be combined in various permutations or combinations with one or more of the other examples.

Example 1 is a computer implemented method for secure resource allocation, the method comprising: obtaining information from a qualifying entity regarding a second entity; determining a set of historical data describing historical resource management of the second entity from a database; determining a set of resource management pre-committal parameters for the second entity based on the set of historical data; receiving a request for a resource allocation on behalf of the second entity from the qualifying entity, the request for a resource allocation including a set of resource allocation parameters; determining a resource allocation offer for the second entity, including offer parameters based upon the resource management pre-committal parameters and the resource allocation parameters, the resource allocation offer including a plurality of inter-dependent offer parameters; sending a notification to a first entity in response to a notification initiation from the qualifying entity, the notification prompting the first entity to install a resource allocation system application on a device owned by the first entity; installing the resource allocation system application on the device owned by the first entity; authenticating, in a first security protocol, the first entity by comparing a captured image of the first entity to an image of the first entity on a validated credential; creating a user profile for the first entity in response to the authenticating; linking at least one of: the information obtained from the qualifying entity regarding the second entity, the set of historical data, the set of resource management pre-committal parameters, the request for a resource allocation, or the resource allocation offer to the user profile for the first entity; receiving an acceptance of the resource allocation offer from the first entity on behalf of the second entity, the acceptance including a selection of ones of the plurality of inter-dependent offer parameters; and causing a resource to be allocated for the second entity based on the accepted resource allocation offer by the first entity on behalf of the second entity.

In Example 2, the subject matter of Example 1 optionally includes wherein the first entity is at least one of an agent or employee authorized to act on behalf of and bind the second entity, and wherein the method further comprises: verifying, in a second security protocol, that the first entity is authorized to act on behalf of and bind the second entity, wherein verifying the first entity includes: sending a verification request to an authorized representative associated with the second entity requesting that the authorized representative associated with the second entity attest that the first entity is the at least one of an agent or employee of the second entity authorized to bind the second entity; and receiving a verification response from the authorized representative associated with the second entity attesting that the first entity is the at least one of an agent or employee of the second entity authorized to bind the second entity.

In Example 3, the subject matter of any one or more of Examples 1-2 optionally include wherein causing the resource to be allocated for the second entity based on the accepted resource allocation offer by the first entity on behalf of the second entity includes allocating resources to a third entity determined based on the resource allocation parameters.

In Example 4, the subject matter of Example 3 optionally includes wherein the third entity is a vendor or manufacturer providing equipment or material to the second entity.

In Example 5, the subject matter of Example 4 optionally includes wherein the request for the resource allocation is created from data transferred from a web-based shopping cart on a website of the third entity and linked to the user profile for the first entity via a network.

In Example 6, the subject matter of any one or more of Examples 4-5 optionally include wherein the qualifying entity is at least one of an agent or employee of the third entity.

In Example 7, the subject matter of any one or more of Examples 1-6 optionally include wherein the request for a resource allocation is provided by the qualifying entity through a web-based form accessible to the system via a network connection, wherein data is transferred from the web-based form and linked to the user profile for the first entity via the network.

Example 8 is a system for secure resource allocations comprising: a processor; and memory, including instructions stored thereon which, when executed by the processor cause the processor to: obtain information from a qualifying entity regarding a second entity; determine a set of historical data describing historical resource management of the second entity from a database; determine a set of resource management pre-committal parameters for the second entity based on the set of historical data; receive a request for a resource allocation on behalf of the second entity from the qualifying entity, the request for a resource allocation including a set of resource allocation parameters; determine a resource allocation offer for the second entity, including offer parameters based upon the resource management pre-committal parameters and the resource allocation parameters, the resource allocation offer including a plurality of inter-dependent offer parameters; send a notification to a first entity in response to a notification initiation from the qualifying entity, the notification prompting the first entity to install a resource allocation system application on a device owned by the first entity; install the resource allocation system application on the device owned by the first entity; authenticate, in a first security protocol, the first entity by comparing a captured image of the first entity to an image of the first entity on a validated credential; create a user profile for the first entity in response to the authentication; link at least one of: the information obtained from the qualifying entity regarding the second entity, the set of historical data, the set of resource management pre-committal parameters, the request for a resource allocation, or the resource allocation offer to the user profile for the first entity; receive an acceptance of the resource allocation offer from the first entity on behalf of the second entity, the acceptance including a selection of ones of the plurality of inter-dependent offer parameters; and cause a resource to be allocated for the second entity based on the accepted resource allocation offer by the first entity on behalf of the second entity.

In Example 9, the subject matter of Example 8 optionally includes wherein the first entity is at least one of an agent or employee authorized to act on behalf of and bind the second entity, and wherein the instructions further cause the processor to: verify, in a second security protocol, that the first entity is authorized to act on behalf of and bind the second entity, wherein verifying the first entity includes: sending a verification request to an authorized representative associated with the second entity requesting that the authorized representative associated with the second entity attest that the first entity is the at least one of an agent or employee of the second entity authorized to bind the second entity; and receiving a verification response from the authorized representative associated with the second entity attesting that the first entity is the at least one of an agent or employee of the second entity authorized to bind the second entity.

In Example 10, the subject matter of any one or more of Examples 8-9 optionally include wherein causing the resource to be allocated for the second entity based on the accepted resource allocation offer by the first entity on behalf of the second entity includes allocating resources to a third entity determined based on the resource allocation parameters.

In Example 11, the subject matter of Example 10 optionally includes wherein the third entity is a vendor or manufacturer providing equipment or material to the second entity.

In Example 12, the subject matter of Example 11 optionally includes wherein the request for the resource allocation is created from data transferred from a web-based shopping cart on a website of the third entity and linked to the user profile for the first entity via a network.

In Example 13, the subject matter of any one or more of Examples 11-12 optionally include wherein the qualifying entity is at least one of an agent or employee of the third entity.

In Example 14, the subject matter of any one or more of Examples 8-13 optionally include wherein the request for a resource allocation is provided by the qualifying entity through a web-based form accessible to the system via a network connection, wherein data is transferred from the web-based form and linked to the user profile for the first entity via the network.

Example 15 is a non-transitory machine-readable medium including instructions for operation of a computing system, which when executed by the machine, cause the machine to: obtain information from a qualifying entity regarding a second entity; determine a set of historical data describing historical resource management of the second entity from a database; determine a set of resource management pre-committal parameters for the second entity based on the set of historical data; receive a request for a resource allocation on behalf of the second entity from the qualifying entity, the request for a resource allocation including a set of resource allocation parameters; determine a resource allocation offer for the second entity, including offer parameters based upon the resource management pre-committal parameters and the resource allocation parameters, the resource allocation offer including a plurality of inter-dependent offer parameters; send a notification to a first entity in response to a notification initiation from the qualifying entity, the notification prompting the first entity to install a resource allocation system application on a device owned by the first entity; install the resource allocation system application on the device owned by the first entity; authenticate, in a first security protocol, the first entity by comparing a captured image of the first entity to an image of the first entity on a validated credential; create a user profile for the first entity in response to the authentication; link at least one of: the information obtained from the qualifying entity regarding the second entity, the set of historical data, the set of resource management pre-committal parameters, the request for a resource allocation, or the resource allocation offer to the user profile for the first entity; receive an acceptance of the resource allocation offer from the first entity on behalf of the second entity, the acceptance including a selection of ones of the plurality of inter-dependent offer parameters; and cause a resource to be allocated for the second entity based on the accepted resource allocation offer by the first entity on behalf of the second entity.

In Example 16, the subject matter of Example 15 optionally includes wherein the first entity is at least one of an agent or employee authorized to act on behalf of and bind the second entity, and wherein the instructions further cause the machine to: verify, in a second security protocol, that the first entity is authorized to act on behalf of and bind the second entity, wherein verifying the first entity includes: sending a verification request to an authorized representative associated with the second entity requesting that the authorized representative associated with the second entity attest that the first entity is the at least one of an agent or employee of the second entity authorized to bind the second entity; and receiving a verification response from the authorized representative associated with the second entity attesting that the first entity is the at least one of an agent or employee of the second entity authorized to bind the second entity.

In Example 17, the subject matter of any one or more of Examples 15-16 optionally include wherein causing the resource to be allocated for the second entity based on the accepted resource allocation offer by the first entity on behalf of the second entity includes allocating resources to a third entity determined based on the resource allocation parameters.

In Example 18, the subject matter of Example 17 optionally includes wherein the third entity is a vendor or manufacturer providing equipment or material to the second entity.

In Example 19, the subject matter of Example 18 optionally includes wherein at least one of: the request for the resource allocation is created from data transferred from a web-based shopping cart on a website of the third entity and linked to the user profile for the first entity via a network or the qualifying entity is at least one of an agent or employee of the third entity.

In Example 20, the subject matter of any one or more of Examples 15-19 optionally include wherein the request for a resource allocation is provided by the qualifying entity through a web-based form accessible to the system via a network connection, wherein data is transferred from the web-based form and linked to the user profile for the first entity via the network.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), or the like.

What is claimed is:

1. A computer implemented method for secure resource allocation, the method comprising:

obtaining, at a resource allocation system, information from a qualifying entity regarding a second entity from a first device associated with the qualifying entity;

determining, by the resource allocation system, a set of historical data describing historical resource management of the second entity from a database;

analyzing, using a trained-learning algorithm, the set of historical data to weigh items of the set of historical data to create a weighted set of historical data;

determining, by the resource allocation system, a set of resource management pre-committal parameters for the second entity based on the weighted set of historical data;

receiving, at the resource allocation system, a request for a resource allocation on behalf of the second entity from the qualifying entity, the request for a resource allocation including a set of resource allocation parameters;

determining, by the resource allocation system, a resource allocation offer for the second entity, including offer parameters based upon the resource management pre-committal parameters and the resource allocation parameters, the resource allocation offer including a plurality of inter-dependent offer parameters;

sending, from the resource allocation system, a notification to a first entity in response to a notification initiation from the qualifying entity, the notification prompting the first entity to install a resource allocation system application on a second device, wherein the second device is associated with or owned by the first entity, wherein the second entity is an organization and the first entity is at least one of an agent or an employee of the second entity and is authorized to bind the second entity, and wherein the first entity is not employed by or an agent of the qualifying entity;

causing installation of the resource allocation system application on the second device associated with or owned by the first entity;

authenticating, in a first security protocol, the first entity by:

validating a credential, wherein validating the credential includes capturing information from the credential and submitting the information from the credential to a third-party database for verification of the information; and comparing a captured image of the first entity on the second device to an image of the first entity on the validated credential;

creating a user profile for the first entity in response to the authenticating;

verifying, in a second security protocol, that the first entity is authorized to act on behalf of and bind the second entity, wherein verifying the first entity includes sending a verification request to a third device, separate from the first device and the second device, the third device associated with or owned by an authorized representative associated with the second entity, the verification request requesting that the authorized representative associated with the second entity attest that the first entity is the at least one of an agent or employee of the second entity and is authorized to bind the second entity, wherein the verification request includes:

generating, using the resource allocation system, a digital authorization;

transmitting, using the resource allocation system, the digital authorization to the third device to be digitally signed by the authorized representative; and receiving the digitally signed authorization from the third device;

responsive to receiving the digitally signed authorization from the third device, linking at least one of: the information obtained from the qualifying entity regarding the second entity, the set of historical data, the set of resource management pre-committal parameters, the request for a resource allocation, or the resource allocation offer to the user profile for the first entity;

receiving an acceptance of the resource allocation offer from the first entity on behalf of the second entity, the acceptance including a selection of ones of the plurality of inter-dependent offer parameters, and wherein the acceptance is made by the first entity on the second device associated with or owned by the first entity; and causing a resource to be allocated for the second entity based on the accepted resource allocation offer by the first entity on behalf of the second entity.

2. The method of claim 1, further comprising:

receiving a verification response from the authorized representative associated with the second entity attesting that the first entity is the at least one of an agent or employee of the second entity authorized to bind the second entity.

3. The method of claim 1, wherein causing the resource to be allocated for the second entity based on the accepted resource allocation offer by the first entity on behalf of the second entity includes allocating resources to a third entity determined based on the resource allocation parameters.

4. The method of claim 3, wherein the third entity is a vendor or manufacturer providing equipment or material to the second entity.

5. The method of claim 4, wherein the request for the resource allocation is created from data transferred from a web-based shopping cart on a website of the third entity and linked to the user profile for the first entity via a network.

6. The method of claim 4, wherein the qualifying entity is at least one of an agent or employee of the third entity.

7. The method of claim 1, wherein the request for a resource allocation is provided by the qualifying entity through a web-based form accessible to the system via a network connection, wherein data is transferred from the web-based form and linked to the user profile for the first entity via the network.

8. A system for secure resource allocations comprising:

a processor; and memory, including instructions stored thereon which, when executed by the processor cause the processor to:

obtain information from a qualifying entity regarding a second entity from a first device associated with the qualifying entity;

determine a set of historical data describing historical resource management of the second entity from a database;

analyze, using a trained-learning algorithm, the set of historical data to weigh items of the set of historical data to create a weighted set of historical data;

determine a set of resource management pre-committal parameters for the second entity based on the weighted set of historical data;

receive a request for a resource allocation on behalf of the second entity from the qualifying entity, the request for a resource allocation including a set of resource allocation parameters;

determine a resource allocation offer for the second entity, including offer parameters based upon the resource management pre-committal parameters and the resource allocation parameters, the resource allocation offer including a plurality of inter-dependent offer parameters;

send a notification to a first entity in response to a notification initiation from the qualifying entity, the notification prompting the first entity to install a resource allocation system application on a second device, wherein the second device is associated with or owned by the first entity, wherein the second entity is an organization and the first entity is at least one of an agent or an employee of the second entity and is authorized to bind the second entity, and wherein the first entity is not employed by or an agent of the qualifying entity;

cause the resource allocation system application to install on the second device associated with owned by the first entity;

authenticate, in a first security protocol, the first entity by:

validating a credential, wherein validating the credential includes capturing information from the credential and submitting the information from the credential to a third-party database for verification of the information; and comparing a captured image of the first entity on the second device to an image of the first entity on the validated credential;

create a user profile for the first entity in response to the authentication;

verify, in a second security protocol, that the first entity is authorized to act on behalf of and bind the second entity, wherein verifying the first entity includes sending a verification request to a third device, separate from the first device and the second device, the third device associated with or owned by an authorized representative associated with the second entity, the verification request requesting that the authorized representative associated with the second entity attest that the first entity is the at least one of an agent or employee of the second entity and is authorized to bind the second entity, wherein the verification request includes:

generating a digital authorization;
transmitting the digital authorization to the third device to be digitally signed by the authorized representative; and
receiving the digitally signed authorization from the third device;
responsive to receipt of the digitally signed authorization from the third device, link at least one of: the information obtained from the qualifying entity regarding the second entity, the set of historical data, the set of resource management pre-committal parameters, the request for a resource allocation, or the resource allocation offer to the user profile for the first entity;
receive an acceptance of the resource allocation offer from the first entity on behalf of the second entity, the acceptance including a selection of ones of the plurality of inter-dependent offer parameters, and wherein the acceptance is made by the first entity on the second device associated with or owned by the first entity; and
cause a resource to be allocated for the second entity based on the accepted resource allocation offer by the first entity on behalf of the second entity.

9. The system of claim 8, wherein the instructions further cause the processor to:
receive a verification response from the authorized representative associated with the second entity attesting that the first entity is the at least one of an agent or employee of the second entity authorized to bind the second entity.

10. The system of claim 8, wherein causing the resource to be allocated for the second entity based on the accepted resource allocation offer by the first entity on behalf of the second entity includes allocating resources to a third entity determined based on the resource allocation parameters.

11. The system of claim 10, wherein the third entity is a vendor or manufacturer providing equipment or material to the second entity.

12. The system of claim 11, wherein the request for the resource allocation is created from data transferred from a web-based shopping cart on a website of the third entity and linked to the user profile for the first entity via a network.

13. The system of claim 11, wherein the qualifying entity is at least one of an agent or employee of the third entity.

14. The system of claim 8, wherein the request for a resource allocation is provided by the qualifying entity through a web-based form accessible to the system via a network connection, wherein data is transferred from the web-based form and linked to the user profile for the first entity via the network.

15. A non-transitory machine-readable medium including instructions for operation of a computing system, which when executed by the computing system, cause the computing system to:
obtain, at a resource allocation system, information from a qualifying entity regarding a second entity from a first device associated with the qualifying entity;
determine, by the resource allocation system, a set of historical data describing historical resource management of the second entity from a database;
analyze, using a trained-learning algorithm, the set of historical data to weigh items of the set of historical data to create a weighted set of historical data;
determine, by the resource allocation system, a set of resource management pre-committal parameters for the second entity based on the weighted set of historical data;
receive, at the resource allocation system, a request for a resource allocation on behalf of the second entity from the qualifying entity, the request for a resource allocation including a set of resource allocation parameters;
determine, by the resource allocation system, a resource allocation offer for the second entity, including offer parameters based upon the resource management pre-committal parameters and the resource allocation parameters, the resource allocation offer including a plurality of inter-dependent offer parameters;
send, from the resource allocation system, a notification to a first entity in response to a notification initiation from the qualifying entity, the notification prompting the first entity to install a resource allocation system application on a second device, wherein the second device is associated with or owned by the first entity, wherein the second entity is an organization and the first entity is at least one of an agent or an employee of the second entity and is authorized to bind the second entity, and wherein the first entity is not employed by or an agent of the qualifying entity;
cause the resource allocation system application to install on the second device associated with or owned by the first entity;
authenticate, in a first security protocol, the first entity by:
validating a credential, wherein validating the credential includes capturing information from the credential and submitting the information from the credential to a third-party database for verification of the information; and
comparing a captured image of the first entity on the second device to an image of the first entity on the validated credential;
create a user profile for the first entity in response to the authentication;
verify, in a second security protocol, that the first entity is authorized to act on behalf of and bind the second entity, wherein verifying the first entity includes sending a verification request to a third device, separate from the first device and the second device, the third device associated with or owned by an authorized representative associated with the second entity, the verification request requesting that the authorized representative associated with the second entity attest that the first entity is the at least one of an agent or employee of the second entity and is authorized to bind the second entity, wherein the verification request includes:
generating, using the resource allocation system, a digital authorization;
transmitting, using the resource allocation system, the digital authorization to the third device to be digitally signed by the authorized representative; and
receiving the digitally signed authorization from the third device;
responsive to receipt of the digitally signed authorization from the third device, link at least one of: the information obtained from the qualifying entity regarding the second entity, the set of historical data, the set of resource management pre-committal parameters, the request for a resource allocation, or the resource allocation offer to the user profile for the first entity;
receive an acceptance of the resource allocation offer from the first entity on behalf of the second entity, the acceptance including a selection of ones of the plurality of inter-dependent offer parameters, and wherein the acceptance is made by the first entity on the second device associated with or owned by the first entity; and cause a resource to be allocated for the second entity based on the accepted resource allocation offer by the first entity on behalf of the second entity.

16. The non-transitory machine-readable medium of claim 15, wherein the instructions further cause the computing system to:
verify, in a second security protocol, that the first entity is authorized to act on behalf of and bind the second entity, wherein verifying the first entity includes:
sending a verification request to an authorized representative associated with the second entity requesting that the authorized representative associated with the second entity attest that the first entity is the at least one of an agent or employee of the second entity authorized to bind the second entity; and
receiving a verification response from the authorized representative associated with the second entity attesting that the first entity is the at least one of an agent or employee of the second entity authorized to bind the second entity.

17. The non-transitory machine-readable medium of claim 15, wherein causing the resource to be allocated for the second entity based on the accepted resource allocation offer by the first entity on behalf of the second entity includes allocating resources to a third entity determined based on the resource allocation parameters.

18. The non-transitory machine-readable medium of claim 17, wherein the third entity is a vendor or manufacturer providing equipment or material to the second entity.

19. The non-transitory machine-readable medium of claim 18, wherein at least one of: the request for the resource allocation is created from data transferred from a web-based shopping cart on a website of the third entity and linked to the user profile for the first entity via a network or the qualifying entity is at least one of an agent or employee of the third entity.

20. The non-transitory machine-readable medium of claim 15, wherein the request for a resource allocation is provided by the qualifying entity through a web-based form accessible to the system via a network connection, wherein data is transferred from the web-based form and linked to the user profile for the first entity via the network.

* * * * *

UNITED STATES PATENT AND TRADEMARK OFFICE
CERTIFICATE OF CORRECTION

PATENT NO. : 12,093,856 B2  
APPLICATION NO. : 17/397722  
DATED : September 17, 2024  
INVENTOR(S) : Tomaselli et al.

Page 1 of 1

It is certified that error appears in the above-identified patent and that said Letters Patent is hereby corrected as shown below:

In the Specification

In Column 10, Line 27, after "like", insert --.--

In Column 12, Line 52, delete "processing." and insert --processing,-- therefor

In Column 18, Line 6, after "organization", insert --.--

In Column 23, Line 7, delete "rust" and insert --first-- therefor

In Column 26, Line 24, delete "C4.5." and insert --C4.5,-- therefor

In Column 26, Line 56, delete "2100" and insert --2800-- therefor

In Column 29, Line 56, delete "printed." and insert --printed,-- therefor

In Column 34, Line 59, delete "field." and insert --field-- therefor

In Column 35, Line 9, delete "messages." and insert --messages,-- therefor

Signed and Sealed this  
First Day of July, 2025

Coke Morgan Stewart  
*Acting Director of the United States Patent and Trademark Office*